US012679455B2

(12) United States Patent
Tsubaki et al.

(10) Patent No.: US 12,679,455 B2
(45) Date of Patent: Jul. 14, 2026

(54) CONTROL DEVICE OF VEHICLE STEERING SYSTEM

(71) Applicant: NSK Steering & Control, Inc., Tokyo (JP)

(72) Inventors: Takahiro Tsubaki, Gunma (JP); Takayuki Koiso, Gunma (JP)

(73) Assignee: NSK STEERING & CONTROL, INC., Tokyo (JP)

( * ) Notice: Subject to any disclaimer, the term of this patent is extended or adjusted under 35 U.S.C. 154(b) by 19 days.

(21) Appl. No.: 18/854,602

(22) PCT Filed: Dec. 20, 2022

(86) PCT No.: PCT/JP2022/046779
§ 371 (c)(1),
(2) Date: Oct. 7, 2024

(87) PCT Pub. No.: WO2023/228454
PCT Pub. Date: Nov. 30, 2023

(65) Prior Publication Data
US 2025/0229830 A1      Jul. 17, 2025

(30) Foreign Application Priority Data
May 24, 2022    (JP) ................................. 2022-084580

(51) Int. Cl.
*B62D 6/00*        (2006.01)
*B62D 6/10*        (2006.01)
(52) U.S. Cl.
CPC .............. *B62D 6/008* (2013.01); *B62D 6/10* (2013.01)

(58) Field of Classification Search
CPC ........ B62D 6/008; B62D 6/10; B62D 5/0412; B62D 5/0421; B62D 15/04
See application file for complete search history.

(56) References Cited

U.S. PATENT DOCUMENTS 9,988,076 B2    6/2018  Kodera et al.
10,246,121 B2 *  4/2019  Ikegaya ................. B62D 5/003
(Continued)

FOREIGN PATENT DOCUMENTS

JP        2017-165219 A      9/2017
JP        2017-226318 A      12/2017
(Continued)

OTHER PUBLICATIONS

International Search Report for PCT/JP2022/046779 dated Mar. 7, 2023 (PCT/ISA/210).
(Continued)

*Primary Examiner* — George C Jin
(74) *Attorney, Agent, or Firm* — Sughrue Mion, PLLC

(57)        ABSTRACT
A control device of a vehicle steering system capable of obtaining a steering feeling reflecting a situation of a road surface and a state of a vehicle. The control device includes: a current compensation value generation unit configured to generate a reaction force motor current compensation value increasing or decreasing depending on a road surface reaction force torque estimation value estimated based on at least a first turning motor current command value; and a gain ratio generation unit configured to generate a first gain increasing or decreasing depending on a vehicle speed Vs of a vehicle, and a second gain having a sum of the first gain (Ga) and the second gain of 1.

24 Claims, 37 Drawing Sheets

(56) References Cited

U.S. PATENT DOCUMENTS

| | | | |
|---|---|---|---|
| 10,703,405 B2 | 7/2020 | Kodera | |
| 2006/0047391 A1* | 3/2006 | Katou | B62D 6/008 |
| | | | 180/443 |
| 2015/0375780 A1* | 12/2015 | Chai | B62D 6/002 |
| | | | 701/41 |
| 2018/0265127 A1* | 9/2018 | Walsh | B62D 15/021 |
| 2019/0039640 A1* | 2/2019 | Nishimura | B62D 6/10 |
| 2019/0351936 A1 | 11/2019 | Anraku et al. | |
| 2021/0046972 A1* | 2/2021 | Fujita | B62D 6/008 |
| 2022/0081025 A1 | 3/2022 | Kakimoto et al. | |
| 2023/0034838 A1* | 2/2023 | Mori | B62D 6/002 |
| 2025/0196915 A1 | 6/2025 | Tsubaki et al. | |

FOREIGN PATENT DOCUMENTS

| | | | |
|---|---|---|---|
| JP | 2022-049967 A | 3/2022 | |
| WO | 2019/167661 A1 | 9/2019 | |
| WO | 2023/203812 A1 | 10/2023 | |

OTHER PUBLICATIONS

Extended European Search Report dated Apr. 17, 2026, in Application No. 22943853.6.

* cited by examiner

Figure 28:
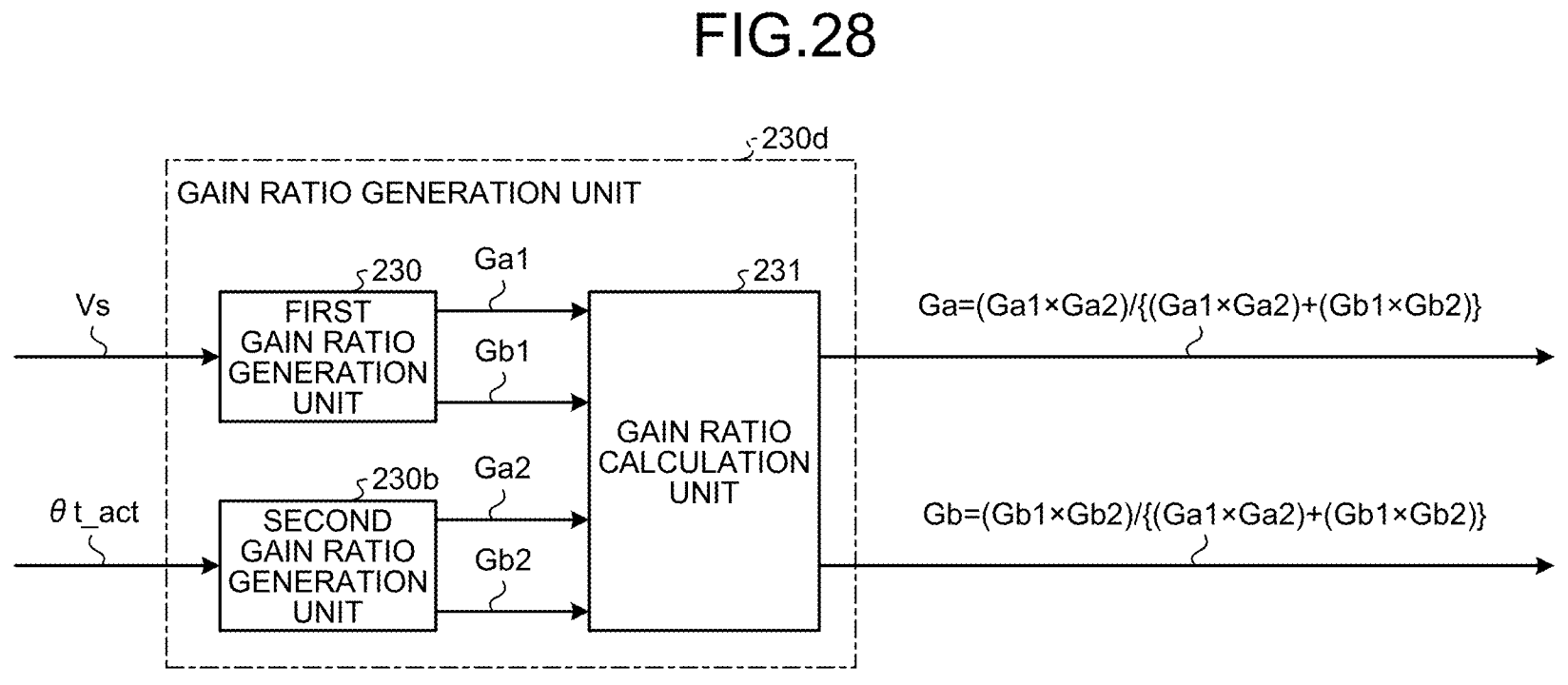

GAIN RATIO GENERATION UNIT  230d

FIRST GAIN RATIO GENERATION UNIT  230

SECOND GAIN RATIO GENERATION UNIT  230b

GAIN RATIO CALCULATION UNIT  231

Ga1

Gb1

Ga2

Gb2

Vs $\theta t\_act$ $Ga = (Ga1 \times Ga2)/\{(Ga1 \times Ga2) + (Gb1 \times Gb2)\}$ $Gb = (Gb1 \times Gb2)/\{(Ga1 \times Ga2) + (Gb1 \times Gb2)\}$

FIG.32

CONTROL DEVICE OF VEHICLE STEERING SYSTEM

CROSS REFERENCE TO RELATED APPLICATIONS

This application is a National Stage of International Application No. PCT/JP2022/046779 filed Dec. 20, 2022, claiming priority based on Japanese Patent Application No. 2022-084580 filed May 24, 2022.

FIELD

The present invention relates to a control device of a vehicle steering system.

BACKGROUND

As one of vehicle steering systems, there is a steer by wire (SBW) system in which a steering mechanism (FFA: Force Feedback Actuator) having a steering wheel operated by a driver and a turning mechanism (RWA: Road Wheel Actuator) for turning a turning wheel are mechanically separated from each other. In the SBW system, the steering mechanism and the turning mechanism are electrically connected to each other via a control device (ECU: Electronic Control Unit), an operation of the steering wheel is transmitted to the turning mechanism by an electrical signal to turn the turning wheel, and steering reaction force for giving an appropriate steering feeling to a driver is generated by the steering mechanism. The steering mechanism generates the steering reaction force by a reaction force actuator including a reaction force motor, and the turning mechanism turns the turning wheel by a turning actuator including a turning motor. The reaction force actuator and the steering wheel are mechanically connected to each other via a column shaft, and reaction force (torque) generated by the reaction force actuator is transmitted to the driver via the column shaft and the steering wheel.

In the SBW system in which the steering mechanism and the turning mechanism are mechanically separated from each other, for example, it is necessary to transmit an oversteer state or an understeer state when a vehicle travels on a low μ road where frictional resistance of the road surface is significantly reduced due to a frozen road surface, a hydroplaning phenomenon in rainy weather, or the like to a reaction force device as steering reaction force. Patent Literature 1 below discloses a vehicle steering device that reflects a situation of a road surface on a steering reaction force by estimating reaction force (self-aligning torque) acting from the road surface and adding the reaction force to reaction force generated according to a steering wheel angle.

CITATION LIST

Patent Literature

Patent Literature 1: WO 2019/167661 A

SUMMARY

Technical Problem

A self-aligning torque changes depending on a state of a vehicle such as a vehicle speed and a steering angle in addition to a situation of a road surface. In the above-described conventional technique, there is a possibility that a steering feeling reflecting the situation of the road surface cannot be obtained depending on the state of the vehicle.

The present invention has been made in view of the above problems, and an object of the present invention is to provide a control device of a vehicle steering system capable of obtaining a steering feeling reflecting a situation of a road surface and a state of a vehicle.

Solution to Problem

To achieve the above object, a control device of a vehicle steering system according to an embodiment of the present disclosure including a reaction force device and a turning device, the reaction force device driving a reaction force motor that applies steering reaction force to a steering wheel according to a steering angle of the steering wheel, the turning device driving a turning motor that turns a turning wheel according to the steering angle of the steering wheel, the control device comprising: a steering torque target value generation unit configured to generate a steering torque target value serving as a target value of steering torque for acquisition of the steering reaction force; a steering torque control unit configured to generate, based on the steering torque target value, a first reaction force motor current command value serving as a target value of current to be supplied to the reaction force motor; a turning angle target value generation unit configured to generate, based on the steering angle, a turning angle target value serving as a target value of a turning angle of the turning wheel; a turning angle control unit configured to generate, based on the turning angle target value, a first turning motor current command value serving as a target value of current to be supplied to the turning motor; a current compensation value generation unit configured to generate a reaction force motor current compensation value increasing or decreasing depending on a road surface reaction force torque estimation value estimated based on at least the first turning motor current command value; and a gain ratio generation unit configured to generate a first gain and a second gain, the first gain increasing or decreasing depending on at least one of a vehicle speed of a vehicle and the steering angle thereof, the second gain having a sum of the first gain and the second gain of 1, wherein the steering torque target value generation unit is configured to generate the steering torque target value by multiplying a torque value increasing or decreasing depending on at least the steering angle by the first gain, and the steering torque control unit is configured to add, to the first reaction force motor current command value, a value obtained by multiplying the reaction force motor current compensation value by the second gain, and to generate a second reaction force motor current command value for driving of the reaction force motor.

According to the above-described configuration, steering reaction force corresponding to a road surface reaction force torque estimation value can be applied to a steering wheel at a ratio corresponding to at least one of a vehicle speed and a steering angle of a vehicle. As a result, it is possible to obtain a steering feeling reflecting a situation of the road surface and a state of the vehicle.

As a desirable embodiment of the control device of the vehicle steering system, the steering torque control unit is configured to increase the reaction force motor current compensation value as the vehicle speed increases.

According to the above-described configuration, steering reaction force adapted to road reaction force that increases with an increase in vehicle speed can be applied to the steering wheel.

As a desirable embodiment of the control device of the vehicle steering system, the gain ratio generation unit is configured to reduce the first gain as the vehicle speed increases.

According to the above-described configuration, the steering reaction force corresponding to the road surface reaction force torque estimation value can be applied to the steering wheel at a ratio corresponding to the vehicle speed. As a result, it is possible to obtain a steering feeling reflecting the situation of the road surface and the vehicle speed.

As a desirable embodiment of the control device of the vehicle steering system, the gain ratio generation unit is configured to reduce the first gain within a range from a first vehicle speed or higher to a second vehicle speed or lower.

According to the above-described configuration, the steering reaction force corresponding to the road surface reaction force torque estimation value can be applied to the steering wheel at a ratio corresponding to the vehicle speed within a range from a first vehicle speed or higher to a second vehicle speed or lower.

As a desirable embodiment of the control device of the vehicle steering system, the first gain in a range of the first vehicle speed or lower is larger than the second gain in a range of the second vehicle speed or higher.

As a desirable embodiment of the control device of the vehicle steering system, the first gain in a range of the first vehicle speed or lower is equal to the second gain in a range of the second vehicle speed or higher.

As a desirable embodiment of the control device of the vehicle steering system, the first gain in a range of the first vehicle speed or lower is smaller than the second gain in a range of the second vehicle speed or higher.

As a desirable embodiment of the control device of the vehicle steering system, the gain ratio generation unit is configured to reduce the first gain with an increase in an actual steering angle serving as the actual steering angle of the steering wheel.

According to the above-described configuration, the steering reaction force corresponding to the road surface reaction force torque estimation value can be applied to the steering wheel at a ratio corresponding to an actual steering angle. As a result, it is possible to obtain a steering feeling reflecting the situation of the road surface and the actual steering angle.

As a desirable embodiment of the control device of the vehicle steering system, the gain ratio generation unit is configured to reduce the first gain within a range from a first steering angle or more to a second steering angle or less.

According to the above-described configuration, the steering reaction force corresponding to the road surface reaction force torque estimation value can be applied to the steering wheel at the ratio corresponding to the actual steering angle within a range from a first steering angle or more to a second steering angle or less.

As a desirable embodiment of the control device of the vehicle steering system, the first gain in a range of the first steering angle or less is larger than the second gain in a range of the second steering angle or more.

As a desirable embodiment of the control device of the vehicle steering system, the first gain in a range of the second steering angle or less is equal to the second gain in a range of the second steering angle or more.

As a desirable embodiment of the control device of the vehicle steering system, the first gain in a range of the second steering angle or less is smaller than the second gain in a range of the second steering angle or more.

As a desirable embodiment of the control device of the vehicle steering system, the gain ratio generation unit is configured to reduce the first gain with an increase in an actual turning angle serving as the actual turning angle of the turning wheel.

According to the above-described configuration, the steering reaction force corresponding to the road surface reaction force torque estimation value can be applied to the steering wheel at a ratio corresponding to an actual turning angle. As a result, it is possible to obtain a steering feeling reflecting the situation of the road surface and the actual turning angle.

As a desirable embodiment of the control device of the vehicle steering system, the gain ratio generation unit is configured to reduce the first gain within a range from a first turning angle or more to a second turning angle or less.

According to the above-described configuration, the steering reaction force corresponding to the road surface reaction force torque estimation value can be applied to the steering wheel at the ratio corresponding to the actual turning angle within a range from a first turning angle or more to a second turning angle or less.

As a desirable embodiment of the control device of the vehicle steering system, the first gain in a range of the first turning angle or less is larger than the second gain in a range of the second turning angle or more.

As a desirable embodiment of the control device of the vehicle steering system, the first gain in a range of the second turning angle or less is equal to the second gain in a range of the second turning angle or more.

As a desirable embodiment of the control device of the vehicle steering system, the first gain in a range of the second turning angle or less is smaller than the second gain in a range of the second turning angle or more.

As a desirable embodiment of the control device of the vehicle steering system, the turning angle control unit is configured to include a friction compensation unit configured to calculate, based on the turning angle target value, a turning motor current compensation value different between when the turning wheel is turned rightwards and when the turning wheel is turned leftwards, and the steering angle control unit is configured to generate, based on the first turning motor current command value and the turning motor current compensation value, a second turning motor current command value used to drive the turning motor.

According to the above-described configuration, friction compensation control can be effectively performed regardless of a steering wheel operation speed of a driver. Accordingly, when the driver performs a steering wheel operation to switch a steering direction from further turning the steering wheel to turning it back or to switch the steering direction from turning the steering wheel back to further turning it, it is possible to reduce the sense of discomfort given to the driver.

As a desirable embodiment of the control device of the vehicle steering system, the turning motor current compensation value has a hysteresis characteristic depending on a change in the turning angle target value.

According to the above-described configuration, different turning motor current compensation values are calculated when the turning wheel is turned to the right and when the turning wheel is turned to the left.

As a desirable embodiment of the control device of the vehicle steering system, the turning motor current compensation value monotonously increases in a region from a first turning angle target value when steering is started to a second turning angle target value or less, the second turning angle target value being obtained by adding a predetermined turning angle change amount threshold value to the first turning angle target value, and becomes a constant value in a region from the first turning angle target value when steering is started to the second turning angle target value or more.

According to the above-described configuration, the friction compensation control can be effectively performed from a state in which the turning wheel is stationary regardless of the steering wheel operation speed of the driver. As a result, even in a situation in which the steering wheel operation by the driver is minute, it is possible to reduce a sense of discomfort given to the driver when the driver performs the steering wheel operation to switch the steering direction from further turning the steering wheel to turning it back or to switch the steering direction from turning the steering wheel back to further turning it.

As a desirable embodiment of the control device of the vehicle steering system, the friction compensation unit is configured to increase or reduce, depending on the second turning motor current command value, the turning motor current compensation value.

According to the above-described configuration, the friction compensation control according to frictional force caused by gear torque can be realized.

As a desirable embodiment of the control device of the vehicle steering system, the turning motor current compensation value monotonously increases with an increase in the second turning motor current command value.

According to the above-described configuration, it is possible to realize the friction compensation control depending on the frictional force caused by gear torque that monotonically increases with an increase in the second turning motor current command value.

As a desirable embodiment of the control device of the vehicle steering system, further comprising: a current compensation value calculation unit configured to calculate a first current compensation value; and a current-sensitive gain generation unit configured to generate a gain monotonically increasing with the increase in the second turning motor current command value, wherein the friction compensation unit is configured to calculate a second current compensation value by multiplying the first current compensation value by the gain.

According to the above-described configuration, it is possible to realize the friction compensation control depending on the frictional force caused by gear torque that monotonically increases with an increase in the second turning motor current command value.

As a desirable embodiment of the control device of the vehicle steering system, the friction compensation unit is configured to store data obtained by associating the second turning motor current command value with a gain monotonically increasing with an increase in the second turning motor current command value, and to calculate, based on the data, the turning motor current compensation value.

According to the above-described configuration, it is possible to realize the friction compensation control depending on the frictional force caused by gear torque that monotonically increases with an increase in the second turning motor current command value.

Advantageous Effects of Invention

According to the present invention, since steering reaction force according to a road surface reaction force torque estimation value can be applied to a steering wheel at a ratio according to a state of a vehicle, it is possible to provide a control device of a vehicle steering system capable of obtaining a steering feeling reflecting a situation of the road surface and the state of the vehicle.

BRIEF DESCRIPTION OF DRAWINGS

FIG. 6B is a conceptual diagram illustrating a characteristic example of a torque value Tref_a.

FIG. 15 is a conceptual diagram illustrating a method of calculating an actual road surface reaction force torque acting on a turning mechanism.

FIG. 28 is a block diagram illustrating a configuration example of a gain ratio generation unit according to the fifth embodiment.

FIG. 32 is a block diagram illustrating a configuration example of a turning angle control unit.

DESCRIPTION OF EMBODIMENTS

Hereinafter, modes for carrying out the invention (hereinafter, referred to as an embodiment) will be described in detail with reference to the drawings. It is noted that the present invention is not limited by the following embodiments. In addition, components in the following embodiments include those that can be easily assumed by those skilled in the art, those that are substantially the same, and those within a so-called equivalent range. Furthermore, the components disclosed in the following embodiments can be appropriately combined with each other.

First Embodiment

Figure 1:
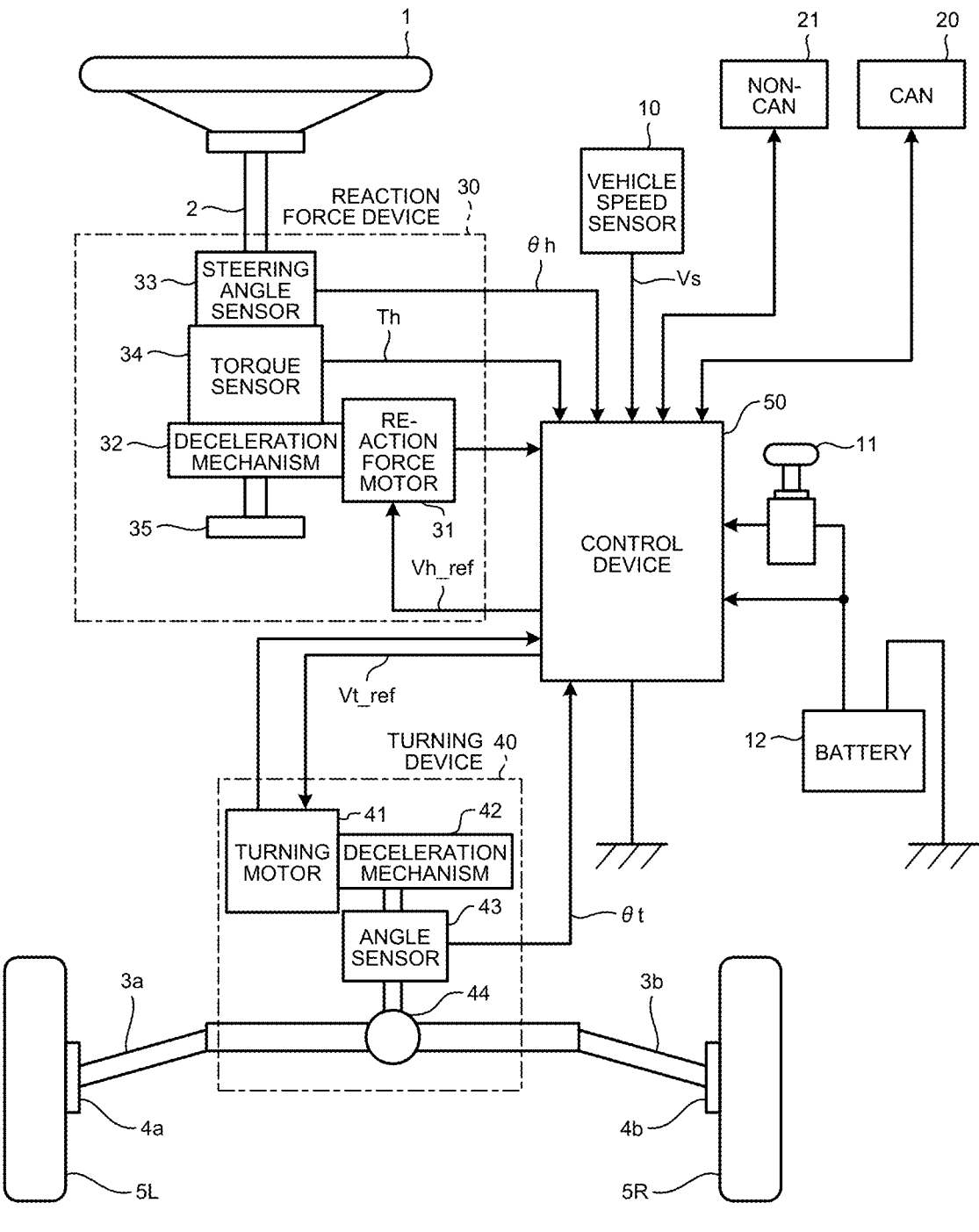
FIG. 1 is a configuration diagram illustrating an example of an outline of an SBW system including a control device according to the present disclosure.

FIG. 1 is a configuration diagram illustrating an example of an outline of an SBW system including a control device according to the present disclosure. Provided are a reaction force device 30 constituting a steering mechanism having a steering wheel operated by a driver, a turning device 40 constituting a turning mechanism configured to turn a turning wheel, and a control device 50 configured to control both devices.

The SBW system does not include an intermediate shaft mechanically coupled to a column shaft (steering shaft, steering wheel shaft) 2 provided in a general electric power steering device, and transmits an operation of a steering wheel 1 by a driver as an electrical signal, specifically, a steering angle $\theta h$ output from the reaction force device 30 as an electrical signal.

The reaction force device 30 includes a deceleration mechanism 32 that decelerates the rotational speeds of a reaction force motor 31 and a reaction force motor 31. The reaction force device 30 transmits a motion state of a vehicle transmitted from turning wheels 5L and 5R to the driver as steering reaction force. The reaction force motor 31 applies the steering reaction force to the steering wheel 1 via the deceleration mechanism 32.

The reaction force device 30 further includes a steering angle sensor 33 and a torque sensor 34. The steering angle sensor 33 detects a steering angle $\theta h$ of the steering wheel 1. The torque sensor 34 detects steering torque Th of the steering wheel 1. Hereinafter, the steering angle $\theta h$ detected by the steering angle sensor 33 is also referred to as an "actual steering angle $\theta h\_act$", and the steering torque Th detected by the torque sensor 34 is also referred to as an "actual steering torque Th_act".

In the present disclosure, the column shaft 2 is provided with a stopper (a rotation restricting mechanism) 35 which physically sets a steering end which is a limit at which steering can be performed. That is, the magnitude (absolute value) of the steering angle $\theta h$ is limited by the stopper 35.

The turning device 40 includes a turning motor 41, a deceleration mechanism 42 that reduces the rotational speed of the turning motor 41, and a pinion rack mechanism 44 that converts rotational motion of the turning motor 41 into linear motion. The turning device 40 drives the turning motor 41 according to the steering angle $\theta h$, applies the driving force to the pinion rack mechanism 44 via the deceleration mechanism 42, and respectively turns the turning wheels 5L and 5R via tie rods 3a and 3b. An angle sensor 43 is disposed in the vicinity of the pinion rack mechanism 44, and detects a turning angle $\theta t$ of the turning wheels 5L and 5R. Instead of the turning angle θt of the turning wheels 5L and 5R, for example, a motor angle of the turning motor 41, a position of a rack, or the like may be detected, and the detected value may be used. Hereinafter, the turning angle θt detected by the angle sensor 43 is also referred to as an "actual turning angle θt_act".

In the present disclosure, the actual steering angle θh_act and the actual turning angle θt_act are also collectively referred to simply as a "steering angle" of the vehicle.

In order to cooperatively control the reaction force device 30 and the turning device 40, the control device 50 generates a voltage control command value Vref1 for driving and controlling the reaction force motor 31 and a voltage control command value Vref2 for driving and controlling the turning motor 41 based on a vehicle speed Vs and the like detected by a vehicle speed sensor 10 in addition to information such as the steering angle θh and the turning angle θt output from both devices.

Power is supplied from a battery 12 to the control device 50, and an ignition key signal is input to the control device 50 through an ignition key 11. Further, a controller area network (CAN) 20 for exchanging various pieces of information of a vehicle is connected to the control device 50, and the vehicle speed Vs can be received from the CAN 20. Furthermore, a non-CAN 21 that transmits and receives communication, analog/digital signals, radio waves, and the like other than the CAN 20 can also be connected to the control device 50.

Figure 2:
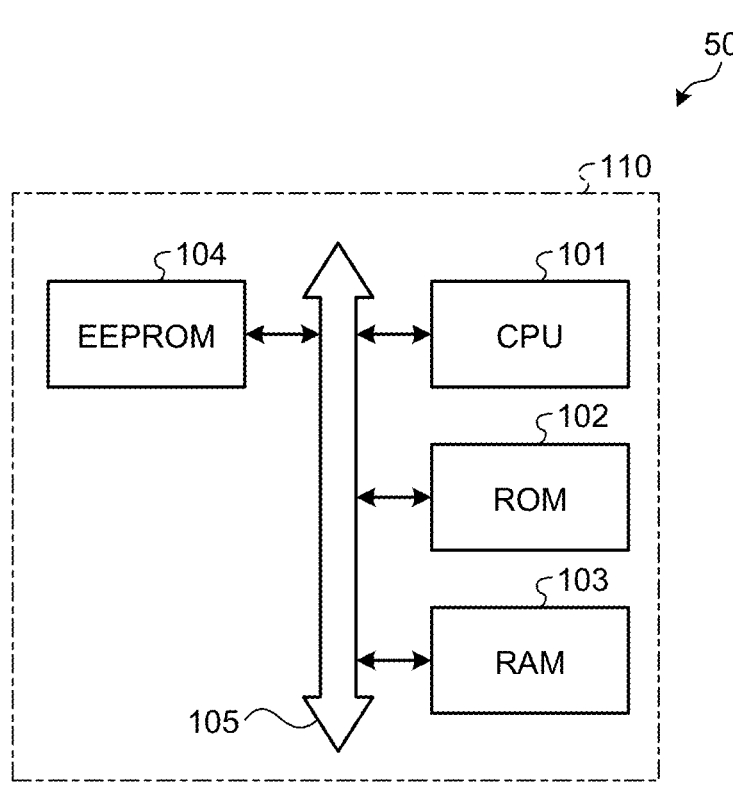
FIG. 2 is a schematic diagram illustrating a hardware configuration of an ECU.

Specifically, the control device 50 is, for example, an electronic control unit (ECU) mounted in a vehicle. The ECU mainly includes a CPU (also includes MCU, MPU, and the like). FIG. 2 is a schematic diagram illustrating a hardware configuration of the ECU. As illustrated in FIG. 2, the control device 50 of the vehicle steering system according to the embodiment includes a control computer (electronic control unit, hereinafter also referred to as "ECU") 110.

The ECU 110 includes a central processing unit (CPU) 101, a read only memory (ROM) 102, a random access memory (RAM) 103, an electrically erasable programmable ROM (EEPROM) 104, and the like, which are connected to a bus 105. The CPU 101 executes a control program stored in the ROM 102. The reaction force device 30 and the turning device 40 are cooperatively controlled mainly by the control program executed by the ECU 110. It is noted that the control device 50 may be configured by one ECU or may be configured to include a reaction force control ECU that controls the reaction force device 30 and a turning control ECU that controls the turning device 40.

The ROM 102 is used as a memory for storing a control program and control data used when the control program is executed. The RAM 103 is used as a work memory for operating the control program.

The EEPROM 104 is a non-volatile memory capable of storing stored contents even after power is shut off, and stores control data and the like used by the CPU 101 to execute the control program. Various pieces of data stored in the EEPROM 104 are used on the control program loaded in the RAM 103 after the ECU 110 is powered on, and are overwritten in the EEPROM 104 at a predetermined timing. Here, the EEPROM is used as the non-volatile memory, but the present invention is not limited thereto, and other non-volatile memories such as a FLASH-ROM (registered trademark) and an SDRAM may be used.

Figure 3:
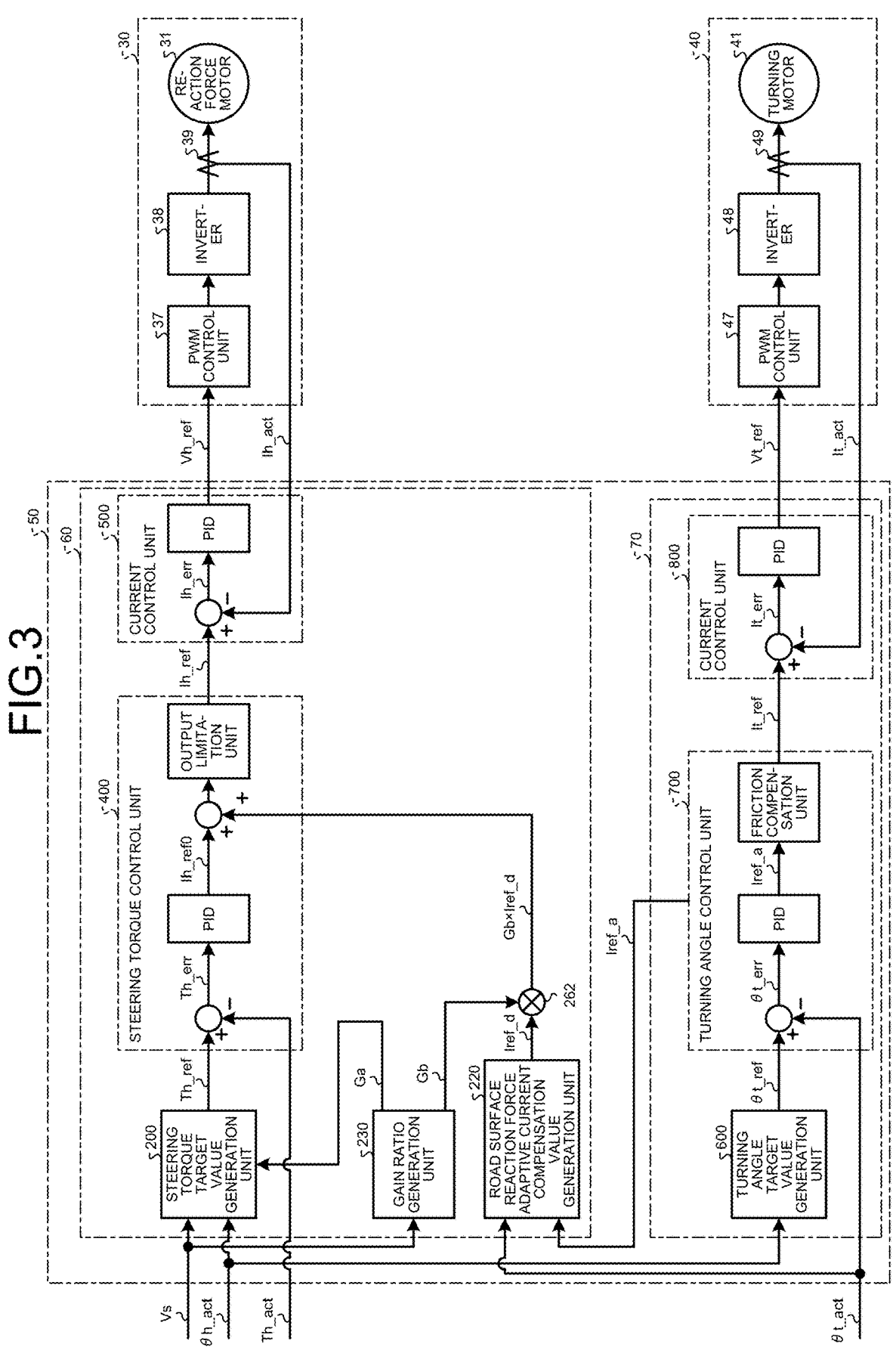
FIG. 3 is a diagram illustrating an example of a control block configuration of a control device according to a first embodiment.

FIG. 3 is a diagram illustrating an example of a control block configuration of the control device according to a first embodiment. In FIG. 3, the reaction force device 30 includes a pulse width modulation (PWM) control unit 37, an inverter 38, and a motor current detector 39 in addition to the reaction force motor 31 and the above-described configuration. Further, the turning device 40 includes a PWM control unit 47, an inverter 48, and a motor current detector 49 in addition to the turning motor 41 and the above-described configuration. The control device 50 realizes each control block of a reaction force control system 60 that controls the reaction force device 30 and a turning control system 70 that controls the turning device 40. The reaction force control system 60 and the turning control system 70 cooperate to control the reaction force device 30 and the turning device 40. When the control device 50 includes the reaction force control ECU and the turning control ECU, the reaction force control system 60 may be realized by the reaction force control ECU, and the turning control system 70 may be realized by the turning control ECU. In this case, the reaction force control system 60 in the following description may be replaced with the reaction force control ECU, and the turning control system 70 may be replaced with the turning control ECU.

Each control block in the reaction force control system 60 is realized by a reaction force control program executed in the ECU 110. In addition, each control block in the turning control system 70 is realized by a turning control program executed in the ECU 110. It is noted that some or all of the control blocks of the control device 50 may be realized by hardware. Additionally, the control device 50 may include the PWM control unit 37, the inverter 38, the motor current detector 39, the PWM control unit 47, the inverter 48, and the motor current detector 49.

As illustrated in FIG. 3, the control device 50 includes, as each control block, a steering torque target value generation unit 200, a road surface reaction force adaptive current compensation value generation unit 220, a gain ratio generation unit 230, a steering torque control unit 400, a current control unit 500, a turning angle target value generation unit 600, a turning angle control unit 700, and a current control unit 800. The steering torque target value generation unit 200, the road surface reaction force adaptive current compensation value generation unit 220, the gain ratio generation unit 230, the steering torque control unit 400, and the current control unit 500 are control blocks constituting the reaction force control system 60. The turning angle target value generation unit 600, the turning angle control unit 700, and the current control unit 800 are control blocks constituting the turning control system 70.

The reaction force control system 60 performs control such that the actual steering torque Th_act detected by the torque sensor 34 follows a steering torque target value Th_ref which is a target value of the steering torque of the reaction force device 30.

The steering torque target value generation unit 200 generates the steering torque target value Th_ref.

The steering torque control unit 400 generates a second reaction force motor current command value Ih_ref for driving the reaction force motor 31. Specifically, the steering torque control unit 400 generates a current command value, which is a control target value of current to be supplied to the reaction force motor 31, such that a deviation Th_err between the steering torque target value Th_ref and the actual steering torque Th_act approaches 0, and calculates a second reaction force motor current command value Ih_ref by adding a first reaction force motor current command value Ih_ref0 in which upper and lower limit values of the current command value are output limited by an output limitation unit to a value obtained by multiplying a reaction force motor current compensation value Iref_d to be described later by a second gain Gb.

The current control unit 500 performs current control of the reaction force motor 31. The current control unit 500 calculates a voltage control command value Vh_ref such that a deviation Ih_err between the second reaction force motor current command value Ih_ref output from the steering torque control unit 400 and an actual current value (motor current value) Ih_act of the reaction force motor 31 detected by the motor current detector 39 approaches 0.

In the reaction force device 30, the reaction force motor 31 is driven and controlled via the PWM control unit 37 and the inverter 38 based on the voltage control command value Vh_ref.

The turning control system 70 performs control such that the actual turning angle θt_act detected by the angle sensor 43 follows a turning angle target value θt_ref.

The turning angle target value generation unit 600 generates the turning angle target value θt_ref based on the steering angle θh.

The turning angle control unit 700 generates a second turning motor current command value It_ref for driving the turning motor 41. Specifically, the turning angle control unit 700 generates a first turning motor current command value Iref_a, which is a control target value of current to be supplied to the turning motor 41, such that a deviation θt_err between the turning angle target value θt_ref and the actual turning angle θt_act approaches 0, and performs friction compensation control by a friction compensation unit on the first turning motor current command value Iref_a, thereby calculating the second turning motor current command value It_ref. Hereinafter, an example in which the friction compensation unit is provided in the turning angle control unit 700 will be described, but a configuration not including the friction compensation unit may be used.

The current control unit 800 performs current control of the turning motor 41. The current control unit 800 calculates a voltage control command value Vt_ref such that a deviation It_err between the second turning motor current command value It_ref output from the turning angle control unit 700 and an actual current value (a motor current value) It_act of the turning motor 41 detected by the motor current detector 49 approaches 0.

In the turning device 40, driving of the turning motor 41 is controlled via the PWM control unit 47 and the inverter 48 based on the voltage control command value Vt_ref.

In the present embodiment, each of the steering torque control unit 400, the current control unit 500, the turning angle target value generation unit 600, the turning angle control unit 700, and the current control unit 800 only needs to have a configuration capable of realizing each control in the reaction force control system 60 or the turning control system 70, and is not limited by the configuration of each control block. Hereinafter, a configuration of the steering torque target value generation unit 200 according to the present embodiment will be described with reference to FIG. 4.

Figure 4:
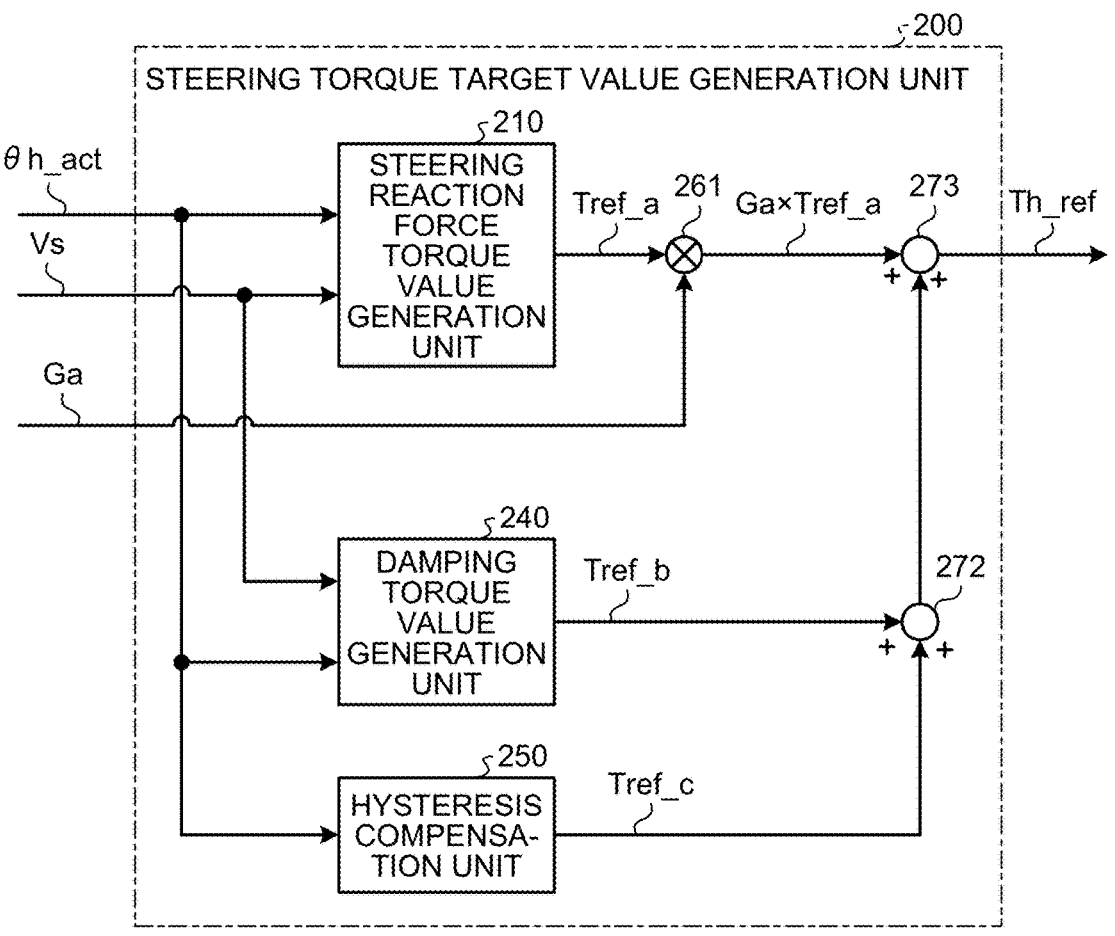
FIG. 4 is a block diagram illustrating a configuration example of a steering torque target value generation unit according to the embodiment.

FIG. 4 is a block diagram illustrating a configuration example of a steering torque target value generation unit according to the embodiment. As illustrated in FIG. 4, the steering torque target value generation unit 200 according to the present embodiment includes a steering reaction force torque value generation unit 210, a road surface reaction force adaptive torque compensation value generation unit 220, a damping torque value generation unit 240, and a hysteresis compensation unit 250 as main components.

Figure 5:
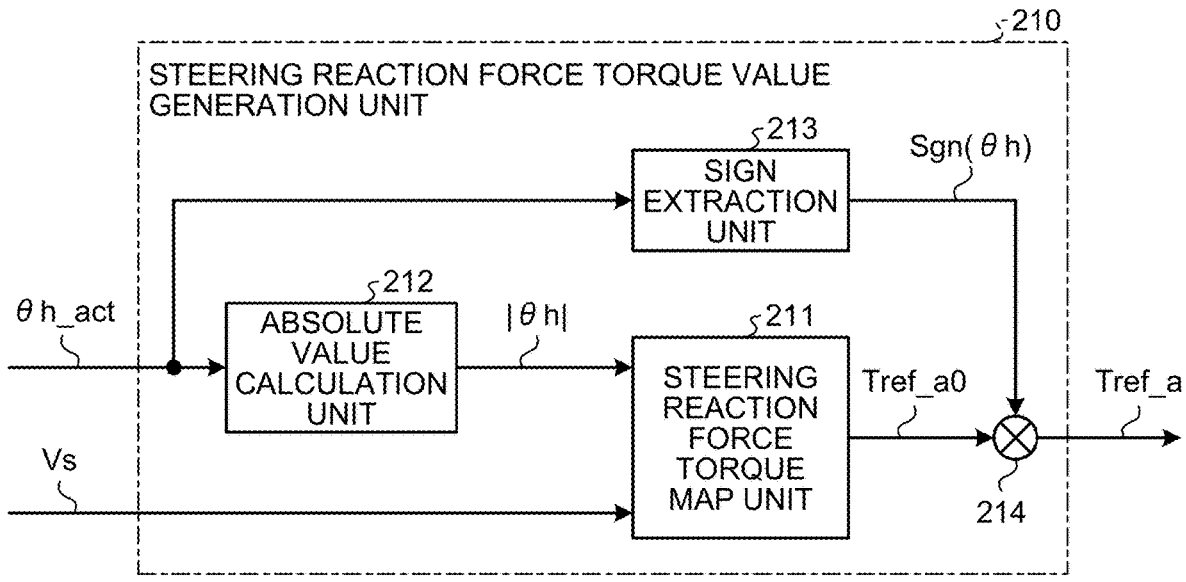
FIG. 5 is a block diagram illustrating a configuration example of a steering reaction force torque value generation unit.

First, the steering reaction force torque value generation unit 210 will be described with reference to FIGS. 5, 6A, and 6B. FIG. 5 is a block diagram illustrating a configuration example of the steering reaction force torque value generation unit.

In the present disclosure, a sign extraction unit 213 illustrated in FIG. 5 extracts a sign of the actual steering angle θh_act. Specifically, for example, a value of the actual steering angle θh_a is divided by an absolute value of the actual steering angle θh_a. Accordingly, the sign extraction unit 213 outputs "1" when the sign of the actual steering angle θh_act is "+", and outputs "−1" when the sign of the actual steering angle θh_act is "−". Specifically, the sign extraction unit 213 generates, for example, a sign function Sgn (θh) of the actual steering angle θh_act.

Figure 6A:
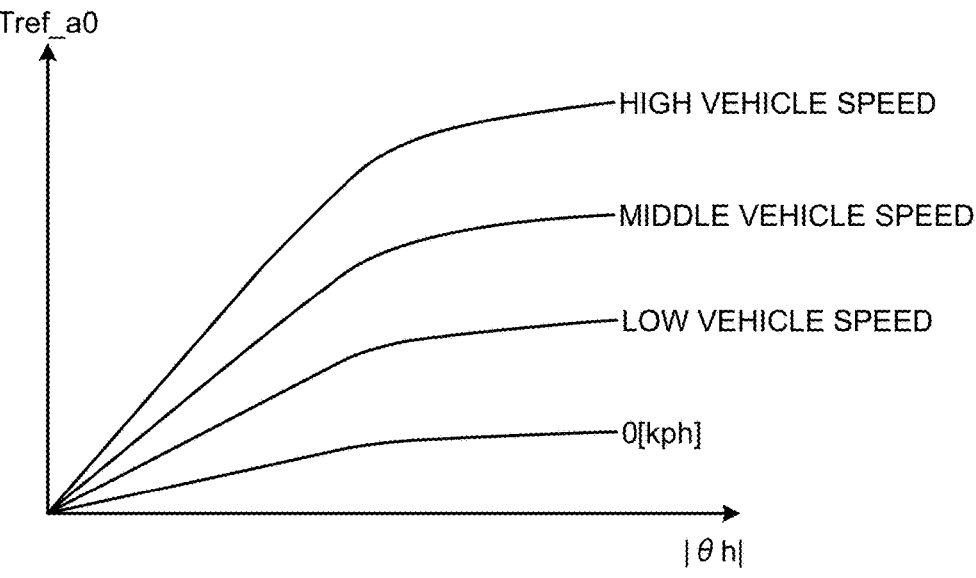
FIG. 6A is a diagram illustrating a characteristic example of a basic map.

FIG. 6A is a diagram illustrating a characteristic example of a basic map. A steering angle |θh| and a vehicle speed Vs subjected to absolute value processing in an absolute value calculation unit 212 are input to a steering reaction force torque map unit 211. The steering reaction force torque value generation unit 210 generates a torque value Tref_a0 with the vehicle speed Vs as a parameter using the basic map illustrated in FIG. 6A. A torque value Tref_a0 is used to generate basic steering reaction force according to the steering angle |θh| and the vehicle speed Vs.

The torque value Tref_a0 has an angle-sensitive characteristic that increases and decreases depending on the steering angle |θh|. More specifically, as illustrated in FIG. 6A, the torque value Tref_a0 increases as the steering angle |θh| increases. The torque value Tref_a0 has a vehicle speed-sensitive characteristic that increases and decreases depending on the vehicle speed Vs. More specifically, as illustrated in FIG. 6A, the torque value Tref_a0 increases as the vehicle speed Vs increases. That is, the reaction force obtained by the torque value Tref_a0 derived by the basic map illustrated in FIG. 6A increases as the operation amount (the steering angle θh) of the steering wheel 1 by the driver increases, and increases as the speed (the vehicle speed Vs) of the vehicle increases. It is noted that the basic map illustrated in FIG. 6A has a vehicle speed-sensitive characteristic, but is not limited thereto.

Figure 6B:
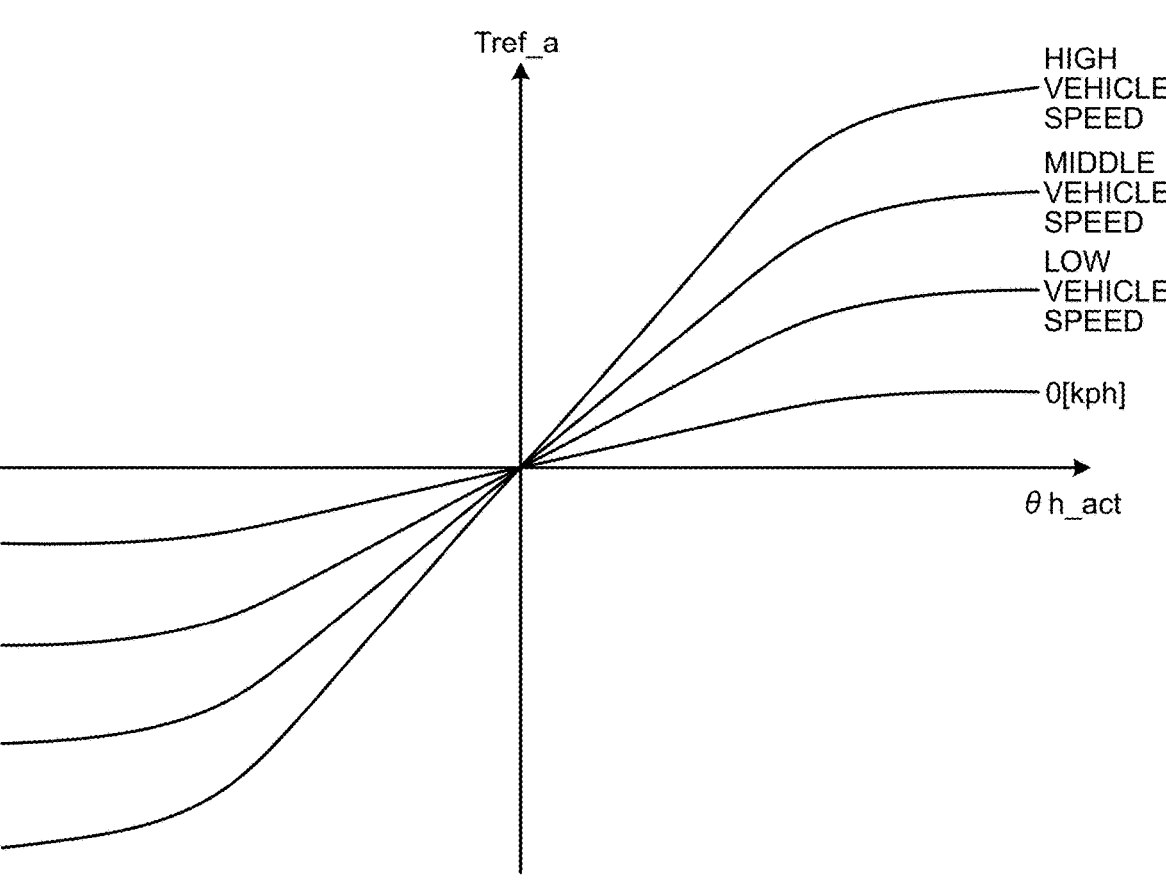

FIG. 6B is a diagram illustrating a characteristic example of a torque value Tref_a. The torque value Tref_a (a first torque value) illustrated in FIG. 6B is obtained by multiplying the torque value Tref_a0 output from the steering reaction force torque map unit 211 by the sign function Sgn (θh) output from the sign extraction unit 213 in a multiplication unit 293. It is noted that an aspect may be adopted in which the sign extraction unit 213 is not provided, and the torque value Tref_a (the first torque value) is obtained using a basic map corresponding to the positive and negative steering angles θh as illustrated in FIG. 6B.

Figure 7:
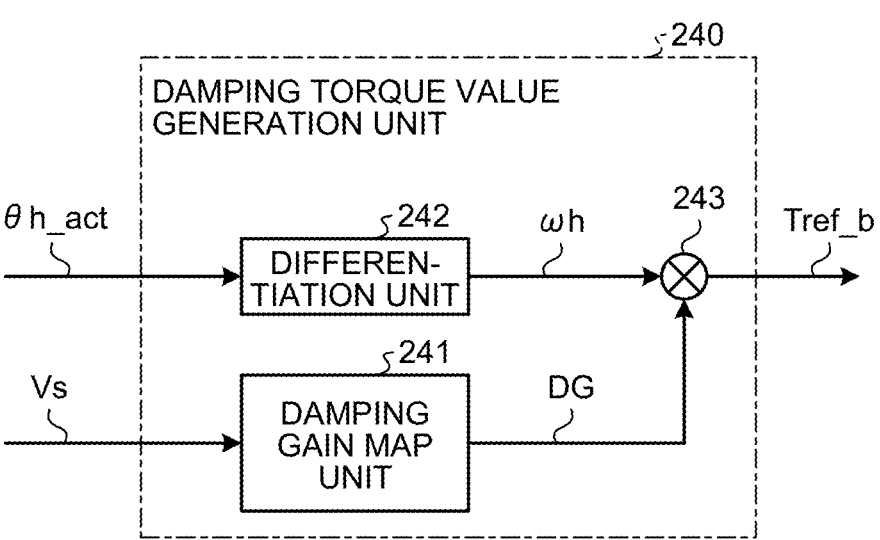
FIG. 7 is a block diagram illustrating a configuration example of a damping torque value generation unit.

Next, the damping torque value generation unit 240 will be described with reference to FIGS. 7, 8A, and 8B. FIG. 7 is a block diagram illustrating a configuration example of the damping torque value generation unit.

The damping torque value generation unit 240 includes a damping gain map unit 241, a differentiation unit 242, and a multiplication unit 243. FIG. 8A is a diagram illustrating a characteristic example of a damping gain map. The vehicle speed Vs is input to the damping gain map unit 241. The damping gain map unit 241 generates a damping gain DG using the damping gain map illustrated in FIG. 8A.

Figure 8A:
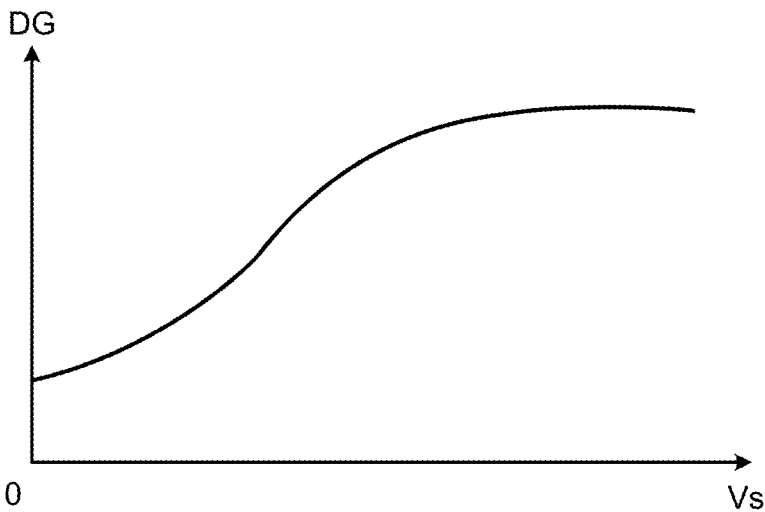
FIG. 8A is a diagram illustrating a characteristic example of a damping gain map.

As illustrated in FIG. 8A, the damping gain DG has a vehicle speed-sensitive characteristic that increases and decreases depending on the vehicle speed Vs. The damping torque value generation unit 240 multiplies an angular velocity (hereinafter, also referred to as a "steering angular velocity ωh") of the steering wheel 1 calculated by differentiating the steering angle θh in the differentiation unit 242 by the damper gain DG output from the damping gain map unit 241 in the multiplication unit 243 and outputs a result value as a torque value Tref_b.

By adding the torque value Tref_b output from the damping torque value generation unit 240 to the torque value Tref_a (the first torque value) output from the steering reaction force torque value generation unit 210, it is possible to compensate for steering reaction force proportional to the steering angular velocity ωh.

Figure 8B:
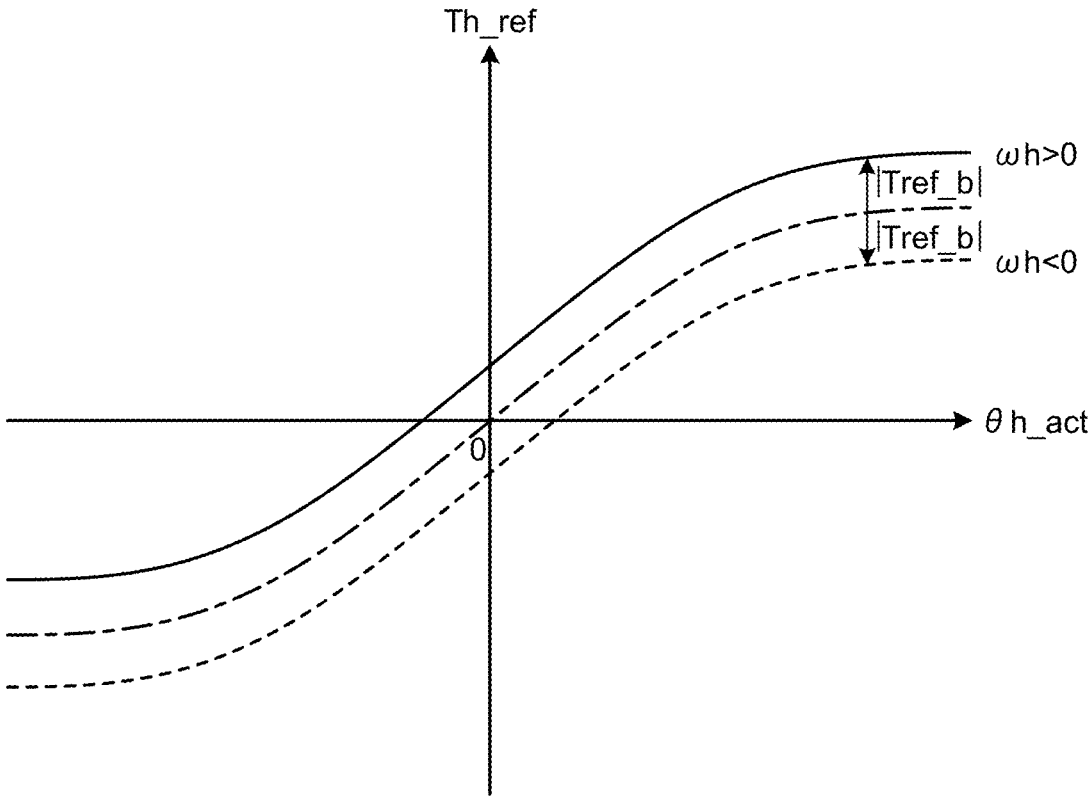
FIG. 8B is a conceptual diagram illustrating a characteristic example of a torque value Tref_a+Tref_b.

FIG. 8B is a conceptual diagram illustrating a characteristic example of a torque value Tref_a+Tref_b. In FIG. 8B, a solid line indicates the torque value Tref_a+Tref_b when the steering angular velocity ωh is a positive value (ωh>0), and a broken line indicates the torque value Tref_a+Tref_b when the steering angular velocity ωh is a negative value (ωh<0). Furthermore, in FIG. 8B, an alternate long and short dash line indicates the torque value Tref_a (the first torque value).

Figure 9:
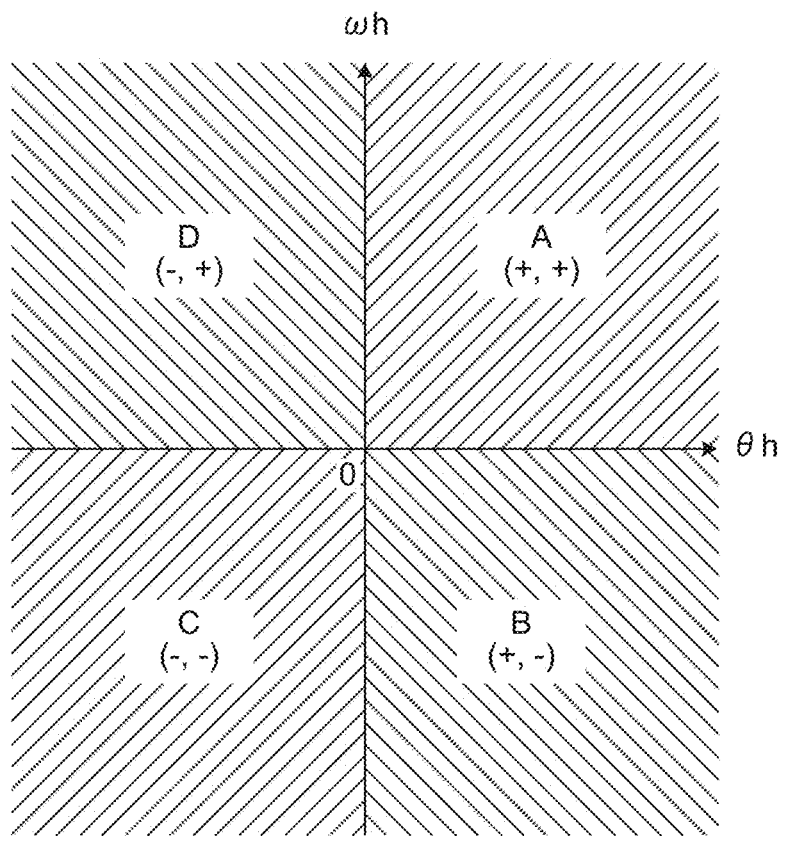
FIG. 9 is a region diagram illustrating a steering direction in the present disclosure.

FIG. 9 is a region diagram illustrating a steering direction in the present disclosure. In FIG. 9, the horizontal axis represents the steering angle θh, and the vertical axis represents the steering angular velocity ωh.

A region A ((θh, ωh)=(+, +)) illustrated in FIG. 9 indicates that the steering wheel 1 is turned in the right direction (θh>0) and is further turned and increased in the right direction (ωh>0). A region B ((θh, ωh)=(+,−)) illustrated in FIG. 9 indicates that the steering wheel 1 is turned back in the left direction (ωh<0) in a state in which the steering wheel 1 is turned in the right direction (θh>0). A region C ((θh, ωh)=(−,−)) illustrated in FIG. 9 indicates that the steering wheel 1 is turned in the left direction (θh<0) and is further turned and increased in the left direction (ωh<0). A region D ((θh, ωh)=(−, +)) illustrated in FIG. 9 indicates that the steering wheel 1 is turned back in the right direction (ωh>0) in a state in which the steering wheel 1 is turned in the left direction (θh<0). Further, in FIG. 9, on the steering angle θh axis (ωh=0), it is indicated that the steering wheel 1 is neither increased nor turned back ((θh, ωh)=(θh, 0)), and on the steering angular velocity ωh axis (θh=0), it is indicated that the steering wheel 1 is at the center position ((θh, ωh)=(0, ωh)).

The torque value Tref_b output from the damping torque value generation unit 240 is a positive value in the regions A and D where the steering angular velocity ωh>0, and a negative value in the regions B and C where the steering angular velocity ωh<0. As a result, in a case where the steering angular velocity ωh>0, that is, in the region A where the steering wheel 1 is further turned and increased in the right direction in a state in which the steering wheel 1 is turned in the right direction (θh>0), or in the region D where the steering wheel 1 is turned back in the right direction in a state in which the steering wheel 1 is turned in the left direction (θh<0), it becomes a value obtained by adding |Tref_b| to Tref_a as indicated by a solid line in FIG. 8B Furthermore, in the steering angular velocity ωh<0, that is, in the region B where the steering wheel 1 is turned back in the left direction in a state in which the steering wheel 1 is turned in the right direction (θh>0), or in the region C where the steering wheel 1 is further turned and increased in the left direction in a state in which the steering wheel 1 is turned in the left direction (θh<0), it becomes a value obtained by subtracting |Tref_b| from Tref_a as indicated by a broken line in FIG. 8B.

As illustrated in FIG. 8B, in the torque value Tref_a+ Tref_b, the magnitude of the steering angle θh increases, and as the steering angle θh approaches a steering end restricted by the stopper (rotation restricting mechanism) 35, the increment of the torque rise with respect to a change in the steering angle θ decreases. In other words, the torque value Tref_a+Tref_b has a characteristic that a change rate gradually decreases as the steering angle θh increases.

Figure 10:
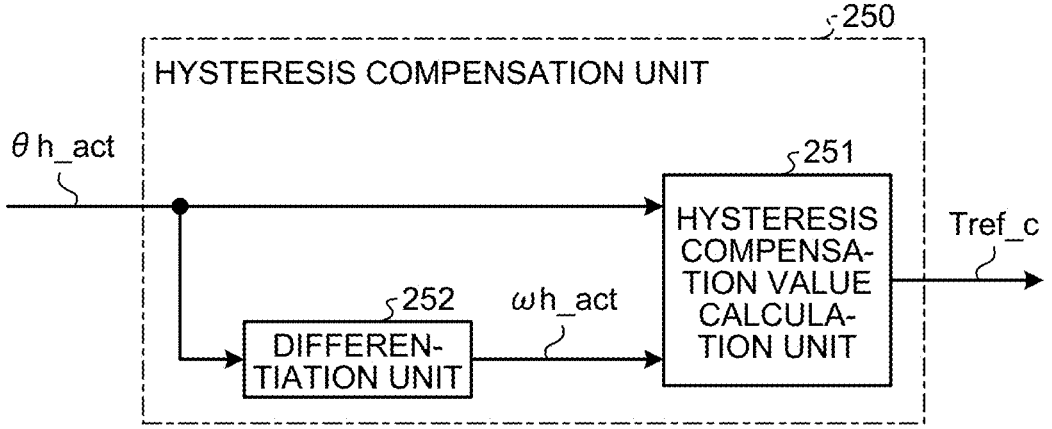
FIG. 10 is a block diagram illustrating a configuration example of a hysteresis compensation unit.

Next, the hysteresis compensation unit 250 will be described with reference to FIGS. 10, 11, and 12. FIG. 10 is a block diagram illustrating a configuration example of the hysteresis compensation unit.

A hysteresis compensation value calculation unit 251 receives the actual steering angle θh_act and an actual steering speed ωh_act calculated by differentiating the actual steering angle θh_act by a differentiation unit 252. The hysteresis compensation value calculation unit 251 calculates a torque compensation value Tref_c based on the actual steering angle θh_act and the actual steering speed ωh_act. Hereinafter, a calculation method of the torque compensation value Tref_c in the hysteresis compensation value calculation unit 251 will be described.

Figure 11:
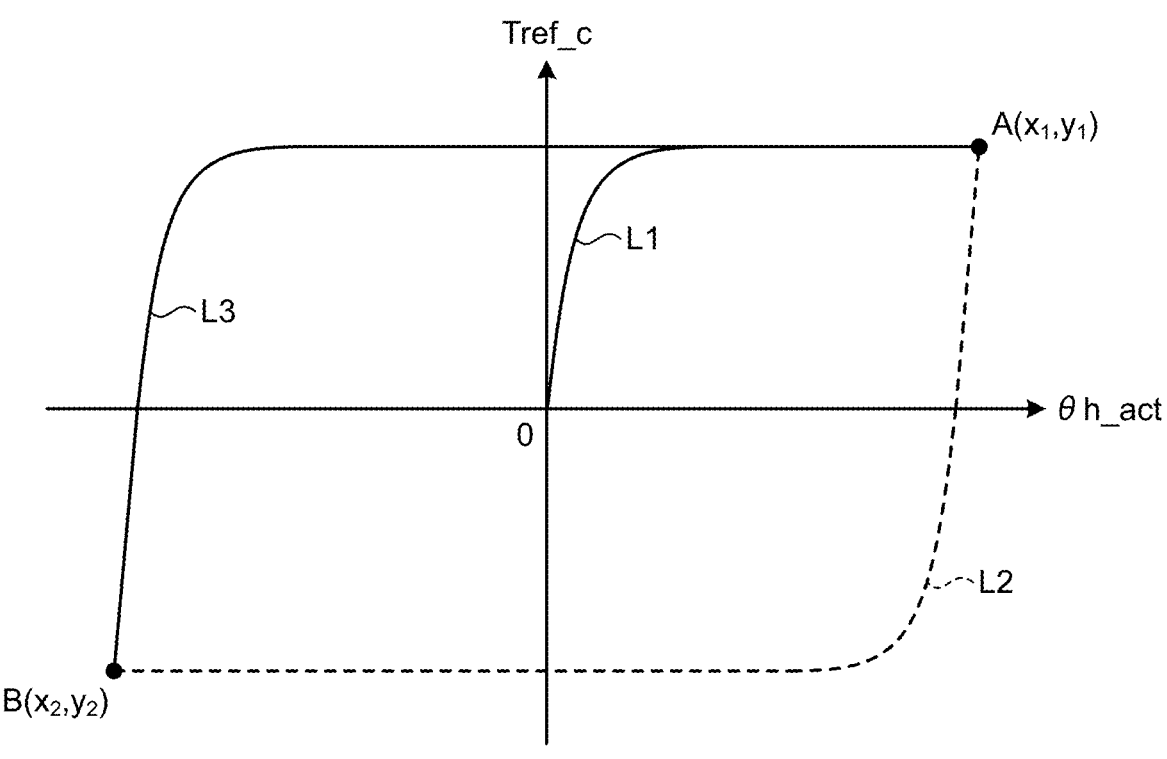
FIG. 11 is a diagram illustrating an example of an output characteristic of the hysteresis compensation unit.

FIG. 11 is a diagram illustrating an example of an output characteristic of the hysteresis compensation unit. In FIG. 11, the horizontal axis represents the actual steering angle θh_act, and the vertical axis represents the torque compensation value Tref_c. In FIG. 11, a solid line indicates the torque compensation value Tref_c at the time of rightward steering, and a broken line indicates the torque compensation value Tref_c at the time of leftward steering. As illustrated in FIG. 11, the torque compensation value Tref_c calculated by the hysteresis compensation value calculation unit 251 has hysteresis characteristics that differ between at the time of leftward turning and at the time of leftward turning. In FIG. 11, L1 represents a trajectory when rightward steering is performed from a center position (origin (0, 0)) of the steering wheel 1, L2 represents a trajectory when switching from rightward steering to leftward steering occurs at coordinates A ($x_1$, $y_1$), and L3 represents a trajectory when switching from rightward steering to leftward steering occurs at coordinates B ($x_2$, $y_2$).

The hysteresis compensation value calculation unit 251 calculates the torque compensation value Tref_c using the following formulas (1) and (2) based on the actual steering angle θh_act and the actual steering speed ωh_act. Specifically, when the sign ωh_act (sgn) of the actual steering speed ωh_act is a positive value ("+"), the torque compensation value Tref_c is calculated using the following formula (1), and when the sign ωh_act (sgn) of the actual steering speed ωh_act is a negative value ("−"), the torque compensation value Tref_c is calculated using the following formula (2). In the following formulas (1) and (2), x is the actual steering speed ωh_act, $y_R$ is the torque compensation value Tref_c at the time of rightward steering, and $y_L$ is the torque compensation value Tref_c at the time of leftward steering. In addition, a coefficient a is a value greater than 1, and a coefficient c is a value greater than 0. The coefficient Ahys indicates an output width of the hysteresis characteristic (a width of the torque compensation value Tref_c), and the coefficient c is a coefficient representing roundness of the hysteresis characteristic.

$$y_R = Ahys\{1 - a^{-c(x-b)}\} \tag{1}$$

-continued $$y_L = -Ahys\{1 - a^{c(x-b')}\} \quad (2)$$

That is, the hysteresis compensation value calculation unit 251 calculates the torque compensation value Tref_c ($y_R$) using the formula (1) at the time of rightward steering ($\omega$h_act (sgn)="+"), and calculates the torque compensation value Tref_c ($y_L$) using the formula (2) at the time of leftward steering ($\omega$h_act (sgn)="–").

When switching from the rightward steering to the leftward steering occurs ($\omega$h_act (sgn)="+"=→"–"), or when switching from the leftward steering to the rightward steering occurs ($\omega$h_act (sgn)="–"→"+"), the hysteresis compensation value calculation unit 251 takes over previous values of the actual steering angle $\theta$h_act and the torque compensation value Tref_c, and substitutes a coefficient b or b' shown in the following formula (3) or (4) into the formula (1) or (2) applied after the steering switching. This maintains continuity before and after steering switching. Specifically, when the switching from the rightward steering to the leftward steering occurs ($\omega$h_act (sgn)="+"=→"–"), the hysteresis compensation value calculation unit 251 applies the previous value (coordinates A ($x_1$, $y_1$) illustrated in FIG. 11) of the actual steering angle $\theta$h_act and the torque compensation value Tref_c to the formula (2), and substitutes the coefficient b' shown in the following formula (4) to calculate the torque compensation value Tref_c. In addition, when the switching from the leftward steering to the rightward steering occurs ($\omega$h_act (sgn)="–"→"+"), the hysteresis compensation value calculation unit 251 applies the previous value (coordinate B ($x_2$, $y_2$) illustrated in FIG. 11) of the actual steering angle $\theta$h_act and the torque compensation value Tref_c to the formula (1), and substitutes the coefficient b shown in the following formula (3) to calculate the torque compensation value Tref_c.

$$b = x_1 + (1/c) \log_a \{1 - (y_1/Ahys)\} \quad (3)$$

$$b' = x_1 - (1/c) \log_a \{1 - (y_1/Ahys)\} \quad (4)$$

The formulas (3) and (4) can be derived by substituting $x_1$ for x and substituting $y_1$ for $y_R$ and $y_L$ in the formulas (1) and (2).

For example, when the Napier's constant e is used as the coefficient a, the formulas (1), (2), (3), and (4) can be expressed by the following formulas (5), (6), (7), and (8), respectively.

$$y_R = Ahys[1 - \exp\{-c(x - b)\}] \quad (5)$$

$$y_L = -Ahys[\{1 - \exp\{c(x - b')\}] \quad (6)$$

$$b = x_1 + (1/c) \log_e \{1 - (y_1/Ahys)\} \quad (7)$$

$$b' = x_1 - (1/c) \log_e \{1 - (y_1/Ahys)\} \quad (8)$$

As described above, the SBW system does not include an intermediate shaft that is mechanically coupled to the column axis 2. That is, the steering mechanism and the turning mechanism are mechanically separated from each other. For this reason, for example, it is necessary to transmit an oversteer state or an understeer state when a vehicle travels on a low u road where frictional resistance of the road surface is significantly reduced due to a frozen road surface, a hydroplaning phenomenon in rainy weather, or the like to the reaction force device 30 as steering reaction force.

In the present disclosure, as illustrated in FIG. 3, as a component of the reaction force control system 60, road surface reaction force torque according to the first turning motor current command value Iref_a generated by the turning angle control unit 700 is estimated, and a reaction force motor current compensation value according to the estimated road surface reaction force torque is applied to the reaction force motor current command value Ih_ref. As a result, the steering reaction force corresponding to the estimated value of the road surface reaction force torque can be applied to the steering wheel 1. Hereinafter, a configuration and an operation capable of applying steering reaction force corresponding to an estimated value of road surface reaction force torque to the steering wheel 1 will be described in detail.

It is noted that, in an aspect in which the turning angle control unit 700 does not include the friction compensation unit, instead of the first turning motor current command value Iref_a in the following description, an aspect may be adopted in which road surface reaction force torque according to the second turning motor current command value It_ref is estimated.

Figure 12:
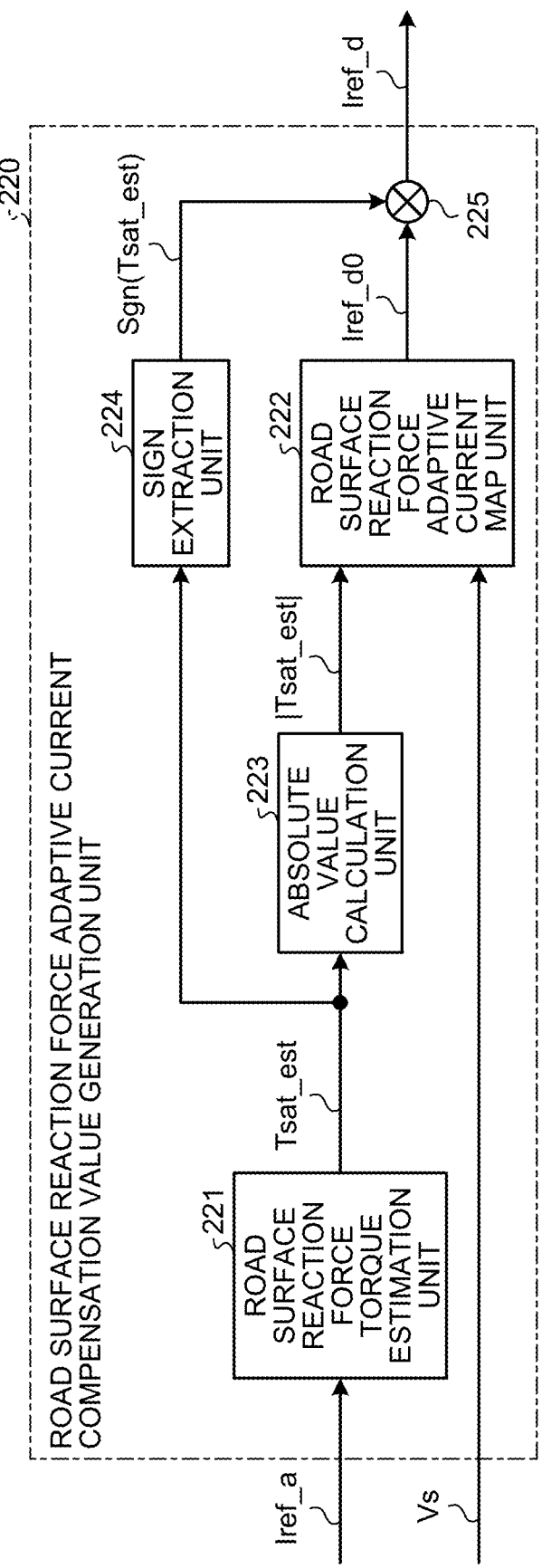
FIG. 12 is a block diagram illustrating a configuration example of a road surface reaction force adaptive torque compensation value generation unit according to the first embodiment.

FIG. 12 is a block diagram illustrating a configuration example of a road surface reaction force adaptive torque compensation value generation unit according to the first embodiment. In the configuration example illustrated in FIG. 12, the road surface reaction force adaptive torque compensation value generation unit 220 includes a road surface reaction force torque estimation unit 221 and a road surface reaction force adaptive torque map unit 222 as main components.

Figure 13:
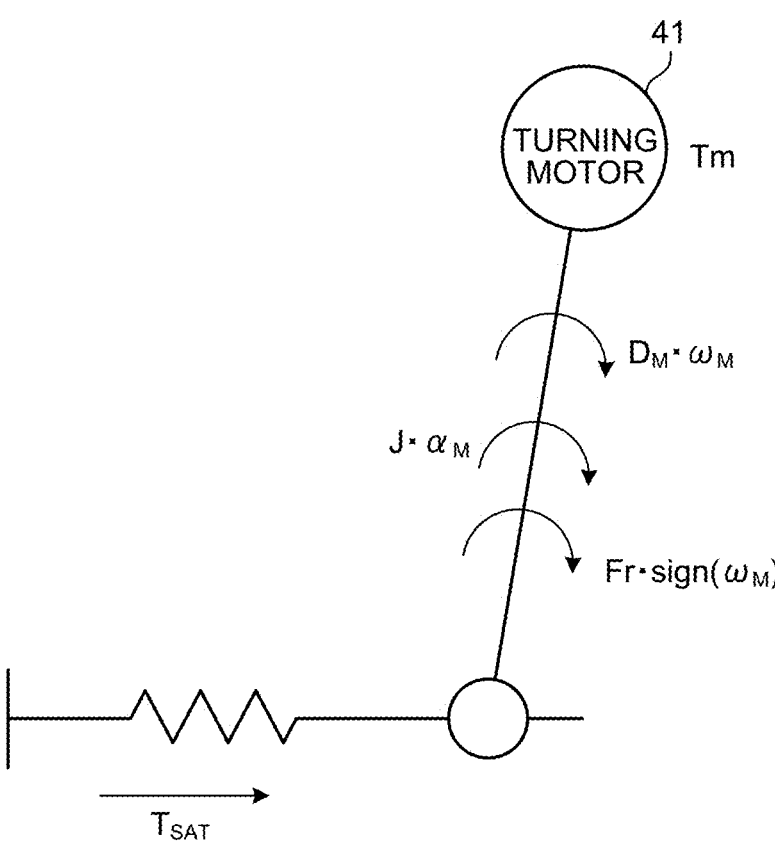
FIG. 13 is an image diagram illustrating a state of torque generated between a road surface and a turning motor.

Here, first, an estimation method of a road surface reaction force torque estimation value Tsat_est in the road surface reaction force torque estimation unit 221 will be described with reference to FIGS. 13 and 14.

FIG. 12 is an image diagram illustrating a state of torque generated between the road surface and the turning motor.

The turning angle target value $\theta$t_ref is generated when a driver steers a steering wheel, and the turning motor 41 generates turning motor torque Tm for turning the turning wheels 5L and 5R according to the turning angle target value $\theta$t_ref. As a result, the turning wheels 5L and 5R are turned, and road surface reaction force torque $T_{SAT}$ is generated. At this time, torque serving as resistance is generated by inertia (column-axis conversion inertia) J and friction (static friction) Fr acting on the column axis by (a rotor of) the turning motor 41, the deceleration mechanism, and the like. Furthermore, physical torque (viscous torque) represented as a damper term (a damper coefficient $D_M$) is generated by rotational speed of the turning motor 41. From the balance of these forces, equation of motion shown in the following formula (9) is obtained.

$$J \times \alpha_M + Fr \times \text{sign}(\omega_M) + D_M \times \omega_M = T_m - T_{SAT} \quad (9)$$

In the above formula (9), $\omega_M$ is a motor angular velocity converted into the column axis (converted into a value with respect to the column axis), and $\alpha_M$ is a motor angular acceleration converted into the column axis. Then, the following formula (10) is obtained by solving the formula (9) for the road surface reaction force torque $T_{SAT}$.

$$T_{SAT} = Tm - J \times \alpha_M - Fr \times \text{sign}\,(\omega_M) - D_M \times \omega_M \qquad (10)$$

As can be seen from the formula (10), by previously obtaining the column-axis conversion inertia J, the static friction Fr, and the damper coefficient $D_M$ as constants, the road surface reaction force torque $T_{SAT}$ can be calculated from the motor angular velocity $\omega_M$, the motor angular acceleration $\alpha_M$, and the turning motor torque Tm. The column-axis conversion inertia J may be a value converted into a column axis simply using a relational formula between motor inertia and a reduction ratio.

The first turning motor current command value Iref_a and the actual turning angle θt_act generated by the turning angle control unit 700 are input to the road surface reaction force torque estimation unit 221. The road surface reaction force torque estimation unit 221 calculates the road surface reaction force torque estimation value Tsat_est by replacing the road surface reaction force torque $T_{SAT}$ of the formula (10) with the road surface reaction force torque estimation value Tsat_est.

Figure 14:
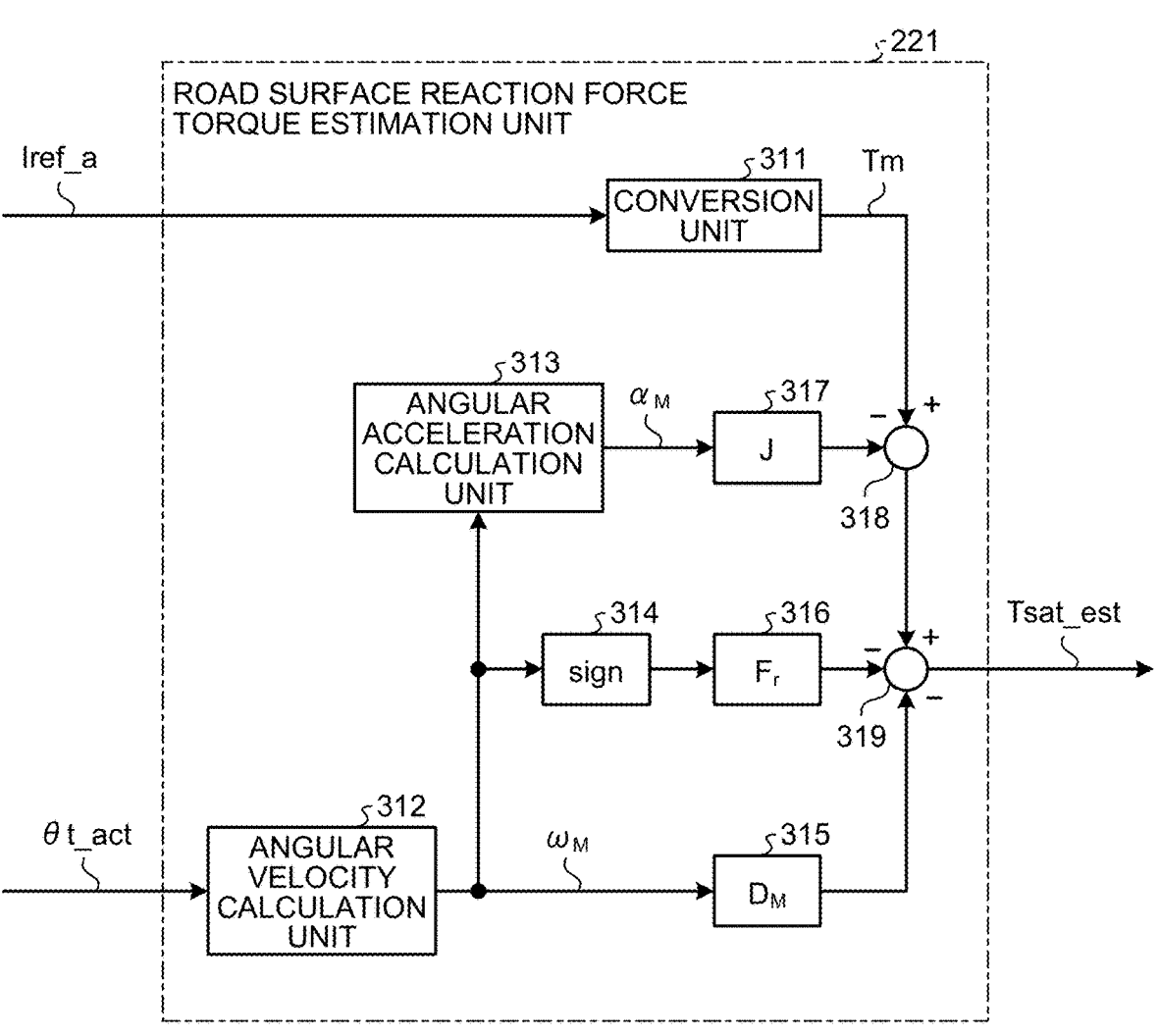
FIG. 14 is a block diagram illustrating a configuration example of a road surface reaction force torque estimation unit.

FIG. 14 is a block diagram illustrating a configuration example of the road surface reaction force torque estimation unit. The road surface reaction force torque estimation unit 221 includes a conversion unit 311, an angular velocity calculation unit 312, an angular acceleration calculation unit 313, a block 314, a block 315, a block 316, a block 317, and subtraction units 318 and 319.

The first turning motor current command value Iref_a is input to the conversion unit 311. The conversion unit 311 calculates the turning motor torque Tm converted to the column axis by multiplying a gear ratio and a torque constant that are determined in advance.

The actual turning angle θt_act is input to the angular velocity calculation unit 312. The angular velocity calculation unit 312 converts the actual turning angle θt_act into the angle of the turning motor 41, performs differential calculation processing on the angle of the turning motor 41, and further calculates the motor angular velocity $\omega_M$ converted to the column axis by division by the gear ratio.

The motor angular velocity $\omega_M$ is input the angular acceleration calculation unit 313. The angular acceleration calculation unit 313 differentiates the motor angular velocity $\omega_M$ and calculates the motor angular acceleration $\alpha_M$ converted to the column axis.

Then, by using the turning motor torque Tm, the motor angular velocity $\omega_M$, and the motor angular acceleration $\alpha_M$, the road surface reaction force torque estimation value Tsat_est is calculated on the basis of the formula (10) with the configuration illustrated in FIG. 14.

The motor angular velocity $\omega_M$ output from the angular velocity calculation unit 312 is input to the block 314. The block 314 functions as a sign function and outputs a sign of input data.

The motor angular velocity $\omega_M$ output from the angular velocity calculation unit 312 is input to the block 315. The block 315 multiplies the input data by the damper coefficient $D_M$ and outputs a result value.

The block 316 multiplies the input data from the block 314 by the static friction Fr and outputs a result value.

The motor angular acceleration $\alpha_M$ output from the angular acceleration calculation unit 313 is input to the block 317. The block 317 multiplies the input data by the column-axis conversion inertia J and outputs the multiplied data.

The subtraction unit 318 subtracts the output of the block 317 from the turning motor torque Tm output from the conversion unit 311.

The subtraction unit 319 subtracts the output of the block 315 and the output of the block 316 from the output of the subtraction unit 318.

With the above configuration, the formula (10) can be realized. That is, the road surface reaction force torque estimation value Tsat_est is calculated by the configuration of the road surface reaction force torque estimation unit 221 illustrated in FIG. 14.

It is noted that, in the mode of detecting the angle of the turning motor 41, the angular velocity calculation unit 312 performs differential calculation processing on the detected angle of the turning motor 41, and further calculates the motor angular velocity $\omega_M$ converted into the column axis by division by the gear ratio. When the column angle can be directly detected, the column angle may be used as angle information instead of the actual turning angle θt_act or the angle of the turning motor 41. In this case, column axis conversion is unnecessary. Instead of the actual turning angle θt_act or the angle of the turning motor 41, a signal obtained by converting the turning angular velocity or the turning motor angular velocity into the column axis may be input as the motor angular velocity $\omega_M$, and the differential processing with respect to the angle of the turning motor 41 may be omitted. Furthermore, the road surface reaction force torque estimation value Tsat_est may be calculated by a method other than the above-described method, or an estimation value corresponding to the road surface reaction force torque estimation value Tsat_est may be used. Hereinafter, a calculation method of the road surface reaction force torque estimation value Tsat_est different from the above method will be described.

In the calculation method of the road surface reaction force torque estimation value Tsat_est different from the above method, the first turning motor current command value Iref_a generated by the turning angle control unit 700 is input to the road surface reaction force torque estimation unit 221. In addition, a transmission function Gfil expressed by the following formula (11) is set in the road surface reaction force torque estimation unit 221. The transmission function Gfil is stored in, for example, the ROM of the ECU constituting the control device 50.

$$Gfil = N(s)/D(s) = (Ds + E)/\left(As^2 + Bs + C\right) \qquad (11)$$

A, B, C, D, and E in the linear function N(s)=Ds+E and the quadratic function D(s)=As$^2$+Bs+C in the formula (11) are coefficients set by the following simulation.

It is noted that, in the present disclosure, the transmission functions of the first order numerator and the second order denominator are assumed as the transmission function Gfil, but the order of the numerator denominator can be appropriately changed depending on an allowable amount of error between actual road surface reaction force torque Tsat_act and the road surface reaction force torque estimation value Tsat_est, the load of the ECU, and the like.

For example, when the order of the numerator denominator increases, a relationship between the first turning motor current command value Iref_a obtained by an experiment to be described later and the actual road surface reaction force torque Tsat_act can be favorably matched with the transmission characteristic of the transmission function Gfil, so that the road surface reaction force torque estimation value Tsat_est close to an actual measured value can be estimated.

On the other hand, when the order of the numerator denominator is reduced, the load on the ECU can be reduced.

It is assumed that a relational formula shown in the following formula (12) is established between the road surface reaction force torque $T_{SAT}$ and the first turning motor current command value Iref_a. The road surface reaction force torque $T_{SAT}$ expressed by the following formula (12) is set as the road surface reaction force torque estimation value Tsat_est in the present disclosure.

In other words, the transmission function Gfil calculates the road surface reaction force torque estimation value Tsat_est from the first turning motor current command value Iref_a by simulating the relationship between the first turning motor current command value Iref_a obtained by the experiment and the actual road surface reaction force torque Tsat_act.

$$T_{SAT} = Gfil \times \text{Iref\_a} = \text{Tsat\_est} \qquad (12)$$

Figure 15:
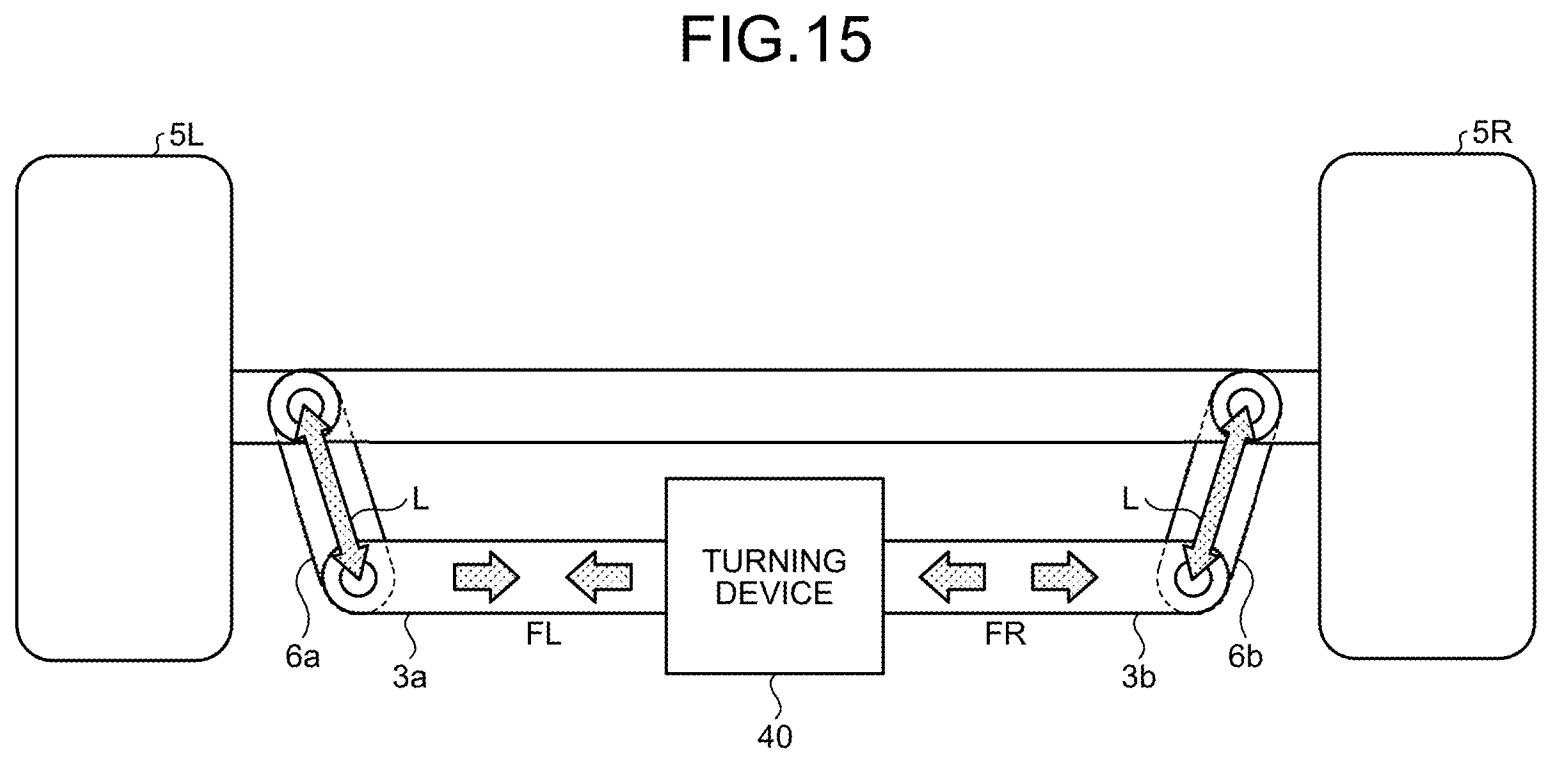

On the other hand, the actual road surface reaction force torque Tsat_act acting on the turning mechanism can be calculated from axial force applied to the tie rod. FIG. 15 is a conceptual diagram illustrating a method of calculating the actual road surface reaction force torque acting on the turning mechanism.

The actual road surface reaction force torque Tsat_act can be calculated by the following formula (13) using axial forces FL and FR applied to the tie rods 3a and 3b and a length L of each of the arms 6a and 6b determined for each vehicle type.

$$\text{Tsat\_act} = FL \times L - FR \times L \qquad (13)$$

In the present disclosure, the actual road surface reaction force torque Tsat_act is calculated using the formula (13) using the axial forces FL and FR measured in advance by an experiment using an actual vehicle. The axial forces FL and FR can be measured, for example, by attaching force sensors to the tie rods 3a and 3b.

Figure 16:
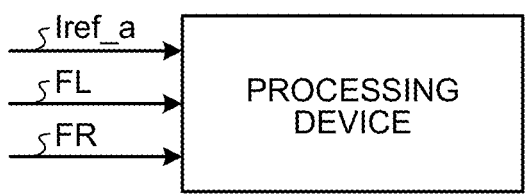
FIG. 16 is a conceptual diagram illustrating a configuration for executing a simulation for deriving a transmission function Gfil.

FIG. 16 is a conceptual diagram illustrating a configuration for executing a simulation for deriving the transmission function Gfil.

The first turning motor current command value Iref_a and the axial forces FL and FR are input to the processing device illustrated in FIG. 16. In the processing device, the transmission function Gfil is derived such that the road surface reaction force torque estimation value Tsat_est expressed by the formula (12) approximates the actual road surface reaction force torque Tsat_act calculated by the formula (13). The processing device illustrated in FIG. 16 includes, for example, a frequency characteristic analysis device (a servo analyzer).

Specifically, the processing device executes curve fitting using a sweep method so as to derive the coefficients A, B, C, D, and E of the transmission function Gfil expressed by the formula (11). As an example of the curve fitting method, for example, a least square approximation method can be used. It is note that the curve fitting method is not limited to the least squares approximation method.

The road surface reaction force torque estimation unit 221 performs filter processing on the first turning motor current command value Iref_a generated by the turning angle control unit 700 using the transmission function Gfil derived as described above, and calculates the road surface reaction force torque estimation value Tsat_est expressed by the formula (12). As a result, the road surface reaction force torque estimation value Tsat_est corresponding to the behavior of the actual road surface reaction force torque Tsat_act when a vehicle actually travels is obtained.

The transmission function used when the road surface reaction force torque estimation unit 221 calculates the road surface reaction force torque estimation value Tsat_est is not limited to the mode illustrated in the (11). Specifically, for example, the present disclosure is not limited by the order of the function N(s) or the function D(s).

Referring back to FIG. 12, a sign extraction unit 224 extracts the sign of the road surface reaction force torque estimation value Tsat_est obtained by the above-described calculation method. Specifically, for example, the value of the road surface reaction force torque estimation value Tsat_est is divided by an absolute value of the road surface reaction force torque estimation value Tsat_est. Accordingly, the sign extraction unit 224 outputs "1" when the sign of the road surface reaction force torque estimation value Tsat_est is "+", and outputs "−1" when the sign of the road surface reaction force torque estimation value Tsat_est is "−". Specifically, the sign extraction unit 224 generates, for example, a sign function Sgn(Tsat_est) of the road surface reaction force torque estimation value Tsat_est.

Figure 17:
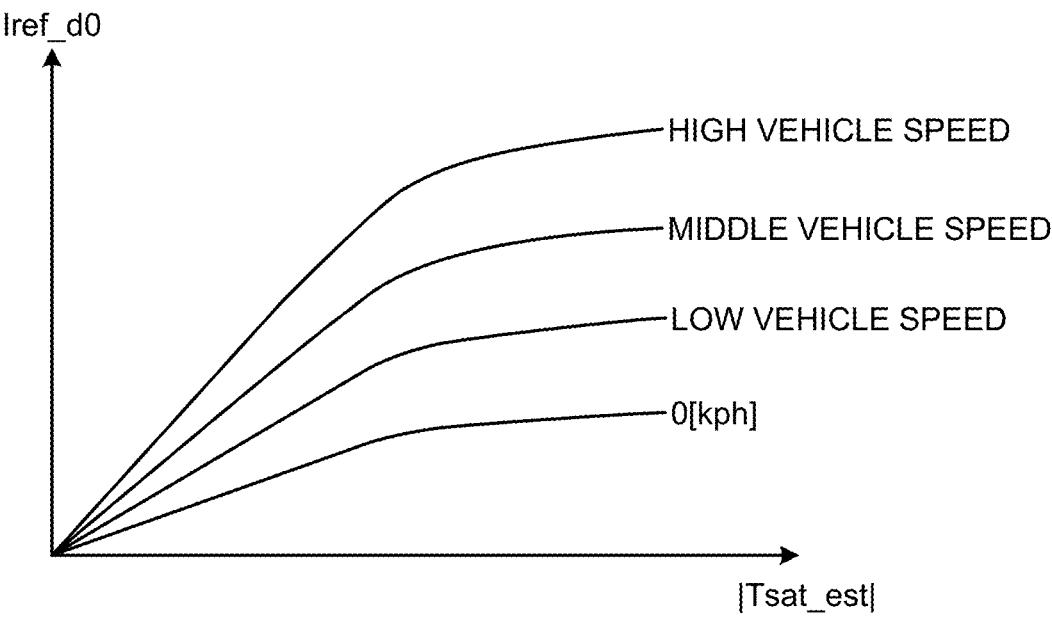
FIG. 17 is a diagram illustrating a characteristic example of a road surface reaction force adaptive current map.

FIG. 17 is a diagram illustrating a characteristic example of a road surface reaction force adaptive current map. A road surface reaction force torque estimation value |Tsat_est| and the vehicle speed Vs subjected to the absolute value processing in an absolute value calculation unit 223 are input to the road surface reaction force adaptive current map unit 222. The road surface reaction force adaptive current map unit 222 uses the road surface reaction force adaptive current map illustrated in FIG. 17 to generate a current compensation value Iref_d0 having the vehicle speed Vs as a parameter.

As illustrated in FIG. 17, the current compensation value Iref_d0 has a torque-sensitive characteristic that increases and decreases depending on the road surface reaction force torque estimation value |Tsat_est |.

More specifically, the current compensation value Iref_d0 increases as the road surface reaction force torque estimation value |Tsat_est | increases, and the increase rate decreases as the road surface reaction force torque estimation value |Tsat_est| increases.

In addition, the current compensation value Iref_d0 has a vehicle speed-sensitive characteristic that increases and decreases depending on the vehicle speed Vs. More specifically, the current compensation value Iref_d0 increases as the vehicle speed Vs increases as illustrated in FIG. 17.

That is, the reaction force obtained by the current compensation value Iref_d0 derived by the road surface reaction force adaptive current map illustrated in FIG. 17 increases as the road surface reaction force torque estimation value |Tsat_est| increases, and increases as the speed (vehicle speed Vs) of the vehicle increases. In the road surface reaction force adaptive current map illustrated in FIG. 17, the vehicle speed-sensitive characteristic is provided, but the present invention is not limited thereto.

The road surface reaction force adaptive current compensation value generation unit 220 outputs the reaction force motor current compensation value Iref_d obtained by multiplying the current compensation value Iref_d0, which is an output value of the road surface reaction force adaptive current map unit 222, by the sign function Sgn(Tsat_est) of the road surface reaction force torque estimation value Tsat_est by a multiplication unit 225 and performing sign conversion.

Figure 18:
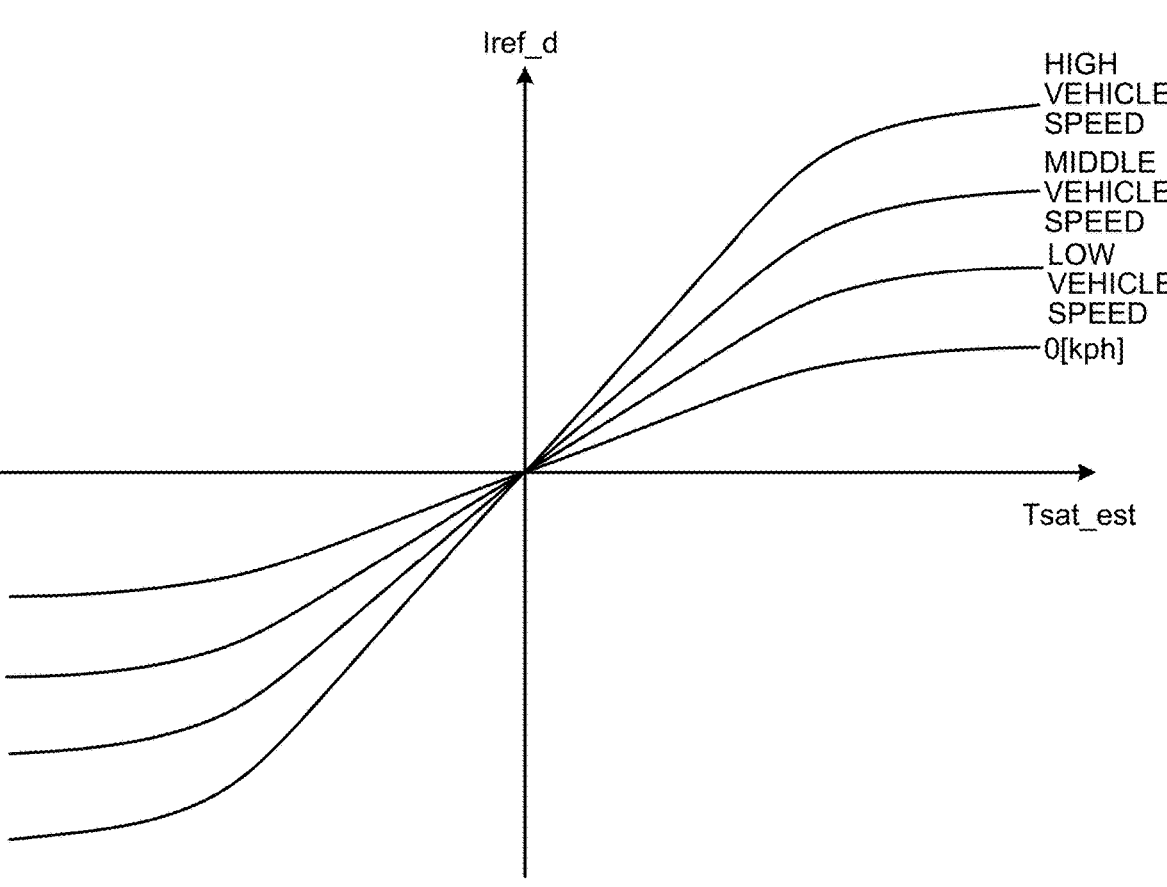
FIG. 18 is a diagram conceptually illustrating a characteristic example of a reaction force motor current compensation value after code conversion.

FIG. 18 is a diagram conceptually illustrating a characteristic example of the reaction force motor current compensation value after code conversion. As illustrated in FIG. 18, the reaction force motor current compensation value Iref_d output from the road surface reaction force adaptive current compensation value generation unit 220 increases or decreases depending on the road surface reaction force torque estimation value Tsat_est which is an estimation value of the reaction force (self-aligning torque) acting from the road surface. By applying the reaction force motor current compensation value Iref_d that increases and decreases depending on the road surface reaction force torque estimation value Tsat_est to the second reaction force motor current command value Ih_ref, it is possible to obtain the steering reaction force according to the road surface reaction force torque estimation value Tsat_est.

It is noted that the characteristics of the road surface reaction force adaptive current map are not limited to the above-described mode illustrated in FIG. 17 or 18. Furthermore, for example, instead of the mode of the map illustrated in FIG. 17 or 18, a mode in which a characteristic is defined by a predetermined transmission function may be used.

Here, the road surface reaction force torque estimation value Tsat_est changes depending on the state of the vehicle, such as the vehicle speed and the steering angle, in addition to the situation of the road surface. For this reason, depending on the state of the vehicle, the situation of the road surface cannot be sufficiently reflected, and a steering feeling depending on the situation of the road surface or the state of the vehicle may not be obtained.

Figure 19A:
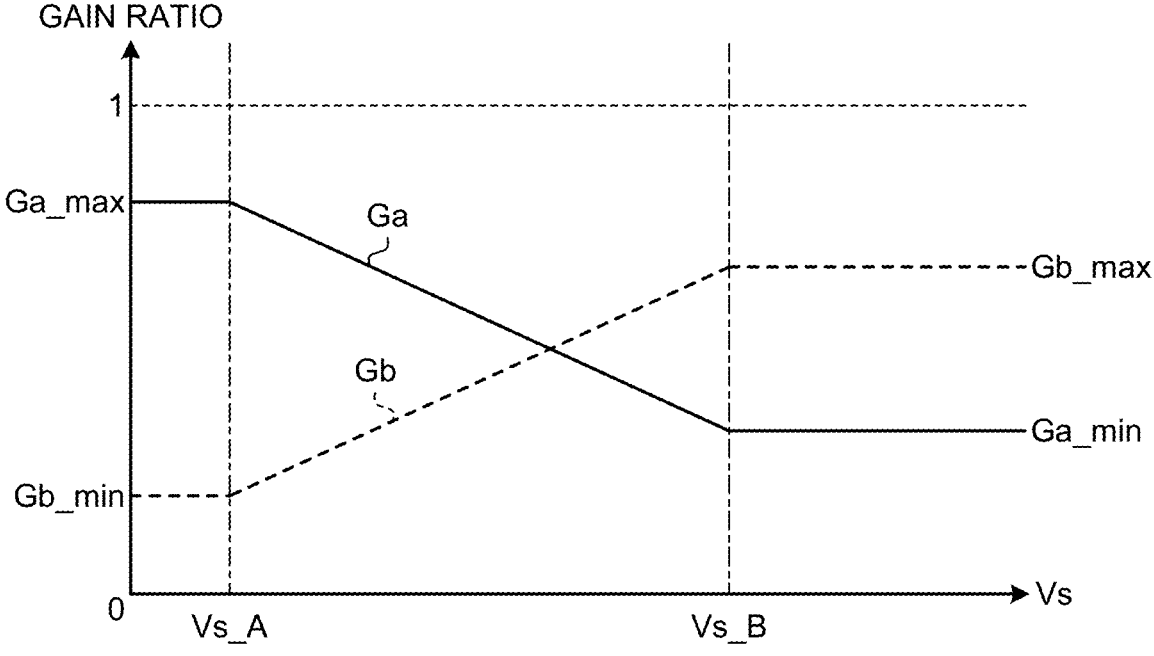
FIG. 19A is a diagram conceptually illustrating a first example of a gain ratio setting example in a gain ratio generation unit according to the first embodiment.
Figure 19B:
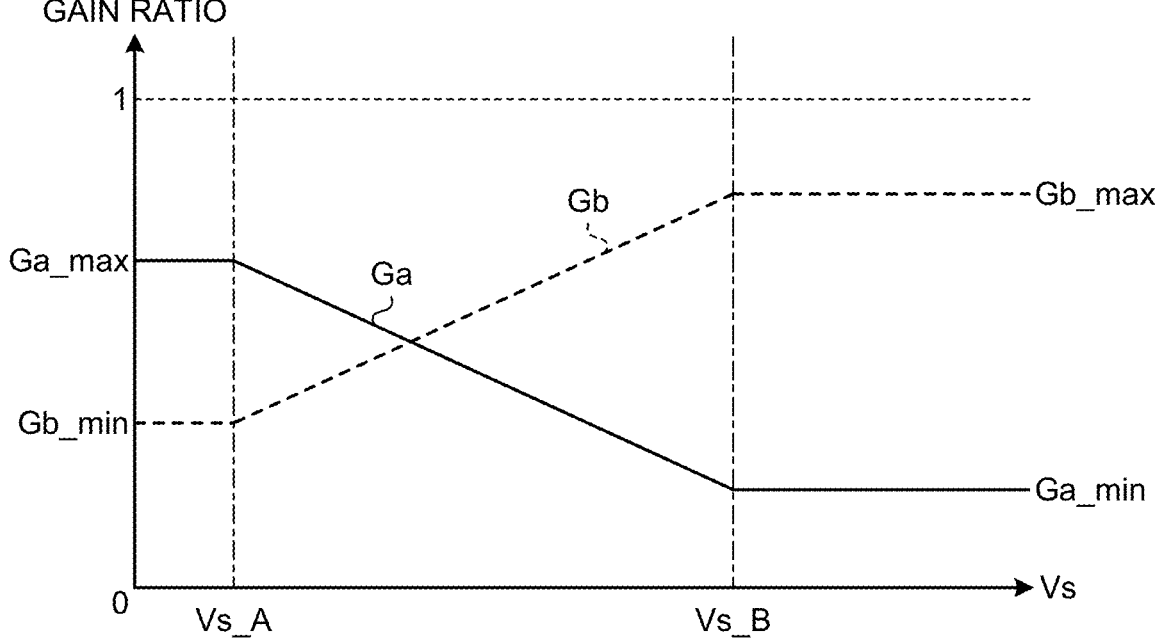
FIG. 19B is a diagram conceptually illustrating a second example of the gain ratio setting example in the gain ratio generation unit according to the first embodiment.
Figure 19C:
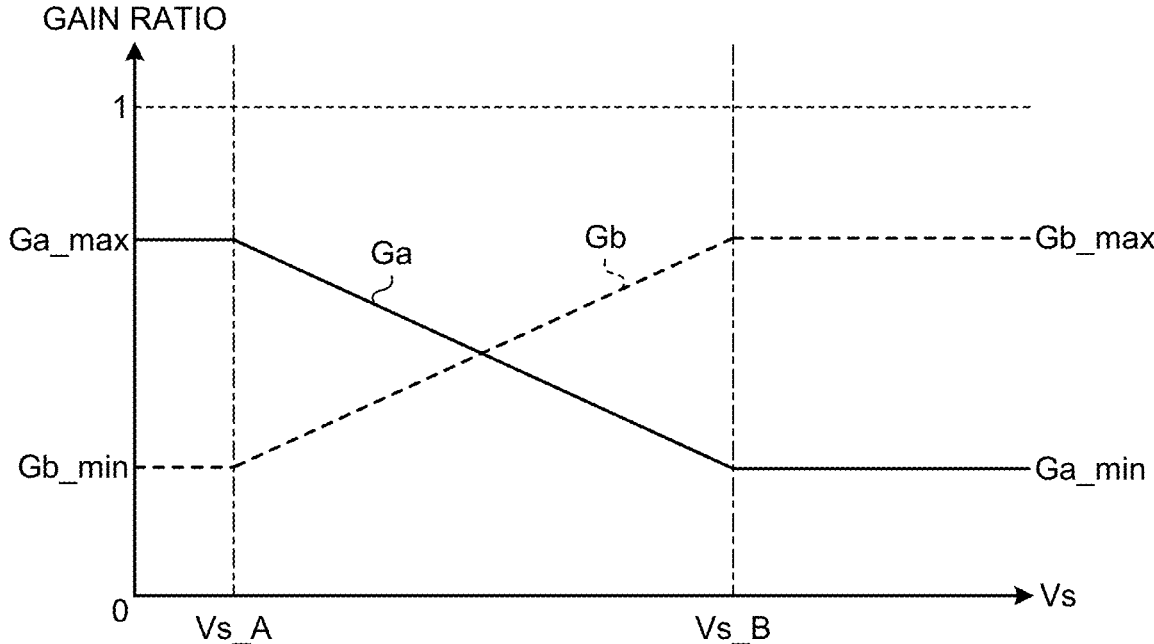
FIG. 19C is a diagram conceptually illustrating a third example of the gain ratio setting example in the gain ratio generation unit according to the first embodiment.

Hereinafter, a configuration and an operation according to the first embodiment capable of imparting a steering feeling depending on the situation of the road surface and the state of the vehicle will be described with reference to FIGS. 3, 19A, 19B, and 19C. FIG. 19A is a diagram conceptually illustrating a first example of a gain ratio setting example in the gain ratio generation unit according to the first embodiment. FIG. 19B is a diagram conceptually illustrating a second example of the gain ratio setting example in the gain ratio generation unit according to the first embodiment. FIG. 19C is a diagram conceptually illustrating a third example of the gain ratio setting example in the gain ratio generation unit according to the first embodiment.

In the present embodiment, a first gain Ga and a second gain Gb are generated with the vehicle speed Vs as a parameter. As illustrated in FIG. 4, the vehicle speed Vs is input to the gain ratio generation unit 230 of the steering torque target value generation unit 200 according to the first embodiment. The gain ratio generation unit 230 generates the first gain Ga that increases or decreases depending on the vehicle speed Vs and the second gain Gb in which the sum of the first gain Ga and the second gain Gb is 1. The first gain Ga is multiplied by the torque value Tref_a (the first torque value) by a multiplication unit 261 in the steering torque target value generation unit 200. The second gain Gb is multiplied by the reaction force motor current compensation value Iref_d by a multiplication unit 262.

The gain ratio generation unit 230 monotonically reduces the first gain Ga to be multiplied by the torque value Tref_a (the first torque value) within the range from a first vehicle speed Vs_A or higher to a second vehicle speed Vs_B or lower. Accordingly, the second gain Gb by which the reaction force motor current compensation value Iref_d is multiplied monotonically increases within the range from the first vehicle speed Vs_A or higher to the second vehicle speed Vs_B or lower. The first vehicle speed Vs_A is, for example, 5 [km/h]. The second vehicle speed Vs_B is, for example, 30 [km/h]. The present disclosure is not limited by the respective values of the first vehicle speed Vs_A and the second vehicle speed Vs_B.

FIG. 19A illustrates an example in which the maximum value Ga_max of the first gain Ga in the range of the first vehicle speed Vs_A or lower is larger than the maximum value Gb_max of the second gain Gb in the range of the second vehicle speed Vs_B or higher. In this case, the minimum value Gb_min of the second gain Gb in the range of the first vehicle speed Vs_A or lower is larger than the minimum value Ga_min of the first gain Ga in the range of the second vehicle speed Vs_B or higher.

FIG. 19B illustrates an example in which the maximum value Ga_max of the first gain Ga in the range of the first vehicle speed Vs_A or lower is smaller than the maximum value Gb_max of the second gain Gb in the range of the second vehicle speed Vs_B or higher. In this case, the minimum value Gb_min of the second gain Gb in the range of the first vehicle speed Vs_A or lower is smaller than the minimum value Ga_min of the first gain Ga in the range of the second vehicle speed Vs_B or higher.

FIG. 19C illustrates an example in which the maximum value Ga_max of the first gain Ga in the range of the first vehicle speed Vs_A or lower is equal to the maximum value Gb_max of the second gain Gb in the range of the second vehicle speed Vs_B or higher. In this case, the minimum value Gb_min of the second gain Gb in the range of the first vehicle speed Vs_A or lower is equal to the minimum value Ga_min of the first gain Ga in the range of the second vehicle speed Vs_B or higher.

Each value and magnitude relationship of the maximum value Ga_max of the first gain Ga, the minimum value Ga_min of the first gain Ga, the maximum value Gb_max of the second gain Gb, and the minimum value Gb_min of the second gain Gb may be appropriately set according to the motion performance of the vehicle on which the control device 50 according to the present disclosure is mounted, vehicle specifications, and the like.

The steering torque target value generation unit 200 adds (addition units 271, 272, and 273) a torque value Ga×Tref_a obtained by multiplying the torque value Tref_a (the first torque value) output from the steering reaction force torque value generation unit 210 by the first gain Ga (the multiplication unit 261), the torque value Tref_b output from the damping torque value generation unit 240, and the torque compensation value Tref_c output from the hysteresis compensation unit 250, and outputs a result value as the steering torque target value Th_ref. The steering torque control unit 400 adds a current compensation value Gb×Iref_d obtained by multiplying the reaction force motor current compensation value Iref_d output from the road surface reaction force adaptive current compensation value generation unit 220 by the second gain Gb (the multiplication unit 262) to the first reaction force motor current command value Ih_ref0, and outputs the first reaction force motor current command value Ih_ref0 as the second reaction force motor current command value Ih_ref in which upper and lower limit values of the first reaction force motor current command value Ih_ref0 are limited by the output limitation unit.

In the first embodiment, steering reaction force corresponding to the road surface reaction force torque estimation value Tsat_est can be applied to the steering wheel 1 at a ratio corresponding to the vehicle speed Vs. Specifically, the steering torque target value generation unit 200 generates the steering torque target value Th_ref by multiplying the torque value Tref_a (the first torque value) output from the steering reaction force torque value generation unit 210 by a relatively large first gain Ga in a region where the vehicle speed Vs is relatively small, and generates the second reaction force motor current command value Ih_ref by multiplying the reaction force motor current compensation value Iref_d output from the road surface reaction force adaptive current compensation value generation unit 220 by a relatively large second gain Gb in a region where the vehicle speed Vs is relatively large. In the low speed region where the vehicle speed Vs is relatively small, a component of reaction force torque due to elastic deformation of a tire is a main component of the road surface reaction force torque, and a proportion of the reaction torque component due to the road surface state to the road surface reaction force torque is small. That is, when the output of the road surface reaction force-sensitive torque generation unit 220 relatively increases in the low speed region, although it is difficult to obtain the road surface state, heavy steering torque is applied, so that the driver's steering feeling deteriorates. Therefore, in the low speed region where the vehicle speed Vs is relatively small, the steering feeling reflecting the situation of the road surface and the vehicle speed Vs can be obtained by using the relatively large first gain Ga and the relatively small second gain Gb.

It is noted that the gain ratio setting example in the gain ratio generation unit 230 according to the first embodiment is an example, and is not limited to the modes illustrated in FIGS. 19A, 19B, and 19C described above. For example, within the range from the first vehicle speed Vs_A or higher to the second vehicle speed Vs_B or lower, the first gain Ga to be multiplied by the torque value Tref_a (the first torque value) may gradually decrease as the vehicle speed Vs increases, and accordingly, the second gain Gb to be multiplied by the reaction force motor current compensation value Iref_d may gradually increase as the vehicle speed Vs increases. In addition, for example, within the range from the first vehicle speed Vs_A or higher to the second vehicle speed Vs_B or lower, the first gain Ga to be multiplied by the torque value Tref_a (the first torque value) may gradually increase as the vehicle speed Vs decreases, and accordingly, the second gain Gb to be multiplied by the reaction force motor current compensation value Iref_d may gradually decrease as the vehicle speed Vs decreases.

Second Embodiment

Figure 20:
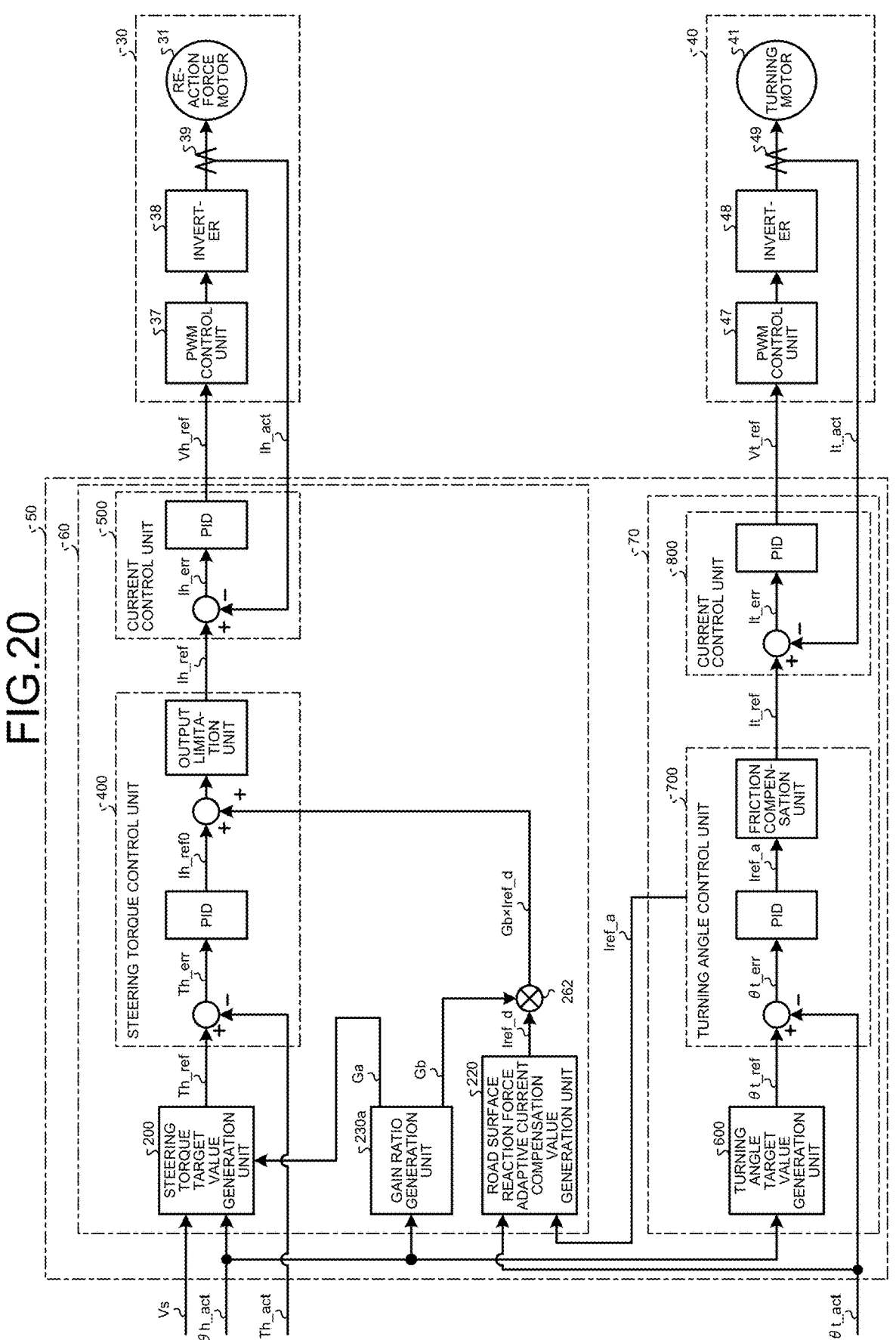
FIG. 20 is a diagram illustrating an example of a control block configuration of a control device according to a second embodiment.
Figure 21:
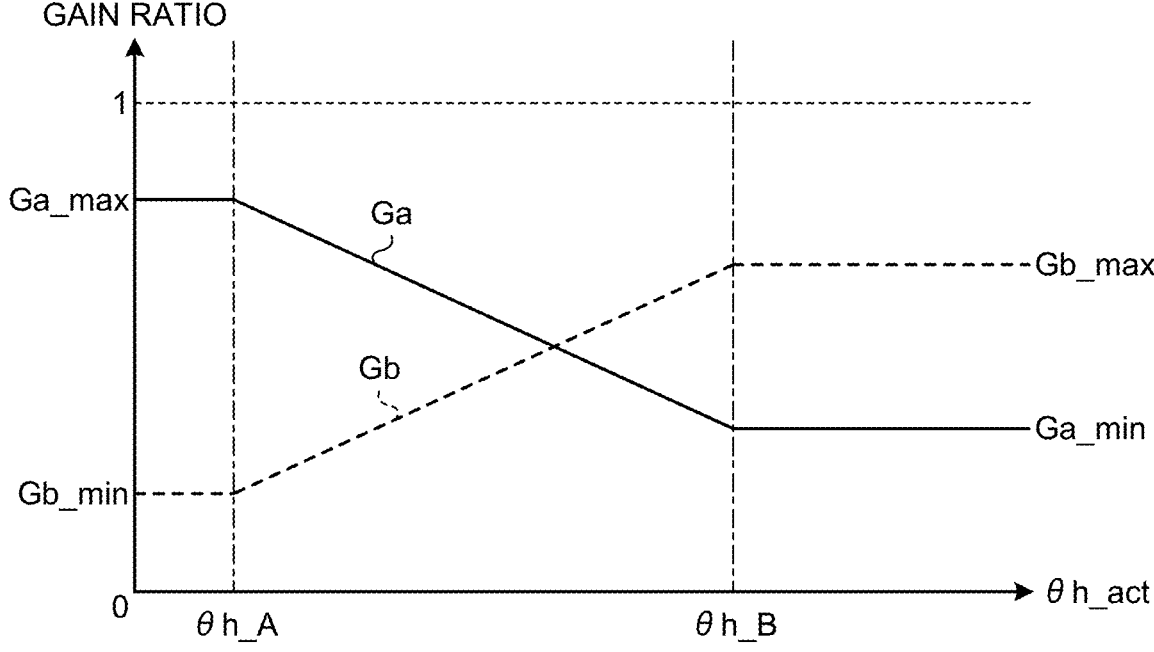
FIG. 21 is a diagram conceptually illustrating an example of a gain ratio setting example in a gain ratio generation unit according to the second embodiment.

Hereinafter, a configuration and an operation according to a second embodiment capable of imparting a steering feeling depending on a situation of the road surface and a state of the vehicle will be described with reference to FIGS. 20 and 21. FIG. 20 is a diagram illustrating an example of a control block configuration of a control device according to the second embodiment. FIG. 21 is a diagram conceptually illustrating an example of a gain ratio setting example in a gain ratio generation unit according to the second embodiment.

In the present embodiment, the first gain Ga and the second gain Gb are generated using the actual steering angle θh_act as a parameter. As illustrated in FIG. 20, the actual steering angle θh_act is input to a gain ratio generation unit 230a of a steering torque target value generation unit 200a according to the second embodiment. The gain ratio generation unit 230a generates the first gain Ga that increases or decreases depending on the actual steering angle θh_act and the second gain Gb in which the sum of the first gain Ga and the second gain Gb is 1. The first gain Ga is multiplied by the torque value Tref_a (the first torque value) by the multiplication unit 261. The second gain Gb is multiplied by the reaction force motor current compensation value Iref_d by the multiplication unit 262.

The gain ratio generation unit 230a monotonically reduces the first gain Ga to be multiplied by the torque value Tref_a (the first torque value) within the range from a first steering angle θh_A or more to a second steering angle θh_B or less. Accordingly, the second gain Gb to be multiplied by the reaction force motor current compensation value Iref_d monotonically increases within the range from the first steering angle θh_A or more to the second steering angle θh_B or less. The first steering angle θh_A is, for example, 3 [deg]. The second steering angle θh_B is, for example, 20 [deg]. The present disclosure is not limited by the respective values of the first steering angle θh_A and the second steering angle θh_B.

FIG. 21 illustrates an example in which the maximum value Ga_max of the first gain Ga in the range of the first steering angle θh_A or less is larger than the maximum value Gb_max of the second gain Gb in the range of the second steering angle θh_B or more. In this case, the minimum value Gb_min of the second gain Gb in the range of the first steering angle θh_A or less is larger than the minimum value Ga_min of the first gain Ga in the range of the second steering angle θh_B or more.

It is noted that the maximum value Ga_max of the first gain Ga in the range of the first steering angle θh_A or less may be smaller than the maximum value Gb_max of the second gain Gb in the range of the second steering angle θh_B or more, and the minimum value Gb_min of the second gain Gb in the range of the first steering angle θh_A or less may be smaller than the minimum value Ga_min of the first gain Ga in the range of the second steering angle θh_B or more.

In addition, the maximum value Ga_max of the first gain Ga in the range of the first steering angle θh_A or less may be equal to the maximum value Gb_max of the second gain Gb in the range of the second steering angle θh_B or more, and the minimum value Gb_min of the second gain Gb in the range of the first steering angle θh_A or less may be equal to the minimum value Ga_min of the first gain Ga in the range of the second steering angle θh_B or more.

Each value and magnitude relationship of the maximum value Ga_max of the first gain Ga, the minimum value Ga_min of the first gain Ga, the maximum value Gb_max of the second gain Gb, and the minimum value Gb_min of the second gain Gb may be appropriately set according to the motion performance of the vehicle on which the control device 50 according to the present disclosure is mounted, vehicle specifications, and the like.

The steering torque target value generation unit 200a adds (addition units 271, 272, and 273) the torque value Ga×Tref_a obtained by multiplying the torque value Tref_a (the first torque value) output from the steering reaction force torque value generation unit 210 by the first gain Ga (the multiplication unit 261), the torque value Tref_b output from the damping torque value generation unit 240, and the torque compensation value Tref_c output from the hysteresis compensation unit 250, and outputs a result value as the steering torque target value Th_ref. The steering torque control unit 400 adds a current compensation value Gb×Iref_d obtained by multiplying the reaction force motor current compensation value Iref_d output from the road surface reaction force adaptive current compensation value generation unit 220 by the second gain Gb (the multiplication unit 262) to the first reaction force motor current command value Ih_ref0, and outputs the first reaction force motor current command value Ih_ref0 as the second reaction force motor current command value Ih_ref in which upper and lower limit values of the first reaction force motor current command value Ih_ref0 are limited by the output limitation unit.

In the second embodiment, steering reaction force corresponding to the road surface reaction force torque estimation value Tsat_est can be applied to the steering wheel 1 at a ratio corresponding to the actual steering angle θh_act. Specifically, the steering torque target value generation unit 200a generates the steering torque target value Th_ref by multiplying the torque value Tref_a (the first torque value) output from the steering reaction force torque value generation unit 210 by a relatively large first gain Ga in a region where the actual steering angle θh_act is relatively small, and generates the steering torque target value Th_ref by multiplying the reaction force motor current compensation value Iref_d output from the road surface reaction force adaptive current compensation value generation unit 220 by a relatively large second gain Gb in a region where the actual steering angle θh_act is relatively large. As a result, it is possible to obtain a steering feeling reflecting the situation of the road surface and the actual steering angle θh_act.

It is noted that the gain ratio setting example in the gain ratio generation unit 230a according to the second embodiment is an example, and is not limited to the mode illustrated in FIG. 21 described above. For example, within the range from the first steering angle θh_A or more to the second steering angle θh_B or less, the first gain Ga to be multiplied by the torque value Tref_a (the first torque value) may gradually decrease as the actual steering angle θh_act increases, and accordingly, the second gain Gb to be multiplied by the reaction force motor current compensation value Iref_d may gradually increase as the actual steering angle θh_act increases. In addition, for example, within the range of the first steering angle θh_A or more and the second steering angle θh_B or less, the first gain Ga to be multiplied by the torque value Tref_a (the first torque value) may gradually increase as the actual steering angle θh_act decreases, and accordingly, the second gain Gb to be multiplied by the reaction force motor current compensation value Iref_d may gradually decrease as the actual steering angle θh_act decreases.

Third Embodiment

Figure 22:
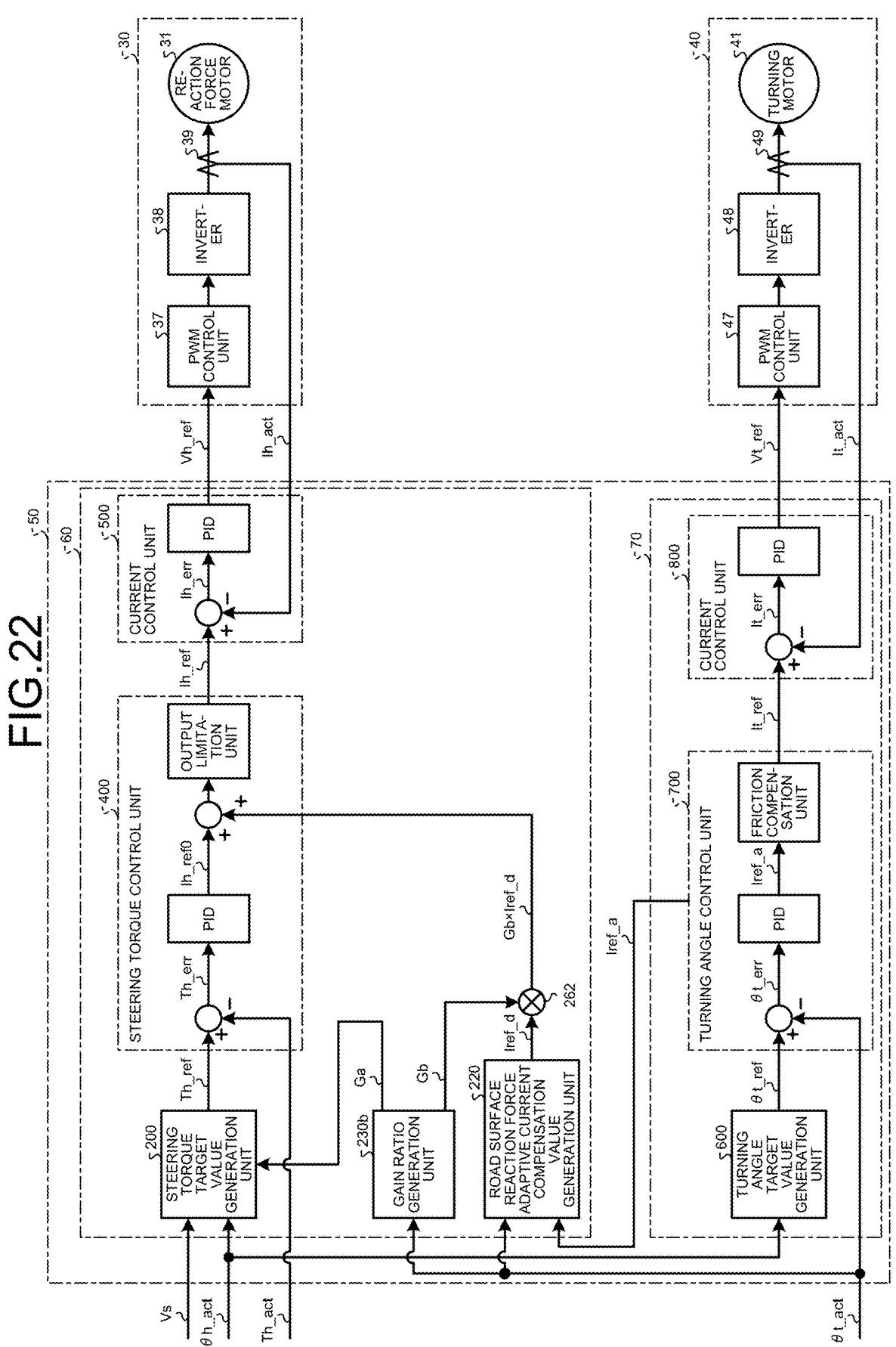
FIG. 22 is a diagram illustrating an example of a control block configuration of a control device according to a third embodiment.
Figure 23:
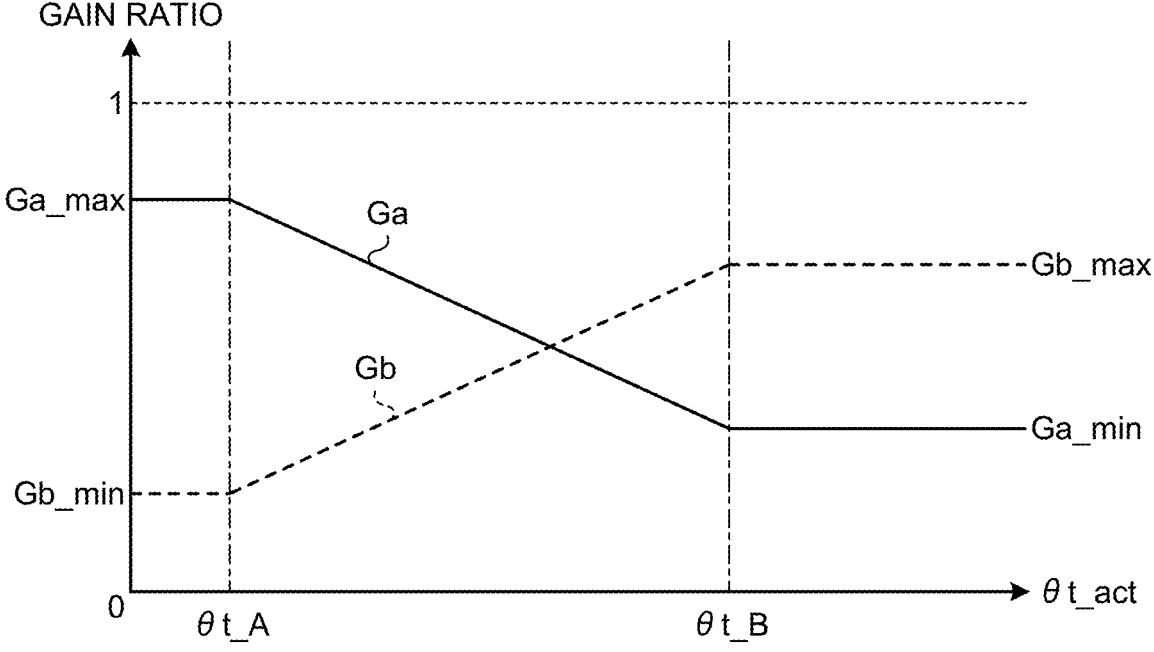
FIG. 23 is a diagram conceptually illustrating an example of a gain ratio setting example in a gain ratio generation unit according to the third embodiment.

Hereinafter, a configuration and an operation according to a third embodiment capable of imparting a steering feeling depending on a situation of the road surface and a state of the vehicle will be described with reference to FIGS. 22 and 23. FIG. 22 is a diagram illustrating an example of a control block configuration of a control device according to the third embodiment. FIG. 23 is a diagram conceptually illustrating an example of a gain ratio setting example in a gain ratio generation unit according to the third embodiment.

In the present embodiment, the first gain Ga and the second gain Gb are generated using the actual turning angle θt_act as a parameter. As illustrated in FIG. 22, the actual turning angle θt_act is input to a gain ratio generation unit 230b of a steering torque target value generation unit 200b according to the third embodiment. The gain ratio generation unit 230b generates the first gain Ga that increases or decreases depending on the actual turning angle θt_act and the second gain Gb in which the sum of the first gain Ga and the second gain Gb is 1. The first gain Ga is multiplied by the torque value Tref_a (the first torque value) by the multiplication unit 261 in the steering torque target value generation unit 200. The second gain Gb is multiplied by the reaction force motor current compensation value Iref_d by the multiplication unit 262.

The gain ratio generation unit 230b monotonically reduces the first gain Ga to be multiplied by the torque value Tref_a (the first torque value) within the range from a first turning angle θt_A or more to a second turning angle θt_B or less. Accordingly, the second gain Gb to be multiplied by the reaction force motor current compensation value Iref_d monotonically increases within the range from the first turning angle θt_A or more to the second turning angle θt_B or less. The first turning angle θt_A is, for example, 3 [deg]. The second turning angle θt_B is, for example, 20 [deg]. The present disclosure is not limited by the respective values of the first turning angle θt_A and the second turning angle θt_B.

FIG. 23 illustrates an example in which the maximum value Ga_max of the first gain Ga in the range of the first turning angle θt_A or less is larger than the maximum value Gb_max of the second gain Gb in the range of the second turning angle θt_B or more. In this case, the minimum value Gb_min of the second gain Gb in the range of the first turning angle θt_A or less is larger than the minimum value Ga_min of the first gain Ga in the range of the second turning angle θt_B or more.

It is noted that the maximum value Ga_max of the first gain Ga in the range of the first turning angle θt_A or less may be smaller than the maximum value Gb_max of the second gain Gb in the range of the second turning angle θt_B or more, and the minimum value Gb_min of the second gain Gb in the range of the first turning angle θt_A or less may be smaller than the minimum value Ga_min of the first gain Ga in the range of the second turning angle θt_B or more.

It is noted that the maximum value Ga_max of the first gain Ga in the range of the first turning angle θt_A or less may be equal to the maximum value Gb_max of the second gain Gb in the range of the second turning angle θt_B or more, and the minimum value Gb_min of the second gain Gb in the range of the first turning angle θt_A or less may be equal to the minimum value Ga_min of the first gain Ga in the range of the second turning angle θt_B or more.

Each value and magnitude relationship of the maximum value Ga_max of the first gain Ga, the minimum value Ga_min of the first gain Ga, the maximum value Gb_max of the second gain Gb, and the minimum value Gb_min of the second gain Gb may be appropriately set according to the motion performance of the vehicle on which the control device 50 according to the present disclosure is mounted, vehicle specifications, and the like.

The steering torque target value generation unit 200b adds (addition units 271, 272, and 273) the torque value Ga×Tref_a obtained by multiplying the torque value Tref_a (the first torque value) output from the steering reaction force torque value generation unit 210 by the first gain Ga (the multiplication unit 261), the torque value Tref_b output from the damping torque value generation unit 240, and the torque compensation value Tref_c output from the hysteresis compensation unit 250, and outputs a result value as the steering torque target value Th_ref. The steering torque control unit 400 adds a current compensation value Gb×Iref_d obtained by multiplying the reaction force motor current compensation value Iref_d output from the road surface reaction force adaptive current compensation value generation unit 220 by the second gain Gb (the multiplication unit 262) to the first reaction force motor current command value Ih_ref0, and outputs the first reaction force motor current command value Ih_ref0 as the second reaction force motor current command value Ih_ref in which upper and lower limit values of the first reaction force motor current command value Ih_ref0 are limited by the output limitation unit.

In the third embodiment, steering reaction force corresponding to the road surface reaction force torque estimation value Tsat_est can be applied to the steering wheel 1 at a ratio corresponding to the actual turning angle θt_act. Specifically, the steering torque target value generation unit 200b generates the steering torque target value Th_ref by multiplying the torque value Tref_a (the first torque value) output from the steering reaction force torque value generation unit 210 by a relatively large first gain Ga in a region where the actual turning angle θt_act is relatively small, and generates the second reaction force motor current command value Ih_ref by multiplying the reaction force motor current compensation value Iref_d output from the road surface reaction force adaptive current compensation value generation unit 220 by a relatively large second gain Gb in a region where the actual turning angle θt_act is relatively large. As a result, it is possible to obtain a steering feeling reflecting the situation of the road surface and the actual turning angle θt_act.

It is noted that the gain ratio setting example in the gain ratio generation unit 230b according to the third embodiment is an example, and is not limited to the mode illustrated in FIG. 23 described above. For example, within the range from the first turning angle θt_A or more to the second turning angle θt_B or less, the first gain Ga to be multiplied by the torque value Tref_a (the first torque value) may gradually decrease as the actual turning angle θt_act increases, and accordingly, the second gain Gb to be multiplied by the reaction force motor current compensation value Iref_d may gradually increase as the actual turning angle θt_act increases. Additionally, for example, within the range from the first turning angle θt_A or more to the second turning angle θt_B or less, the first gain Ga to be multiplied by the torque value Tref_a (the first torque value) may gradually increase as the actual turning angle θt_act increases, and accordingly, the second gain Gb to be multiplied by the reaction force motor current compensation value Iref_d may gradually decrease as the actual turning angle θt_act decreases.

Fourth Embodiment

Figure 24:
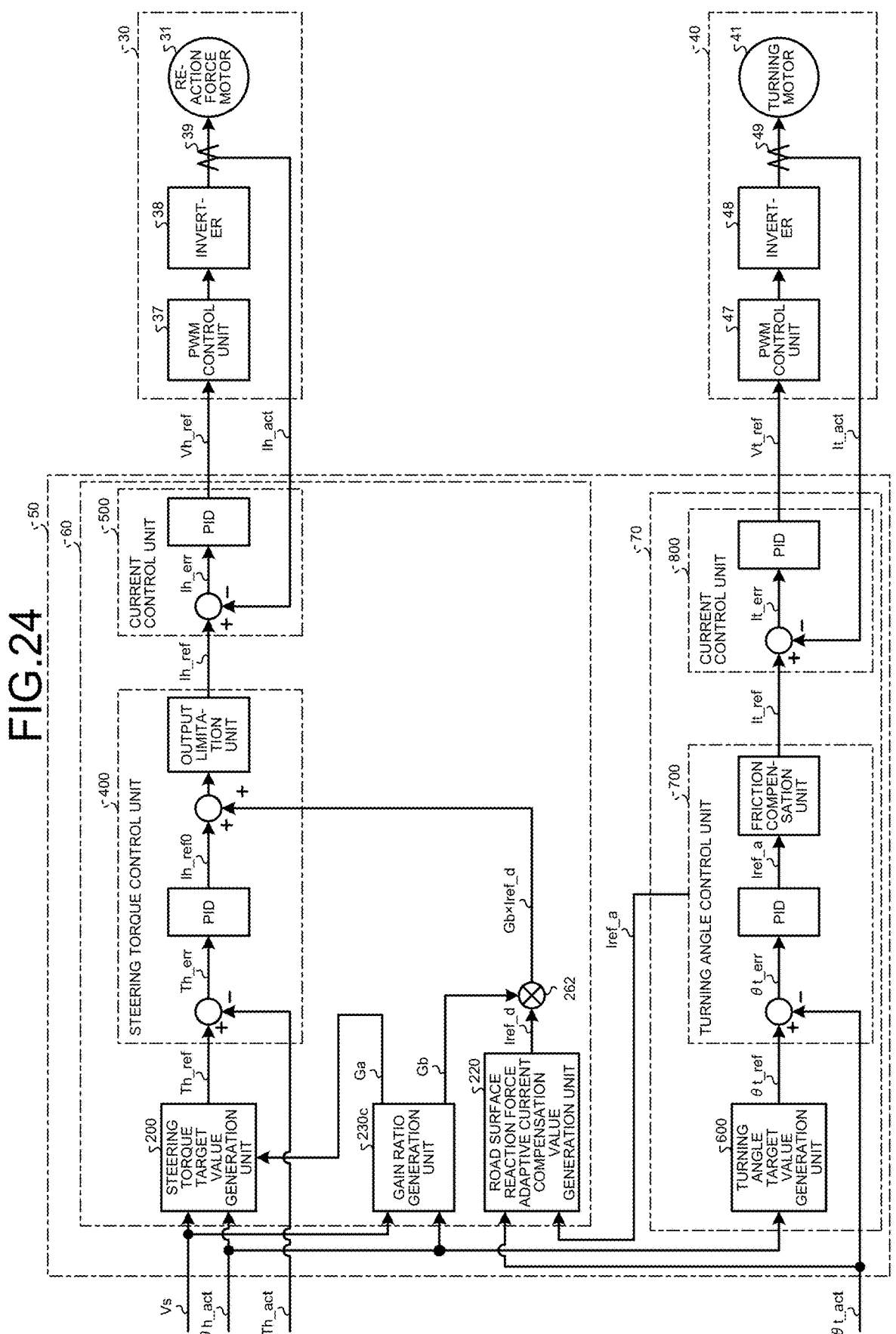
FIG. 24 is a diagram illustrating an example of a control block configuration of a control device according to a fourth embodiment.
Figure 25:
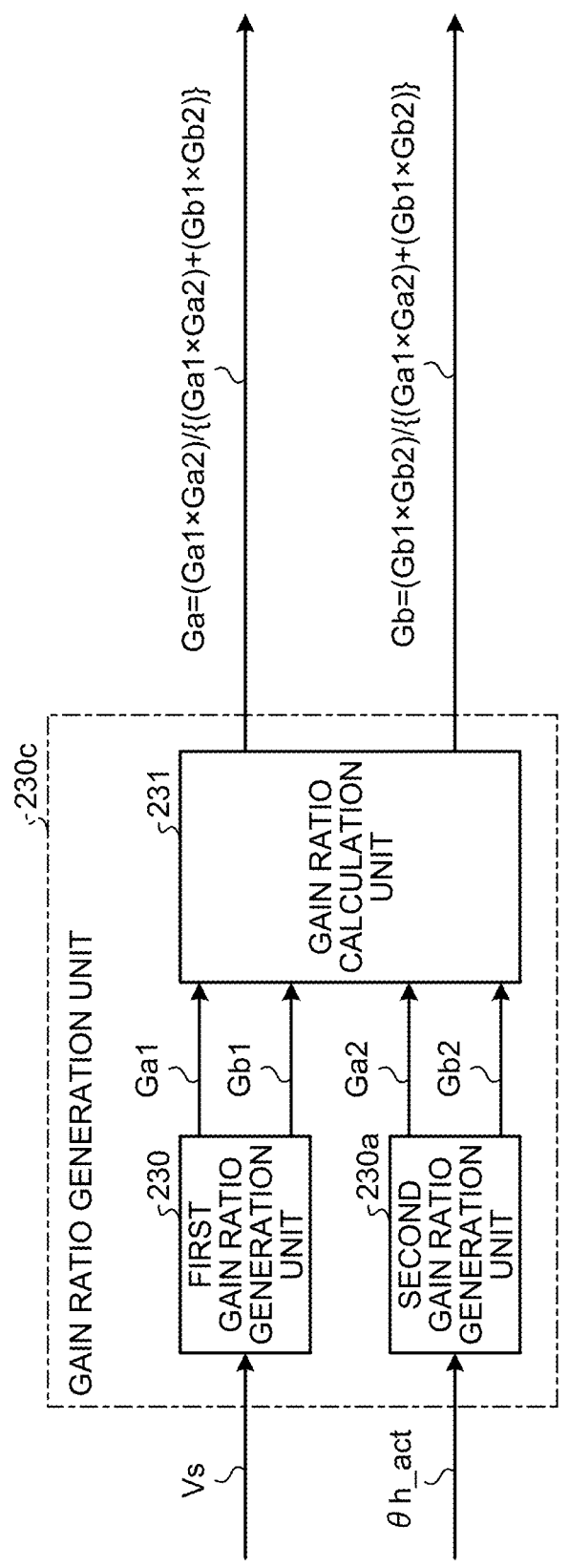
FIG. 25 is a block diagram illustrating a configuration example of a gain ratio generation unit according to the fourth embodiment.
Figure 26A:
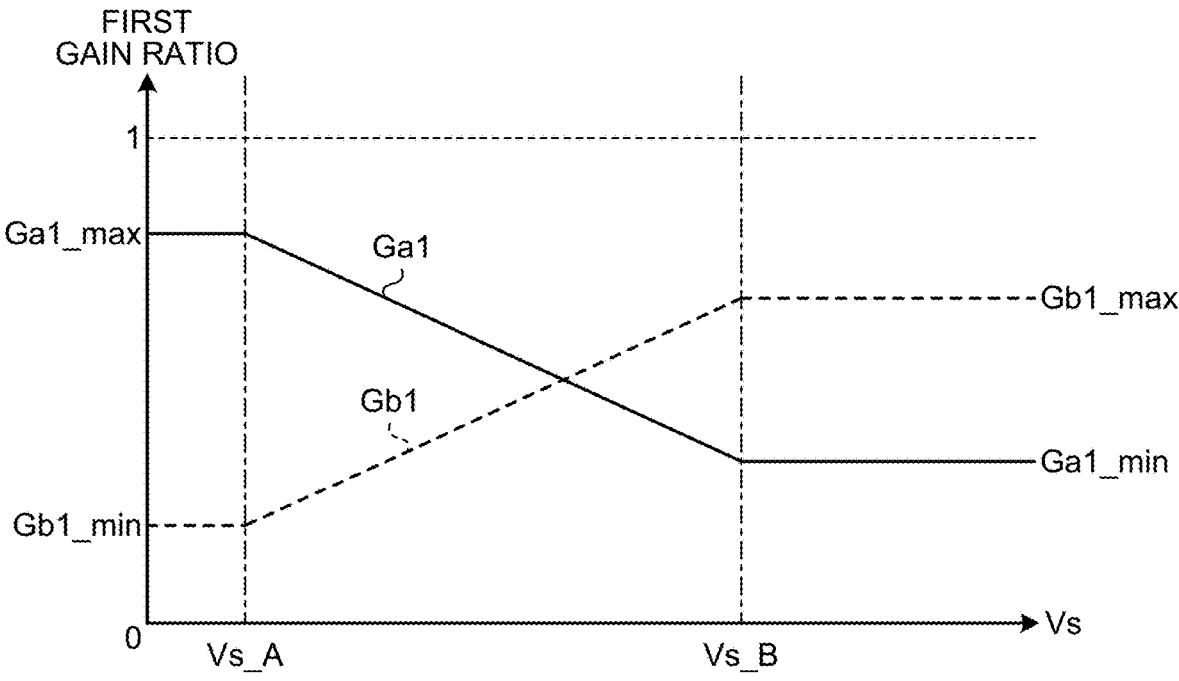
FIG. 26A is a diagram conceptually illustrating an example of a gain ratio setting example in the gain ratio generation unit according to the fourth embodiment.
Figure 26B:
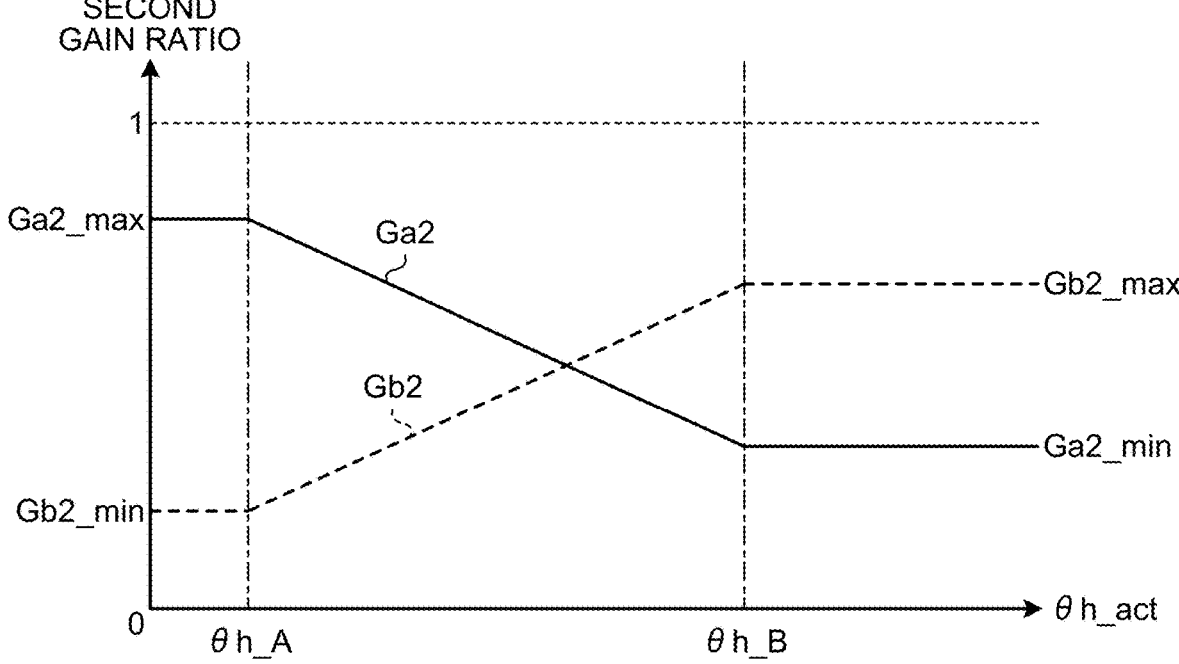
FIG. 26B is a diagram conceptually illustrating an example of the gain ratio setting example in the gain ratio generation unit according to the fourth embodiment.

Hereinafter, a configuration and an operation according to a fourth embodiment capable of imparting a steering feeling depending on the situation of the road surface and the state of the vehicle will be described with reference to FIGS. 24, 25, 26A, and 26B. FIG. 24 is a diagram illustrating an example of a control block configuration of a control device according to the fourth embodiment. FIG. 25 is a block diagram illustrating a configuration example of a gain ratio generation unit according to the fourth embodiment. FIGS. 26A and 26B are diagrams each conceptually illustrating an example of a gain ratio setting example in the gain ratio generation unit according to the fourth embodiment.

In the present embodiment, the first gain Ga and the second gain Gb are generated using the vehicle speed Vs and the actual steering angle θh_act as parameters. As illustrated in FIG. 24, the vehicle speed Vs and the actual steering angle θh_act are input to a gain ratio generation unit 230c of a steering torque target value generation unit 200c according to the fourth embodiment. As illustrated in FIG. 25, the gain ratio generation unit 230c includes a first gain ratio generation unit 230, a second gain ratio generation unit 230a, and a gain ratio calculation unit 231.

The first gain ratio generation unit 230 of the gain ratio generation unit 230c is substantially the same component as the gain ratio generation unit 230 according to the first embodiment. The gain ratio generation unit 230 generates a first gain Ga1 that increases or decreases depending on the vehicle speed Vs and a second gain Gb1 in which the sum of the first gain Ga1 and the second gain Gb1 is 1.

The first gain ratio generation unit 230 monotonically reduces the first gain Ga1 within the range from the first vehicle speed Vs_A or higher to the second vehicle speed Vs_B or less. Accordingly, the second gain Gb1 monotonically increases within the range from the first vehicle speed Vs_A or higher to the second vehicle speed Vs_B or less. The first vehicle speed Vs_A is, for example, 5 [km/h]. The second vehicle speed Vs_B is, for example, 30 [km/h]. The present disclosure is not limited by the respective values of the first vehicle speed Vs_A and the second vehicle speed Vs_B.

FIG. 26A illustrates an example in which the maximum value Ga1_max of the first gain Ga1 in the range of the first vehicle speed Vs_A or lower is larger than the maximum value Gb1_max of the second gain Gb1 in the range of the second vehicle speed Vs_B or higher. In this case, the minimum value Gb1_min of the second gain Gb1 in the range of the first vehicle speed Vs_A or lower is larger than the minimum value Ga1_min of the first gain Ga1 in the range of the second vehicle speed Vs_B or higher.

It is noted that the maximum value Ga1_max of the first gain Ga1 in the range of the first vehicle speed Vs_A or lower may be smaller than the maximum value Gb1_max of the second gain Gb1 in the range of the second vehicle speed Vs_B or higher, and the minimum value Gb1_min of the second gain Gb1 in the range of the first vehicle speed Vs_A or lower may be smaller than the minimum value Ga1_min of the first gain Ga1 in the range of the second vehicle speed Vs_B or higher.

Further, it is noted that the maximum value Ga1_max of the first gain Ga1 in the range of the first vehicle speed Vs_A or lower may be equal to the maximum value Gb1_max of the second gain Gb1 in the range of the second vehicle speed Vs_B or higher, and the minimum value Gb1_min of the second gain Gb1 in the range of the first vehicle speed Vs_A or lower may be equal to the minimum value Ga1_min of the first gain Ga1 in the range of the second vehicle speed Vs_B or higher.

Each value and magnitude relationship of the maximum value Ga_max of the first gain Ga, the minimum value Ga_min of the first gain Ga, the maximum value Gb_max of the second gain Gb, and the minimum value Gb_min of the second gain Gb may be appropriately set according to the motion performance of the vehicle on which the control device 50 according to the present disclosure is mounted, vehicle specifications, and the like.

The second gain ratio generation unit 230a of the gain ratio generation unit 230c is substantially the same component as the gain ratio generation unit 230a according to the second embodiment. The second gain ratio generation unit 230a generates a first gain Ga2 that increases or decreases depending on the actual turning angle θt_act and a second gain Gb2 in which the sum of the first gain Ga2 and the second gain Gb2 is 1.

The second gain ratio generation unit 230a monotonically reduces the first gain Ga2 within the range from the first steering angle θh_A or more to the second steering angle θh_B or less. Accordingly, the second gain Gb2 monotonically increases within the range from the first steering angle θh_A or more to the second steering angle θh_B or less. The first steering angle θh_A is, for example, 3 [deg]. The second steering angle θh_B is, for example, 20 [deg]. The present disclosure is not limited by the respective values of the first steering angle θh_A and the second steering angle θh_B.

FIG. 26B illustrates an example in which the maximum value Ga2_max of the first gain Ga2 in the range of the first steering angle θh_A or less is larger than the maximum value Gb2_max of the second gain Gb2 in the range of the second steering angle θh_B or more. In this case, the minimum value Gb2_min of the second gain Gb2 in the range of the first steering angle θh_A or less is larger than the minimum value Ga2_min of the first gain Ga2 in the range of the second steering angle θh_B or more.

It is noted that the maximum value Ga2_max of the first gain Ga2 in the range of the first steering angle θh_A or less may be smaller than the maximum value Gb2_max of the second gain Gb2 in the range of the second steering angle θh_B or more, and the minimum value Gb2_min of the second gain Gb2 in the range of the first steering angle θh_A or less may be smaller than the minimum value Ga2_min of the first gain Ga2 in the range of the second steering angle θh_B or more.

In addition, the maximum value Ga2_max of the first gain Ga2 in the range of the first steering angle θh_A or less may be equal to the maximum value Gb2_max of the second gain Gb2 in the range of the second steering angle θh_B or more, and the minimum value Gb2_min of the second gain Gb2 in the range of the first steering angle θh_A or less may be equal to the minimum value Ga2_min of the first gain Ga2 in the range of the second steering angle θh_B or more.

The gain ratio calculation unit 231 receives the first gain Ga1 and the second gain Gb1 output from the first gain ratio generation unit 230, and the first gain Ga2 and the second gain Gb2 output from the second gain ratio generation unit 230a. The gain ratio calculation unit 231 calculates the first gain Ga by using the following formula (14) and calculates the second gain Gb by using the following formula (15).

$$Ga = (Ga1 \times Ga2)/\{(Ga1 \times Ga2) + (Gb1 \times Gb2)\} \qquad (14)$$

$$Gb = (Ga1 \times Ga2)/\{(Ga1 \times Ga2) + (Gb1 \times Gb2)\} \qquad (15)$$

The first gain Ga is multiplied by the torque value Tref_a (the first torque value) by the multiplication unit 261. The second gain Gb is multiplied by the reaction force motor current compensation value Iref_d by the multiplication unit 262.

The steering torque target value generation unit 200c adds (addition units 271, 272, and 273) the torque value Ga×Tref_a obtained by multiplying the torque value Tref_a (the first torque value) output from the steering reaction force torque value generation unit 210 by the first gain Ga (the multiplication unit 261), the torque value Tref_b output from the damping torque value generation unit 240, and the torque compensation value Tref_c output from the hysteresis compensation unit 250, and outputs a result value as the steering torque target value Th_ref. The steering torque control unit 400 adds a current compensation value Gb×Iref_d obtained by multiplying the reaction force motor current compensation value Iref_d output from the road surface reaction force adaptive current compensation value generation unit 220 by the second gain Gb (the multiplication unit 262) to the first reaction force motor current command value Ih_ref0, and outputs the first reaction force motor current command value Ih_ref0 as the second reaction force motor current command value Ih_ref in which upper and lower limit values of the first reaction force motor current command value Ih_ref0 are limited by the output limitation unit.

In the fourth embodiment, steering reaction force corresponding to the road surface reaction force torque estimation value Tsat_est can be applied to the steering wheel 1 at a ratio corresponding to both the vehicle speed Vs and the actual steering angle θh_act. Specifically, the steering torque target value generation unit 200c generates the steering torque target value Th_ref by multiplying the torque value Tref_a (the first torque value) output from the steering reaction force torque value generation unit 210 by a relatively large first gain Ga in a region where the vehicle speed Vs or the actual steering angle θh_act is relatively small, and generates the second reaction force motor current command value Ih_ref by multiplying the reaction force motor current compensation value Iref_d output from the road surface reaction force adaptive current compensation value generation unit 220 by a relatively large second gain Gb in a region where the vehicle speed Vs or the actual steering angle θh_act is relatively large. As a result, it is possible to obtain a steering feeling reflecting the situation of the road surface, the vehicle speed Vs, and the actual steering angle θh_act.

It is noted that the gain ratio setting example in the first gain ratio generation unit 230 according to the fourth embodiment is an example, and is not limited to the mode illustrated in FIG. 26A described above. For example, within the range from the first vehicle speed Vs_A or higher to the second vehicle speed Vs_B or lower, the first gain Ga1 may gradually decrease as the vehicle speed Vs increases, and accordingly, the second gain Gb1 may gradually increase as the vehicle speed Vs increases. Additionally, for example, within the range from the first vehicle speed Vs_A or higher to the second vehicle speed Vs_B or lower, the first gain Ga1 may gradually increase as the vehicle speed Vs decreases, and accordingly, the second gain Gb1 may gradually decrease as the vehicle speed Vs decreases.

Additionally, the gain ratio setting example in the second gain ratio generation unit 230a according to the fourth embodiment is an example, and is not limited to the mode illustrated in FIG. 26B described above. For example, within the range from the first steering angle θh_A or more to the second steering angle θh_B or less, the first gain Ga2 may gradually decrease as the actual steering angle θh_act increases, and accordingly, the second gain Gb2 may gradually increase as the actual steering angle θh_act increases. Further, for example, within the range from the first steering angle θh_A or more to the second steering angle θh_B or less, the first gain Ga2 may gradually increase as the actual steering angle θh_act decreases, and accordingly, the second gain Gb2 may gradually decrease as the actual steering angle θh_act decreases.

Fifth Embodiment

Figure 27:
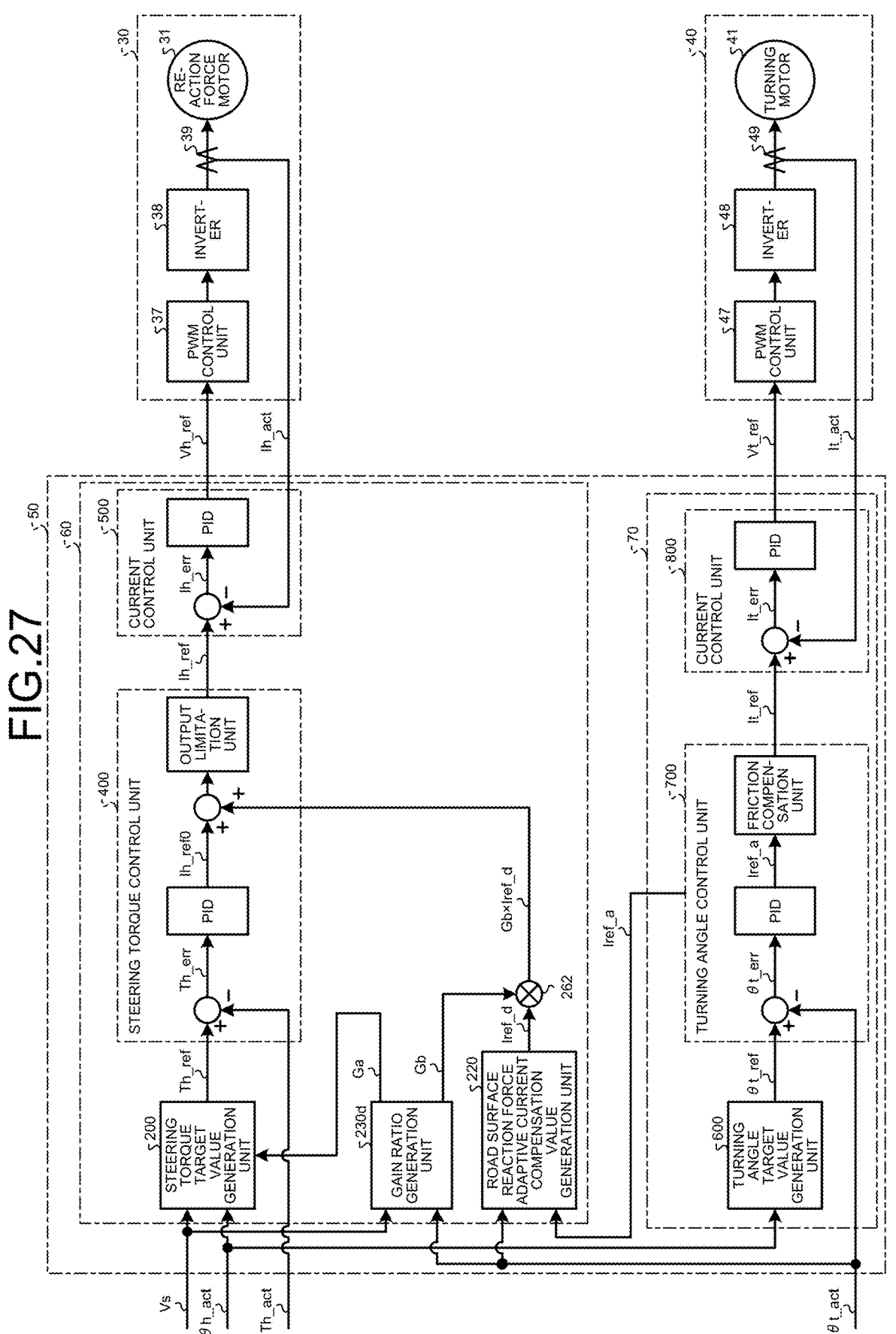
FIG. 27 is a diagram illustrating an example of a control block configuration of a control device according to a fifth embodiment.
Figure 29A:
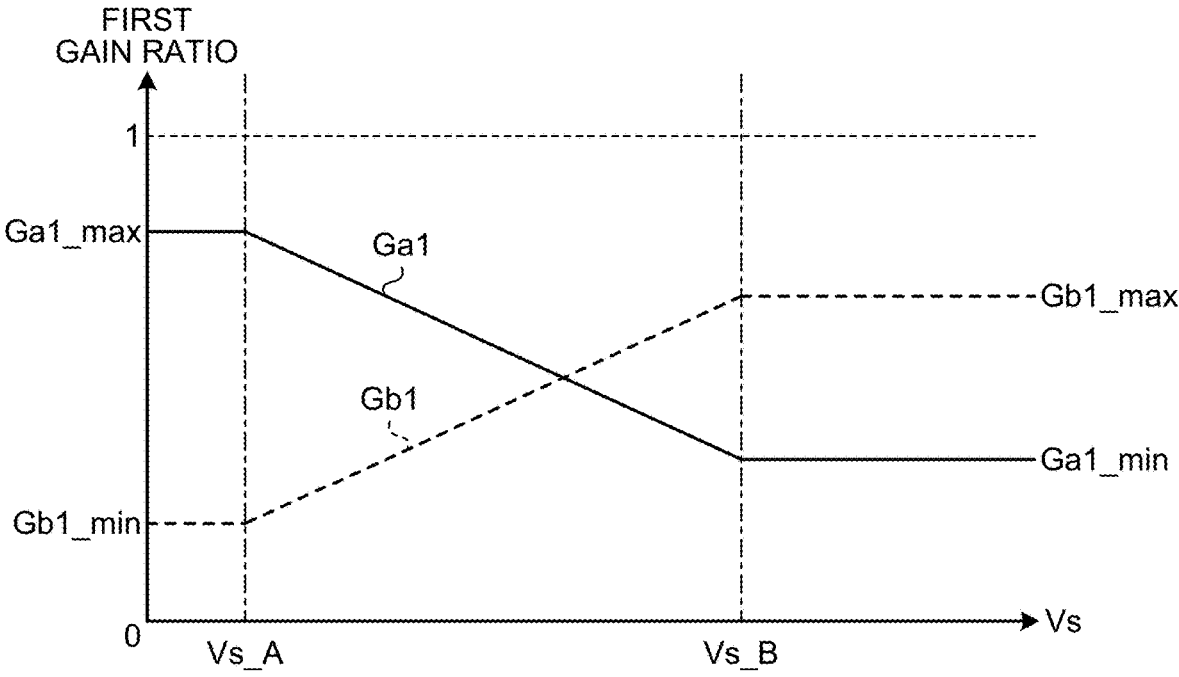
FIG. 29A is a diagram conceptually illustrating an example of a gain ratio setting example in the gain ratio generation unit according to the fifth embodiment.
Figure 29B:
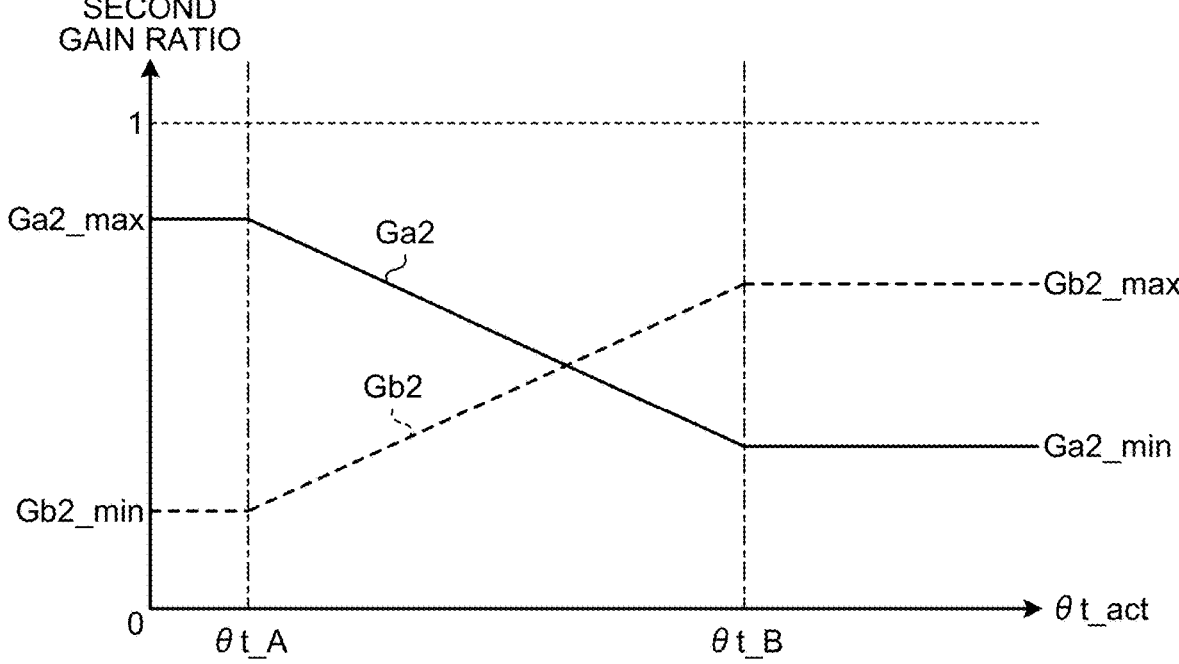
FIG. 29B is a diagram conceptually illustrating an example of the gain ratio setting example in the gain ratio generation unit according to the fifth embodiment.

Hereinafter, a configuration and an operation according to a fifth embodiment capable of imparting a steering feeling depending on the situation of the road surface and the state of the vehicle will be described with reference to FIGS. 27, 28, 29A, and 29B. FIG. 27 is a diagram illustrating an example of a control block configuration of a control device according to the fifth embodiment. FIG. 28 is a block diagram illustrating a configuration example of a gain ratio generation unit according to the fifth embodiment. FIGS. 29A and 29B are diagrams each conceptually illustrating an example of a gain ratio setting example in the gain ratio generation unit according to the fifth embodiment.

In the present embodiment, the first gain Ga and the second gain Gb are generated using the vehicle speed Vs and the actual turning angle θt_act as parameters. As illustrated in FIG. 27, the vehicle speed Vs and the actual turning angle θt_act are input to a gain ratio generation unit 230d of a steering torque target value generation unit 200d according to the fifth embodiment. As illustrated in FIG. 25, the gain ratio generation unit 230d includes a first gain ratio generation unit 230, a second gain ratio generation unit 230b, and a gain ratio calculation unit 231.

The first gain ratio generation unit 230 of the gain ratio generation unit 230d is substantially the same component as the gain ratio generation unit 230 according to the first embodiment. The gain ratio generation unit 230 generates a first gain Ga1 that increases or decreases depending on the vehicle speed Vs and a second gain Gb1 in which the sum of the first gain Ga1 and the second gain Gb1 is 1.

The first gain ratio generation unit 230 monotonically reduces the first gain Ga1 within the range from the first vehicle speed Vs_A or higher to the second vehicle speed Vs_B or less. Accordingly, the second gain Gb1 monotonically increases within the range from the first vehicle speed Vs_A or higher to the second vehicle speed Vs_B or less. The first vehicle speed Vs_A is, for example, 5 [km/h]. The second vehicle speed Vs_B is, for example, 30 [km/h]. The present disclosure is not limited by the respective values of the first vehicle speed Vs_A and the second vehicle speed Vs_B.

FIG. 29A illustrates an example in which the maximum value Ga1_max of the first gain Ga1 in the range of the first vehicle speed Vs_A or lower is larger than the maximum value Gb1_max of the second gain Gb1 in the range of the second vehicle speed Vs_B or higher. In this case, the minimum value Gb1_min of the second gain Gb1 in the range of the first vehicle speed Vs_A or lower is larger than the minimum value Ga1_min of the first gain Ga1 in the range of the second vehicle speed Vs_B or higher.

It is noted that the maximum value Ga1_max of the first gain Ga1 in the range of the first vehicle speed Vs_A or lower may be smaller than the maximum value Gb1_max of the second gain Gb1 in the range of the second vehicle speed Vs_B or higher, and the minimum value Gb1_min of the second gain Gb1 in the range of the first vehicle speed Vs_A or lower may be smaller than the minimum value Ga1_min of the first gain Ga1 in the range of the second vehicle speed Vs_B or higher.

Further, it is noted that the maximum value Ga1_max of the first gain Ga1 in the range of the first vehicle speed Vs_A or lower may be equal to the maximum value Gb1_max of the second gain Gb1 in the range of the second vehicle speed Vs_B or higher, and the minimum value Gb1_min of the second gain Gb1 in the range of the first vehicle speed Vs_A or lower may be equal to the minimum value Ga1_min of the first gain Ga1 in the range of the second vehicle speed Vs_B or higher.

Each value and magnitude relationship of the maximum value Ga_max of the first gain Ga, the minimum value Ga_min of the first gain Ga, the maximum value Gb_max of the second gain Gb, and the minimum value Gb_min of the second gain Gb may be appropriately set according to the motion performance of the vehicle on which the control device 50 according to the present disclosure is mounted, vehicle specifications, and the like.

The second gain ratio generation unit 230b of the gain ratio generation unit 230c is substantially the same component as the gain ratio generation unit 230b according to the third embodiment. The second gain ratio generation unit 230b generates the first gain Ga2 that increases or decreases depending on the actual turning angle θt_act and the second gain Gb2 in which the sum of the first gain Ga2 and the second gain Gb2 is 1.

The second gain ratio generation unit 230b monotonically reduces the first gain Ga2 within the range from the first turning angle θt_A or more to the second turning angle θt_B or less. Accordingly, the second gain Gb2 monotonically increases within the range from the first turning angle θt_A or more to the second turning angle θt_B or less. The first turning angle θt_A is, for example, 3 [deg]. The second turning angle θt_B is, for example, 20 [deg]. The present disclosure is not limited by the respective values of the first turning angle θt_A and the second turning angle θt_B.

FIG. 29B illustrates an example in which the maximum value Ga2_max of the first gain Ga2 in the range of the first turning angle θt_A or less is larger than the maximum value Gb2_max of the second gain Gb2 in the range of the second turning angle θt_B or more. In this case, the minimum value Gb2_min of the second gain Gb2 in the range of the first turning angle θt_A or less is larger than the minimum value Ga2_min of the first gain Ga2 in the range of the second turning angle θt_B or more.

It is noted that the maximum value Ga2_max of the first gain Ga2 in the range of the first turning angle θt_A or less may be smaller than the maximum value Gb2_max of the second gain Gb2 in the range of the second turning angle θt_B or more, and the minimum value Gb2_min of the second gain Gb2 in the range of the first turning angle θt_A or less may be smaller than the minimum value Ga2_min of the first gain Ga2 in the range of the second turning angle θt_B or more.

Further, the maximum value Ga2_max of the first gain Ga2 in the range of the first turning angle θt_A or less may be equal to the maximum value Gb2_max of the second gain Gb2 in the range of the second turning angle θt_B or more, and the minimum value Gb2_min of the second gain Gb2 in the range of the first turning angle θt_A or less may be equal to the minimum value Ga2_min of the first gain Ga2 in the range of the second turning angle θt_B or more.

The gain ratio calculation unit 231 calculates the first gain Ga and the second gain Gb using the formulas (14) and (15) described in the fourth embodiment.

The first gain Ga is multiplied by the torque value Tref_a (the first torque value) by the multiplication unit 261. The second gain Gb is multiplied by the reaction force motor current compensation value Iref_d by the multiplication unit 262.

The steering torque target value generation unit 200d adds (addition units 271, 272, and 273) the torque value Ga×Tref_a obtained by multiplying the torque value Tref_a (the first torque value) output from the steering reaction force torque value generation unit 210 by the first gain Ga (the multiplication unit 261), the torque value Tref_b output from the damping torque value generation unit 240, and the torque compensation value Tref_c output from the hysteresis compensation unit 250, and outputs a result value as the steering torque target value Th_ref. The steering torque control unit 400 adds a current compensation value Gb×Iref_d obtained by multiplying the reaction force motor current compensation value Iref_d output from the road surface reaction force adaptive current compensation value generation unit 220 by the second gain Gb (the multiplication unit 262) to the first reaction force motor current command value Ih_ref0, and outputs the first reaction force motor current command value Ih_ref0 as the second reaction force motor current command value Ih_ref in which upper and lower limit values of the first reaction force motor current command value Ih_ref0 are limited by the output limitation unit.

In the fifth embodiment, steering reaction force corresponding to the road surface reaction force torque estimation value Tsat_est can be applied to the steering wheel 1 at a ratio corresponding to both the vehicle speed Vs and the actual turning angle θt_act. Specifically, the steering torque target value generation unit 200d generates the steering torque target value Th_ref by multiplying the torque value Tref_a (the first torque value) output from the steering reaction force torque value generation unit 210 by a relatively large first gain Ga in a region where the vehicle speed Vs or the actual turning angle θt_act is relatively small, and generates the second reaction force motor current command value Ih_ref by multiplying the reaction force motor current compensation value Iref_d output from the road surface reaction force adaptive current compensation value generation unit 220 by a relatively large second gain Gb in a region where the vehicle speed Vs or the actual turning angle θt_act is relatively large. As a result, it is possible to obtain a steering feeling reflecting the situation of the road surface, the vehicle speed Vs, and the actual turning angle θt_act.

It is noted that the gain ratio setting example in the first gain ratio generation unit 230 according to the fifth embodiment is an example, and is not limited to the mode illustrated in FIG. 29A described above. For example, within the range from the first vehicle speed Vs_A or higher to the second vehicle speed Vs_B or lower, the first gain Ga1 may gradually decrease as the vehicle speed Vs increases, and accordingly, the second gain Gb1 may gradually increase as the vehicle speed Vs increases. Additionally, for example, within the range from the first vehicle speed Vs_A or higher to the second vehicle speed Vs_B or lower, the first gain Ga1 may gradually increase as the vehicle speed Vs decreases, and accordingly, the second gain Gb1 may gradually decrease as the vehicle speed Vs decreases.

Additionally, the gain ratio setting example in the second gain ratio generation unit 230b according to the fifth embodiment is an example, and is not limited to the mode illustrated in FIG. 29B described above. For example, within the range from the first turning angle θt_A or more to the second turning angle θt_B or less, the first gain Ga2 may gradually decrease as the actual turning angle θt_act increases, and accordingly, the second gain Gb2 may gradually increase as the actual turning angle θt_act increases. Additionally, for example, within the range from the first turning angle θt_A or more to the second turning angle θt_B or less, the first gain Ga2 may gradually increase as the actual turning angle θt_act decreases, and accordingly, the second gain Gb2 may gradually increase as the actual turning angle θt_act decreases.

Sixth Embodiment

Figure 30:
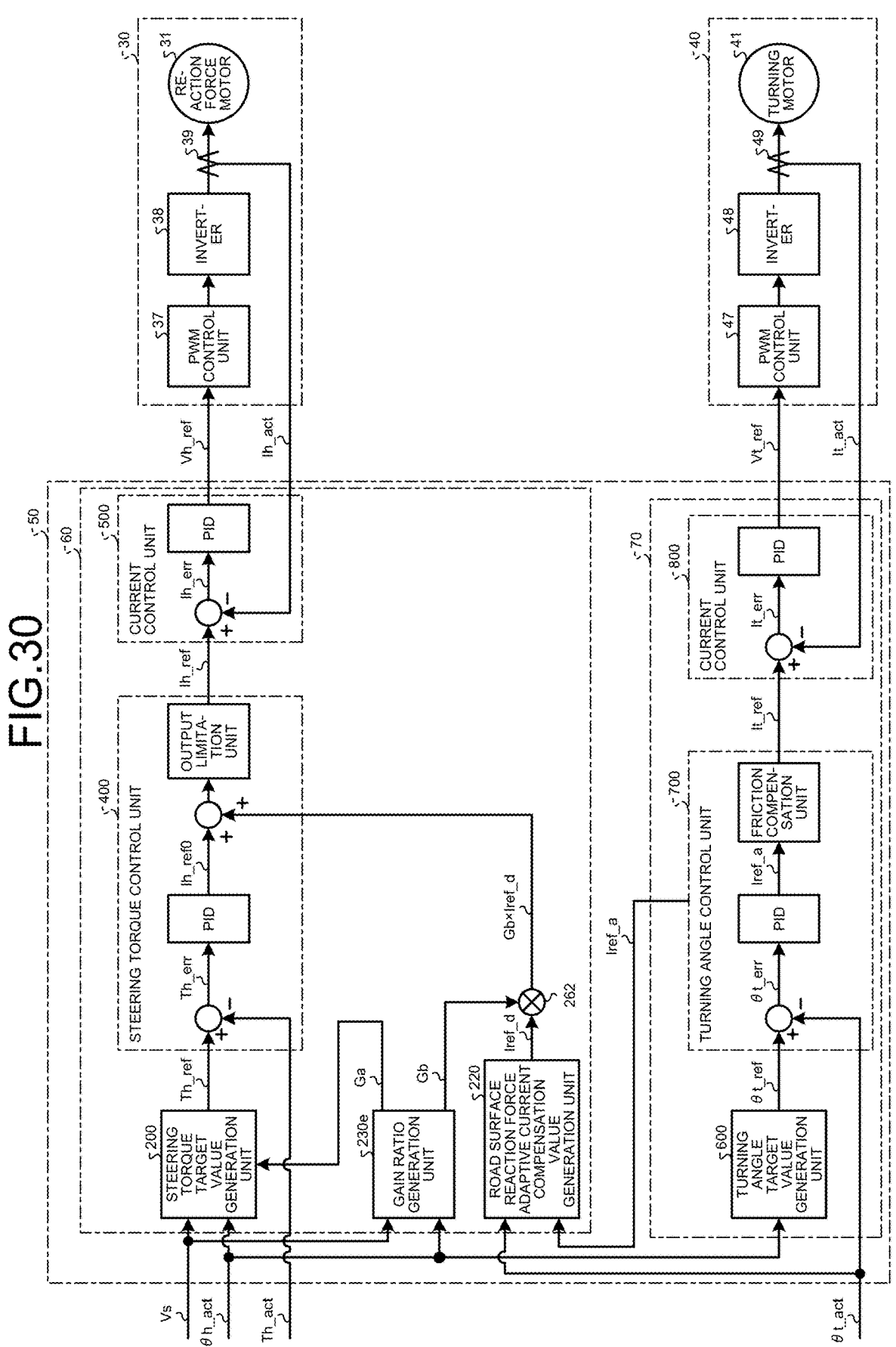
FIG. 30 is a diagram illustrating an example of a control block configuration of a control device according to a sixth embodiment.
Figure 31:
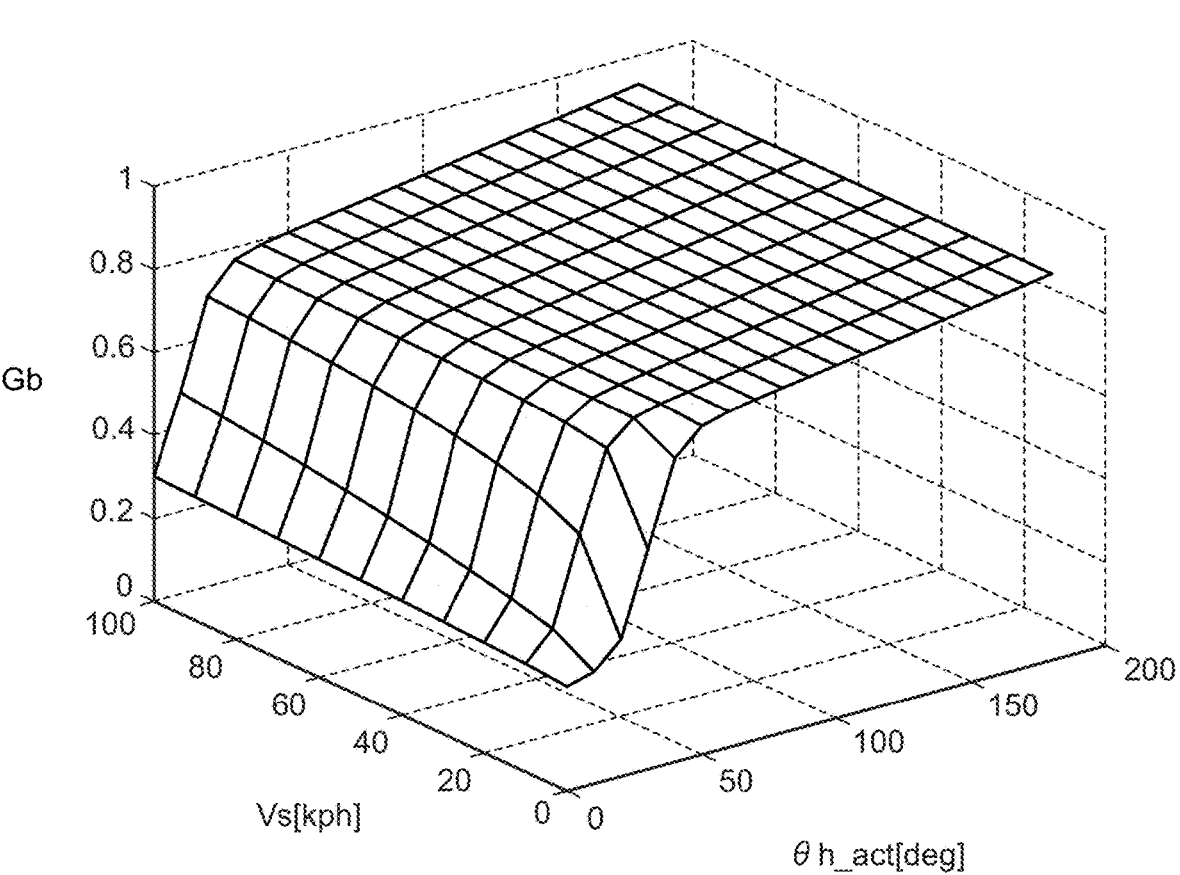
FIG. 31 is a 3D map illustrating an example of a gain ratio generation method according to a sixth embodiment.

In the present embodiment, a setting method of the first gain Ga and the second gain Gb different from that of the fourth embodiment will be described. FIG. 30 is a block diagram illustrating a configuration example of a steering torque target value generation unit according to a sixth embodiment. FIG. 31 is a 3D map illustrating an example of a gain ratio generation method according to the sixth embodiment.

A gain ratio generation unit 230e of a steering torque target value generation unit 200e according to the sixth embodiment has a gain ratio setting map illustrated in FIG. 31. The gain ratio generation unit 230e generates the second gain Gb having the vehicle speed Vs and the actual steering angle θh_act as parameters using the gain ratio map illustrated in FIG. 31. Furthermore, the gain ratio generation unit 230e calculates the first gain Ga using the following formula (16).

$$Ga = 1 - Gb \qquad (16)$$

It is noted that, in the example illustrated in FIG. 31, the gain ratio generation unit 230e generates the second gain Gb using the gain ratio map illustrated in FIG. 31 and calculates the first gain Ga using the formula (16). However, the gain ratio generation unit 230e may have a gain ratio map for generating the first gain Ga using the vehicle speed Vs and the actual steering angle θh_act as parameters, and may calculate the second gain Gb using the following formula (17) obtained by modifying the formula (16).

$$Gb = 1 - Ga \qquad (17)$$

Further, in the present embodiment, an example in which the first gain Ga and the second gain Gb are generated using the vehicle speed Vs and the actual steering angle θh_act as parameters has been described similarly to the fourth embodiment. However, it is also possible to have a gain ratio map for generating the second gain Gb or the first gain Ga using the vehicle speed Vs and the actual turning angle θt_act as parameters, and to have an aspect in which the first gain Ga and the second gain Gb are generated using the vehicle speed Vs and the actual turning angle θt_act as parameters similarly to the fifth embodiment.

Seventh Embodiment

Figure 32:
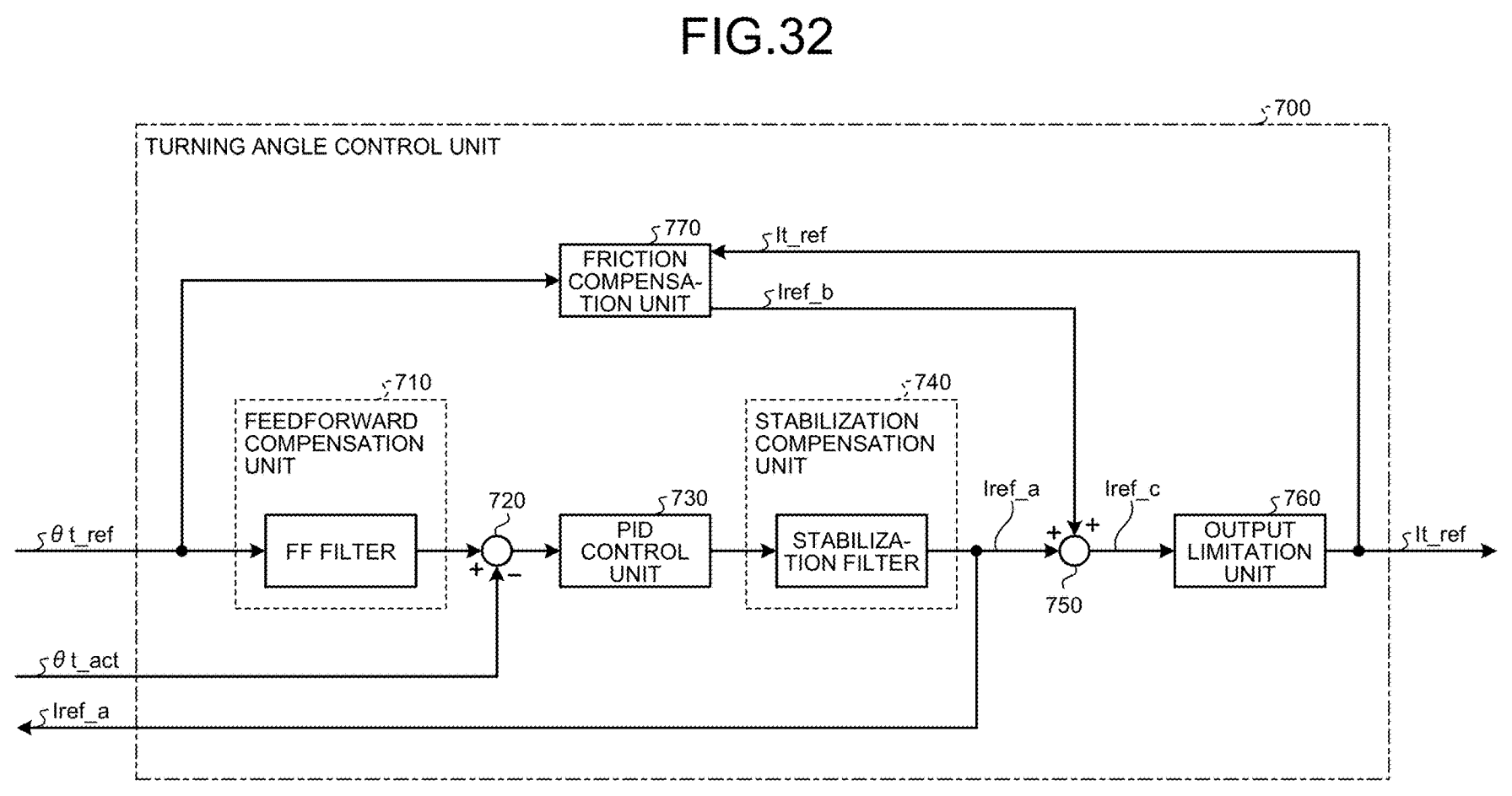

In the present embodiment, the turning angle control unit 700 will be described. FIG. 32 is a block diagram illustrating a configuration example of the turning angle control unit. As illustrated in FIG. 32, the turning angle control unit 700 includes a feedforward compensation unit 710, a PID control unit 730, a stabilization compensation unit 740, an output limitation unit 760, a friction compensation unit 770, and addition units 720 and 750.

The feedforward compensation unit 710 includes a filter (FF filter) for improving the followability of the actual turning angle θt_act relative to the turning angle target value θt_ref. The feedforward compensation unit 710 performs filter processing on the turning angle target value θt_ref. Specifically, for example, an LPF having a transmission function of a first-order delay or a second-order delay is used, and the LPF is designed such that a time delay caused by filter processing by the LPF is equivalent to a following delay of the actual turning angle θt_act relative to the turning angle target value θt_ref.

The PID control unit 730 performs PID control such that a deviation θt_err between the turning angle target value θt_ref and the actual turning angle θt_act, which are calculation results of the addition unit 720, approaches 0.

The stabilization compensation unit 740 includes a filter (a stabilization filter) having a transmission characteristic necessary for stabilizing control. The stabilization compensation unit 740 performs filtering processing on the output value of the PID control unit 730.

The output limitation unit 760 performs output limitation processing on a current command value Iref_c, which is the calculation result of the addition unit 750, and outputs a second turning motor current command value It_ref. In the output limitation unit 760, an upper limit value and a lower limit value for the current command value Tref_c are set in advance. The output limitation unit 760 limits the upper and lower limit values of the current command value Iref_c and outputs the second turning motor current command value It_ref.

It is noted that the feedforward compensation unit 710 and the stabilization compensation unit 740 described above are not necessarily required components, and for example, any one or both of the feedforward compensation unit 710 and the stabilization compensation unit 740 may not be included.

On the basis of the turning angle target value θt_ref, the friction compensation unit 770 calculates a second current compensation value Iref_b for compensating a following delay of the actual turning angle θt_act with respect to the turning angle target value θt_ref caused by friction in the turning mechanism. Hereinafter, a specific configuration and operation of the friction compensation unit 770 will be described in detail.

Figure 33:
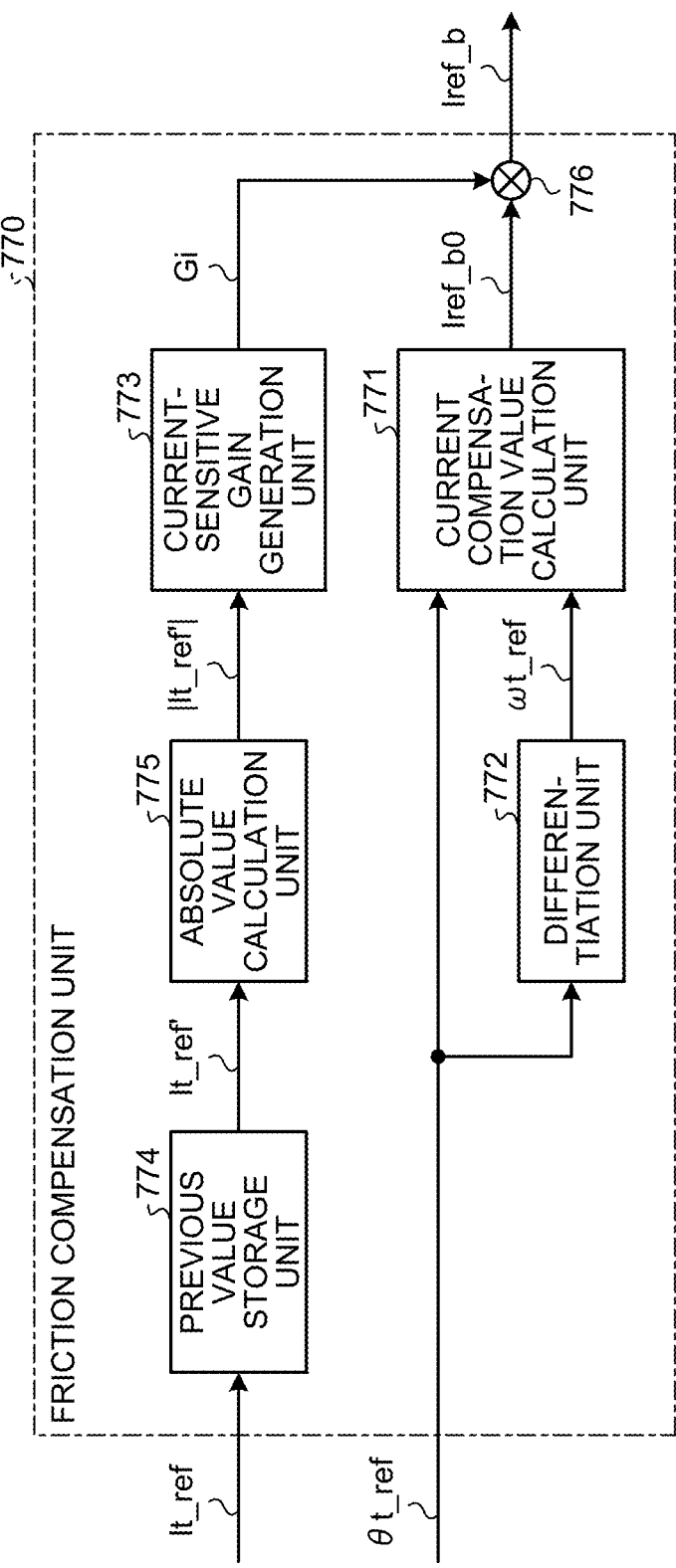
FIG. 33 is a block diagram illustrating a configuration example of a friction compensation unit.

FIG. 33 is a block diagram illustrating a configuration example of the friction compensation unit. As illustrated in FIG. 33, the friction compensation unit 770 includes a current compensation value calculation unit 771 and a current-sensitive gain generation unit 773 as main components.

The turning angle target value θt_ref and a turning speed target value ωt_ref calculated by differentiating the turning angle target value θt_ref by a differentiation unit 772 are input to the current compensation value calculation unit 771. The current compensation value calculation unit 771 calculates a first current compensation value Iref_b0 based on the turning angle target value θt_ref and the turning speed target value ωt_ref.

Hereinafter, a calculation method of the first current compensation value Iref_b0 in the current compensation value calculation unit 771 will be described.

Figure 34:
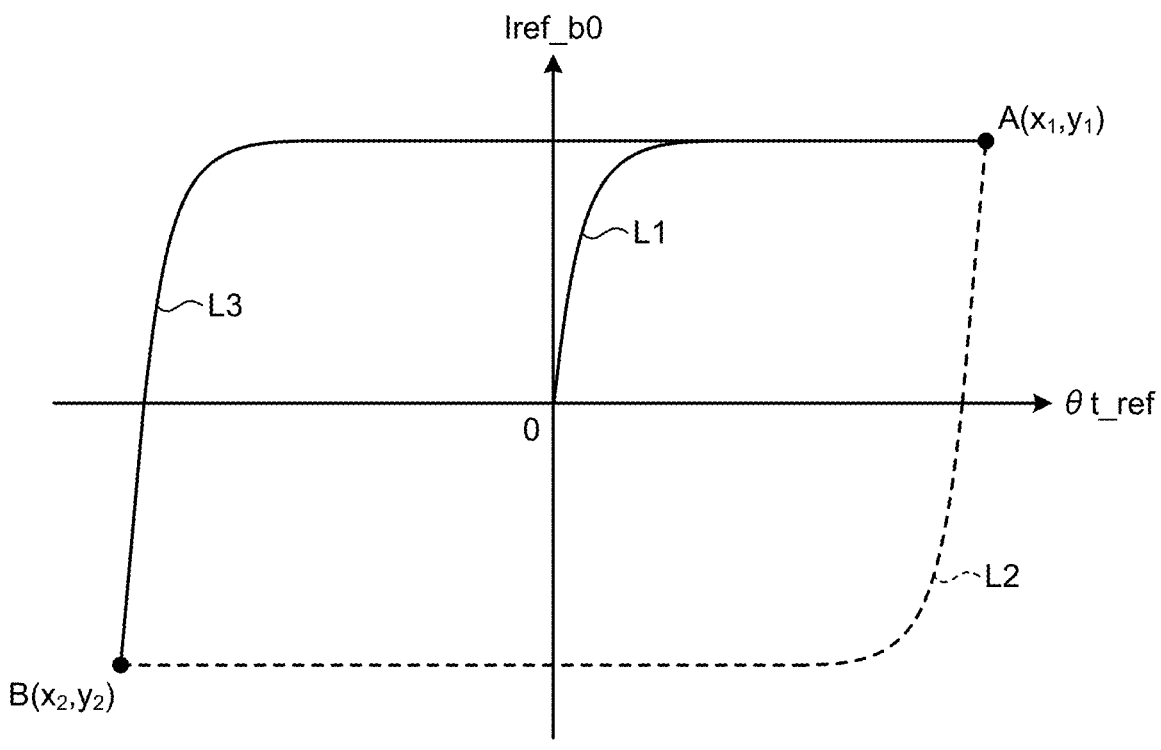
FIG. 34 is a diagram illustrating a characteristic example of a first current compensation value in a current compensation value calculation unit.

FIG. 34 is a diagram illustrating a characteristic example of the first current compensation value in the current compensation value calculation unit. In FIG. 34, the horizontal axis represents the turning angle target value θt_ref, and the vertical axis represents the first current compensation value Iref_b0. In FIG. 34, a solid line indicates the first current compensation value Iref_b0 at the time of rightward turning, and a broken line indicates the first current compensation value Iref_b0 at the time of leftward turning. As illustrated in FIG. 34, the first current compensation value Iref_b0 calculated by the current compensation value calculation unit 771 has hysteresis characteristics that are different values at the time of leftward turning and at the time of leftward turning. L1 illustrated in FIG. 34 represents a trajectory when the turning wheels 5L and 5R are turned rightwards from the center position (origin (0, 0)), L2 represents a trajectory when switching from rightward turning to leftward turning occurs in coordinates A ($x_1$, $y_1$), and L3 represents a trajectory when switching from rightward turning to leftward turning occurs in coordinates B ($x_2$, $y_2$).

The current compensation value calculation unit 771 calculates the first current compensation value Iref_b0 using the following formulas (18) and (19) based on the turning angle target value θt_ref and the turning speed target value ωt_ref. Specifically, when a sign ωt_ref(sgn) of the turning speed target value ωt_ref is a positive value ("+"), the first current compensation value Iref_b0 is calculated using the following formula (18), and when the sign ωt_ref(sgn) of the turning speed target value ωt_ref is a negative value ("−"), the first current compensation value Iref_b0 is calculated using the following formula (19). In the following formulas (18) and (19), x represents the turning speed target value ωt_ref, $y_R$ represents the first current compensation value Iref_b0 at the time of rightward turning, and $y_L$ represents the first current compensation value Iref_b0 at the time of leftward turning. In addition, a coefficient a is a value greater than 1, and a coefficient c is a value greater than 0. The coefficient Ahys represents an output width of the hysteresis characteristic (a width of the first current compensation value Iref_b0), and the coefficient c is a coefficient representing roundness of the hysteresis characteristic.

$$y_R = Ahys\{1 - a^{-c(x-b)}\} \tag{18}$$

$$y_L = -Ahys\{1 - a^{c(x-b')}\} \tag{19}$$

That is, the current compensation value calculation unit 771 calculates the first current compensation value Iref_b0 ($y_R$) using the formula (18) at the time of rightward turning (ωt_ref(sgn)="+"), and calculates the first current compensation value Iref_b0 ($y_L$) using the formula (19) at the time of leftward turning (ωt_ref(sgn)="−").

When switching from rightward turning to leftward turning occurs (ωt_ref(sgn)="+"→"−"), or when switching from leftward turning to rightward turning occurs (ωt_ref (sgn)="−"→"+"), the current compensation value calculation unit 771 takes over the previous values of the turning angle target value θt_ref and the first current compensation value Iref_b0, and substitutes a coefficient b or b' shown in the following formula (20) or (21) into the formula (18) or (19) applied after the turning switching. This maintains continuity before and after turning switching. Specifically, when switching from rightward turning to leftward turning occurs (ωt_ref(sgn)="+"→"−"), the current compensation value calculation unit 771 applies the turning angle target value θt_ref and the previous value (coordinates A ($x_1$, $y_1$) illustrated in FIG. 34) of the first current compensation value Iref_b0 to the formula (19), and substitutes the coefficient b' shown in the following formula (21) to calculate the first current compensation value Iref_b0. Specifically, when switching from leftward turning to rightward turning occurs (ωt_ref(sgn)="−"→"+"), the current compensation value calculation unit 771 applies the turning angle target value θt_ref and the previous value (coordinates B ($x_2$, $y_2$) illustrated in FIG. 34) of the first current compensation value Iref_b0 to the formula (18), and substitutes the coefficient b shown in the following formula (20) to calculate the first current compensation value Iref_b0.

$$b = x_1 + (1/c)\log_a\{1 - (y_1/Ahys)\} \tag{20}$$

$$b' = x_1 - (1/c)\log_a\{1 - (y_1/Ahys)\} \tag{21}$$

The formulas (20) and (21) can be derived by substituting $x_1$ for $x$ and substituting $y_1$ for $y_R$ and $y_L$ in the formulas (18) and (19).

For example, when the Napier's constant e is used as the coefficient a, the formulas (18), (19), (20), and (21) can be expressed by the following formulas (22), (23), (24), and (25), respectively.

$$y_R = Ahys[1 - \exp\{-c(x-b)\}] \tag{22}$$

$$y_L = -Ahys[\{1 - \exp\{c(x-b')\}] \tag{23}$$

$$b = x_1 + (1/c)\log_e\{1 - (y_1/Ahys)\} \tag{24}$$

$$b' = x_1 - (1/c)\log_e\{1 - (y_1/Ahys)\} \tag{25}$$

Referring back to FIG. 33, a previous value holding unit 774 stores a previous output value It_ref' of the turning angle control unit 700. Specifically, the previous output value It_ref' is the second turning motor current command value It_ref in the previous processing. The previous value holding unit 774 includes, for example, a RAM of an ECU constituting the control device 50.

In the present disclosure, an absolute value calculation unit 775 performs absolute value processing on the previous output value It_ref' of the turning angle control unit 700 output from the previous value holding unit 774.

The current-sensitive gain generation unit 773 receives a previous output value |It_ref'| of the turning angle control unit 700 subjected to the absolute value processing in the absolute value calculation unit 775. The current-sensitive gain generation unit 773 generates a gain Gi according to the previous output value |It_ref'| of the turning angle control unit 700.

Figure 35A:
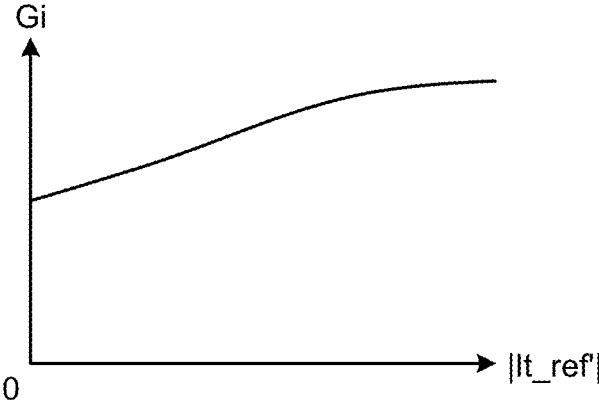
FIG. 35A is a diagram illustrating a first example of a current-sensitive gain map.
Figure 35B:
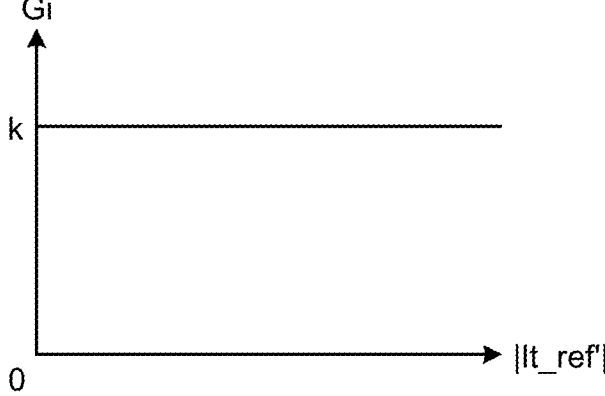
FIG. 35B is a diagram illustrating a second example of the current-sensitive gain map.

The current-sensitive gain generating unit 773 has a current-sensitive gain map in which the gain Gi corresponding to the previous output value |It_ref'| of the turning angle control unit 700 is set. The current-sensitive gain map is stored in, for example, the ROM of the ECU constituting the control device 50. FIG. 35A is a diagram illustrating a first example of the current-sensitive gain map. FIG. 35B is a diagram illustrating a second example of the current-sensitive gain map.

The first example of the current-sensitive gain map illustrated in FIG. 35A has a current value-sensitive type characteristic in which the gain Gi increases or decreases according to the previous output value |It_ref'| of the turning angle control unit 700. More specifically, as illustrated in FIG. 35A, the gain Gi monotonically increases as the previous output value |It_ref'| of the turning angle control unit 700 increases.

Figure 36:
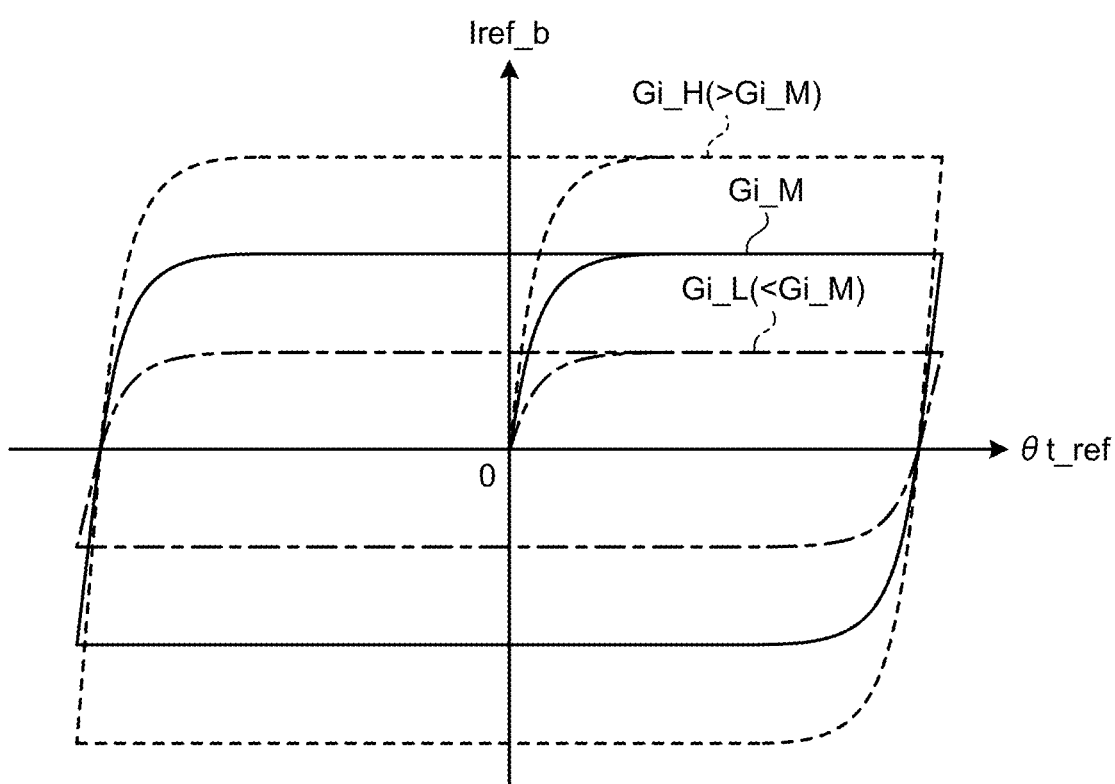
FIG. 36 is a diagram illustrating an example of an output characteristic of a friction compensation unit.

FIG. 36 is a diagram illustrating an example of an output characteristic of the friction compensation unit. In FIG. 36, the horizontal axis represents the turning angle target value θt_ref, and the vertical axis represents the second current compensation value Iref_b.

The frictional force generated in the turning mechanism includes friction due to gear torque interposed between the turning motor 41 and the deceleration mechanism 42. It is noted that the gear torque refers to a torque caused by frictional force generated in a mechanical element of a speed reducer. For example, in the case of a worm reducer, frictional torque caused by frictional force generated in a meshing portion between a worm gear and a worm wheel may be defined as gear torque. The frictional force due to the gear torque monotonously increases with respect to the motor current.

In the present disclosure, the friction compensation unit 770 multiplies the first current compensation value Iref_b0 output from the current compensation value calculation unit 771 by the gain Gi generated by the current-sensitive gain generation unit 773 (a multiplication unit 776), thereby calculating the second current compensation value Iref_b. As a result, as illustrated in FIG. 36, a characteristic is obtained in which an output width of the hysteresis characteristic (the width of the second current compensation value Iref_b) increases or decreases depending on the second turning motor current command value It_ref, and friction compensation control according to the frictional force caused by the gear torque can be realized.

Specifically, in a case where the second turning motor current command value It_ref is relatively large, the gear torque becomes relatively large, and the frictional force caused by the gear torque acts strongly. Under such circumstances, by multiplying the current compensation value Iref_b0 output from the current compensation value calculation unit 771 by a gain Gi_H relatively larger than a gain Gi_M, the output width of the hysteresis characteristic (the width of the current compensation value Iref_b (the second current compensation value)) can be increased as indicated by a broken line.

When the second turning motor current command value It_ref is relatively small, the gear torque becomes relatively small, and the frictional force caused by the gear torque becomes small. Under such circumstances, by multiplying the first current compensation value Iref_b0 output from the current compensation value calculation unit 771 by a gain Gi_L that is relatively smaller than the gain Gi_M, the output width of the hysteresis characteristic (the width of the second current compensation value Iref_b) can be reduced as indicated by an alternate long and short dash line.

It is noted that the mode of the current-sensitive gain map is not limited to the mode of the first example illustrated in FIG. 35A. For example, as in the second example illustrated in FIG. 35B, the current compensation value Iref_b (the second current compensation value) may be calculated by multiplying the current compensation value Iref_b0 output from the current compensation value calculation unit 771 by a constant gain Gi=k (for example, k=1) regardless of the second turning motor current command value It_ref (the previous output value |It_ref'| of the turning angle control unit 700).

The current compensation value Iref_b (the second current compensation value) output from the friction compensation unit 770 is added to the first turning motor current command value Iref_a output from the stabilization compensation unit 740 by the addition unit 750 illustrated in FIG. 32, and the second turning motor current command value It_ref whose output is limited by the output limitation unit 760 is output to the added current command value Iref_c.

Figure 37:
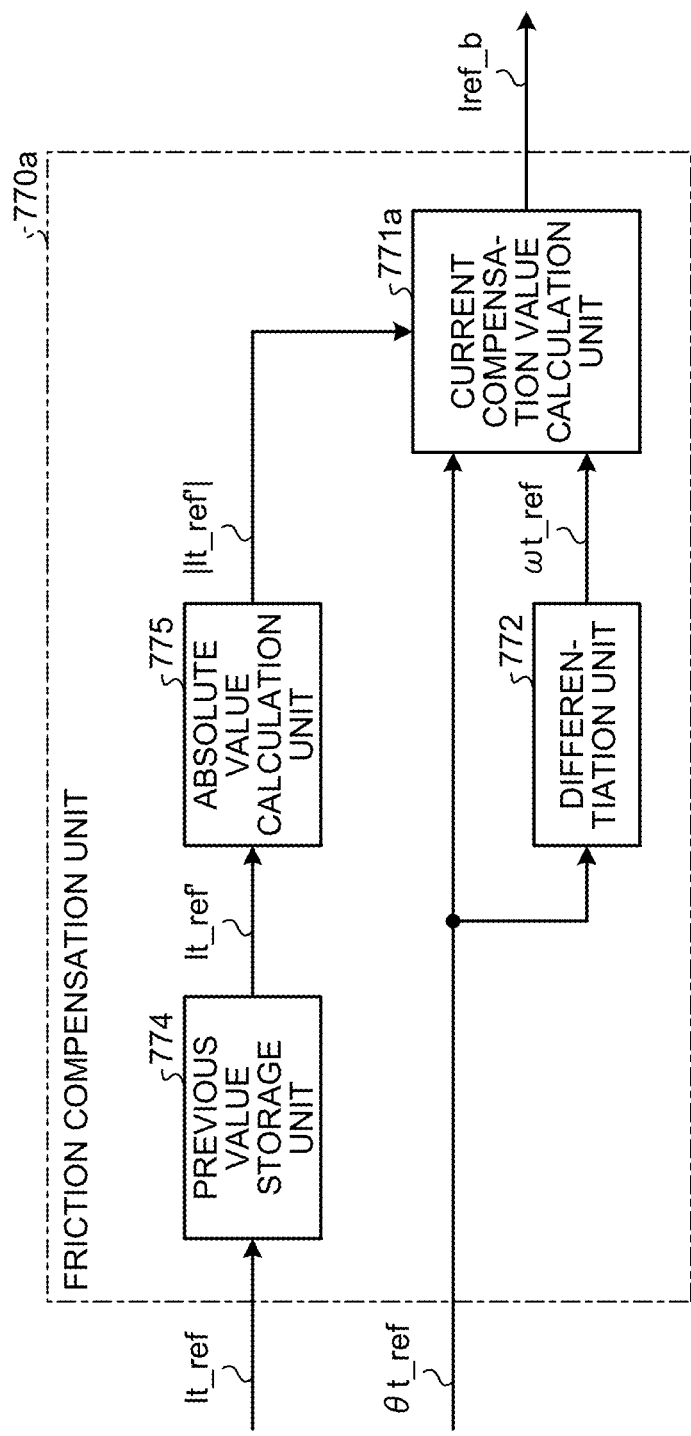
FIG. 37 is a block diagram illustrating a configuration example of a friction compensation unit according to a modification.

FIG. 37 is a block diagram illustrating a configuration example of a friction compensation unit according to a modification. In the configuration example of a friction compensation unit 770a illustrated in FIG. 33, the first current compensation value Iref_b0 output from the current compensation value calculation unit 771 is multiplied by the gain Gi generated by the current-sensitive gain generation unit 773. However, in the modification illustrated in FIG. 37, a current compensation value calculation unit 771a may be configured to store a table (data) in which the second turning motor current command value It_ref (the previous output value |It_ref'| of the turning angle control unit 700) and the coefficients Ahys in formulas (6) to (13) are associated with each other, and to obtain a characteristic in which the output width of the hysteresis characteristic (the width of the second current compensation value Iref_b) increases or decreases depending on the second turning motor current command value It_ref, as illustrated in FIG. 36. Similarly to the current-sensitive gain map, the data can be stored in, for example, the ROM of the ECU constituting the control device 50. As a result, similarly to the configuration illustrated in FIG. 33, friction compensation control according to the frictional force caused by the gear torque can be realized.

It is noted that the present invention is not limited to the mode of differentiating the turning angle target value θt_ref and obtaining the turning speed target value ωt_ref, and for example, a mode of determining that the turning direction has been switched using the motor angular velocity of the turning motor 41 may be used. In addition, a filter may be provided in a preceding stage of the current compensation value calculation unit 771 and the current-sensitive gain generation unit 773, or a filter may be provided in a subsequent stage of the current-sensitive gain generation unit 773. Furthermore, a limiter that performs output limitation processing on the second current compensation value Iref_b may be provided at a subsequent stage of the friction compensation unit 770, similarly to the output limitation unit 760 described above.

Figure 38A:
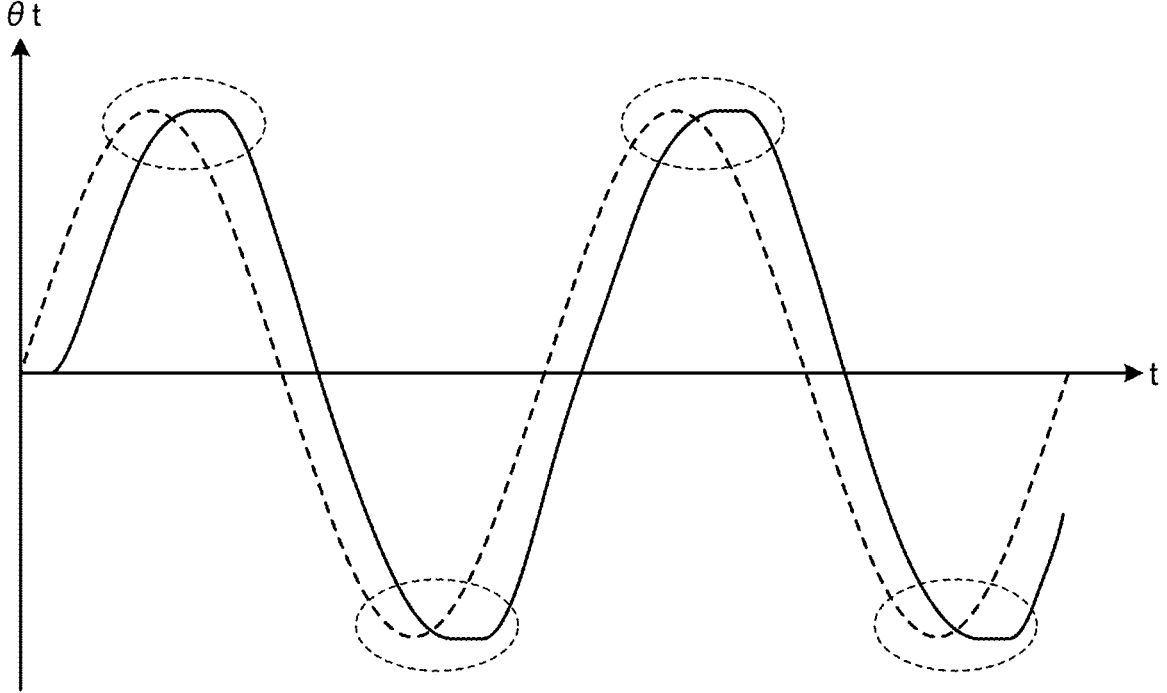
FIG. 38A is a first conceptual diagram illustrating a specific example of friction compensation control by the friction compensation unit.
Figure 38B:
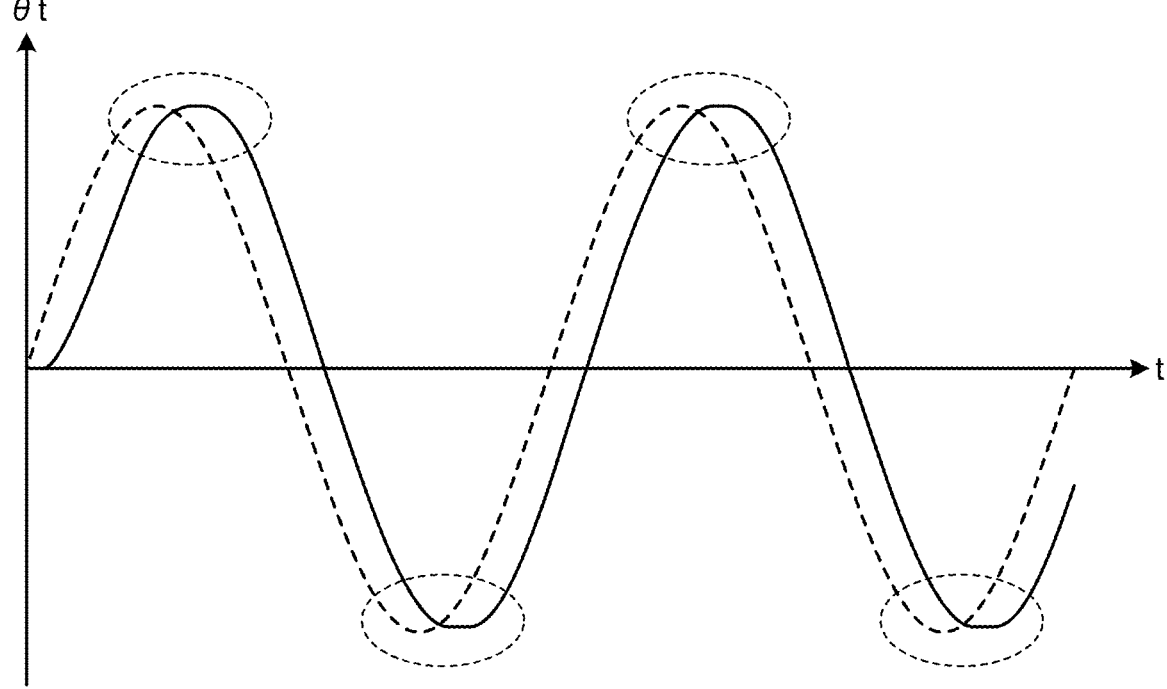
FIG. 38B is a first conceptual diagram illustrating the specific example of the friction compensation control by the friction compensation unit.

FIGS. 38A and 38B are first conceptual diagrams each illustrating a specific example of friction compensation control by the friction compensation unit. In FIGS. 38A and 38B, the horizontal axis represents time, and the vertical axis represents the turning angle. A broken line illustrated in FIGS. 38A and 38B indicates the turning angle target value θt_ref, and a solid line indicates the actual turning angle θt_act. FIG. 38A illustrates a time response when friction compensation control by the friction compensation unit 770 is not performed. FIG. 38B illustrates a time response when friction compensation control is performed by the friction compensation unit 770.

In the example illustrated in FIGS. 38A and 38B, the time response when the turning wheels 5L and 5R are turned leftwards and rightwards at a relatively fast predetermined frequency from the center position thereof is illustrated. When the friction compensation control by the friction compensation unit 770 is not performed, distortion occurs in the actual turning angle θt_act at the time of switching the turning direction surrounded by a broken line, as illustrated in FIG. 38A. In this case, when the driver performs a steering wheel operation to switch the steering direction from further turning the steering wheel to turning it back or to switch the steering direction from turning the steering wheel back to further turning it, there is a possibility that a deviation occurs between the operation (steering) of the steering wheel 1 and the turning of the turning wheels 5L and 5R, and the driver may feel uncomfortable. On the other hand, when the friction compensation control is performed by the friction compensation unit 770, as illustrated in FIG. 38B, occurrence of distortion in the actual turning angle θt_act at the time of switching the turning direction surrounded by the broken line is suppressed.

More specifically, when the turning angle target value θt_ref is switched at the time of switching the turning direction, the turning speed target value ωt_ref becomes substantially 0. However, since the first current compensation value Iref_b0 is determined according to the turning angle target value θt_ref, the friction compensation unit 770 can perform predetermined friction compensation control even when the turning speed target value ωt_ref is substantially 0.

Accordingly, when the driver performs a steering wheel operation to switch a steering direction from further turning the steering wheel to turning it back or to switch the steering direction from turning the steering wheel back to further turning it, it is possible to reduce the sense of discomfort given to the driver.

Figure 39A:
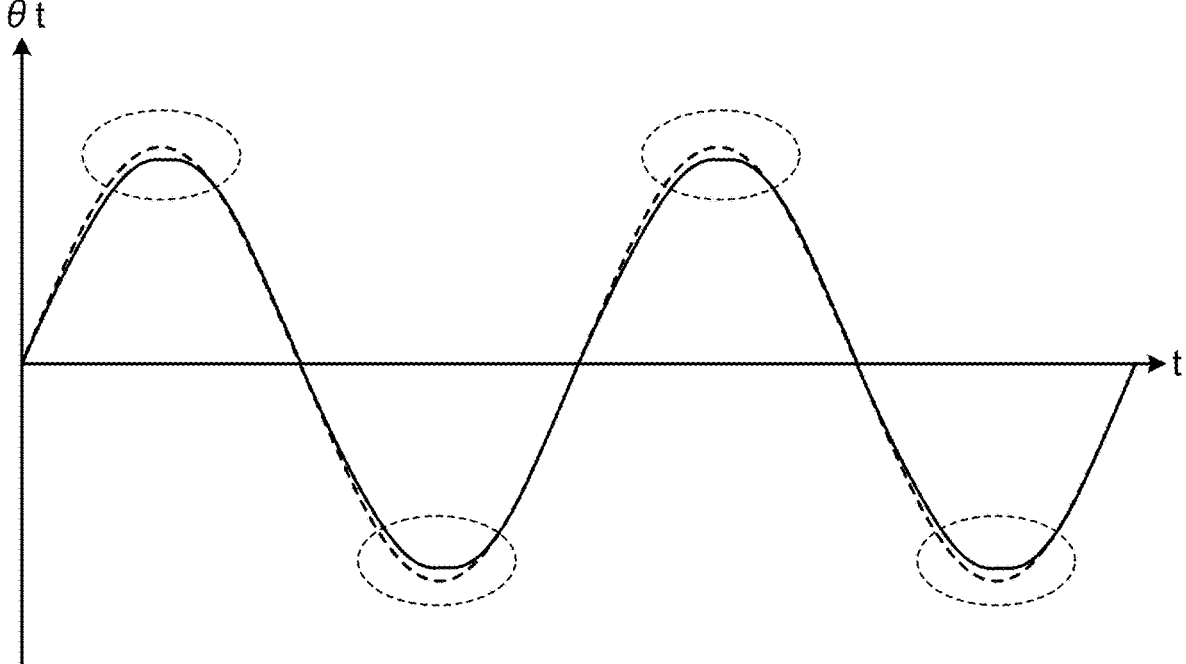
FIG. 39A is a second conceptual diagram illustrating a specific example of friction compensation control by the friction compensation unit.
Figure 39B:
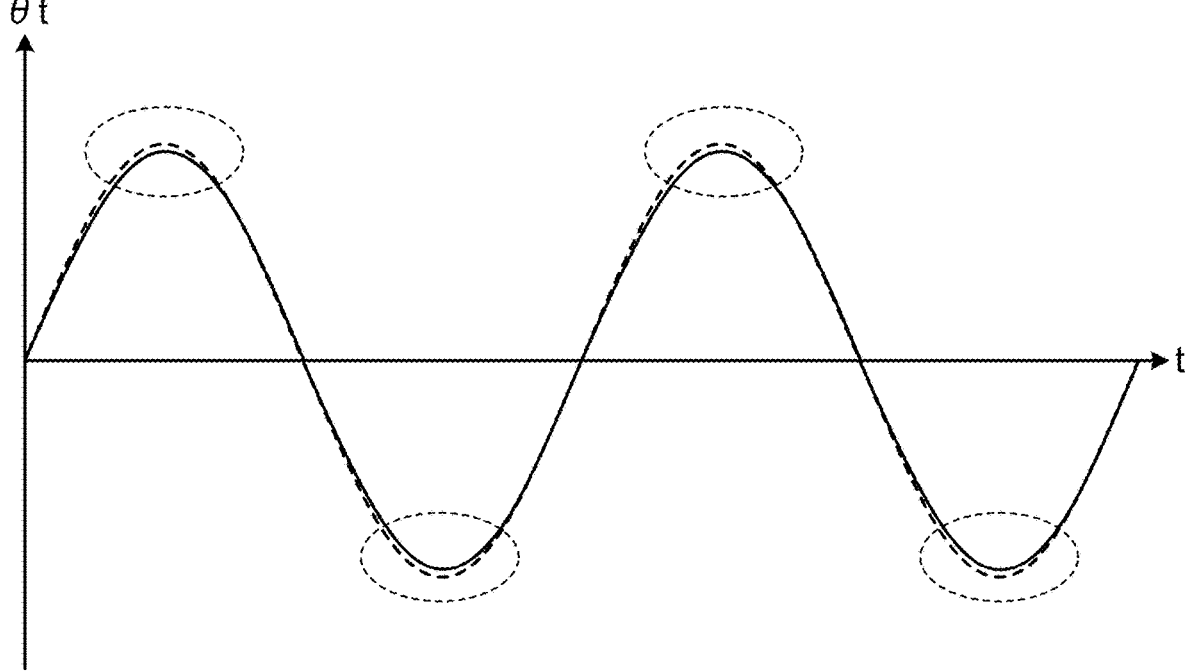
FIG. 39B is the second conceptual diagram illustrating the specific example of the friction compensation control by the friction compensation unit.

FIGS. 39A and 39B are second conceptual diagrams each illustrating a specific example of friction compensation control by the friction compensation unit. In FIGS. 39A and 39B, the horizontal axis represents time, and the vertical axis represents the turning angle. A broken line illustrated in FIGS. 39A and 39B indicates the turning angle target value θt_ref, and a solid line indicates the actual turning angle θt_act. FIG. 39A illustrates a time response when friction compensation control according to the turning speed target value ωt_ref is performed as a comparative example of the friction compensation control according to the embodiment. FIG. 39B illustrates a time response when friction compensation control is performed by the friction compensation unit 770.

In the example illustrated in FIGS. 39A and 39B, a time response in the case of slightly turning leftwards and rightwards is illustrated as compared with FIGS. 38A and 38B. When the friction compensation control according to the turning speed target value ωt_ref according to a comparative example is performed, as illustrated in FIG. 39A, when turning is slightly performed to the left and right, distortion occurs in the actual turning angle θt_act at the time of switching the turning direction surrounded by a broken line. On the other hand, in a case where the friction compensation control is performed by the friction compensation unit 770, as illustrated in FIG. 39B, when turning is slightly performed to the left and right, it is possible to suppress the occurrence of distortion in the actual turning angle θt_act at the time of switching the turning direction surrounded by the broken line.

More specifically, when the steering wheel is operated slowly, slightly, and slowly, when the turning angle target value θt_ref is switched at the time of switching the turning direction as in the examples of FIGS. 38A and 38B, the turning speed target value ωt_ref becomes substantially 0. Here, unlike the examples of FIGS. 38A and 38B, since the turning angle target value θt_ref also takes a value close to 0, the first current compensation value Iref_b0 output from the current compensation value calculation unit 771 also outputs a small value. However, by multiplying the first current compensation value Iref_b0 by the gain Gi calculated by the current-sensitive gain generation unit 773, it is possible to prevent the second current compensation value Iref_b from becoming too small.

As a result, even in a situation where the steering wheel operation by the driver is minute, it is possible to reduce a sense of discomfort given to a driver when the driver performs a steering wheel operation to switch the steering direction from further turning the steering wheel to turning it back or to switch the steering direction from turning the steering wheel back to further turning it.

As described above, the turning angle control unit 700 includes the friction compensation unit 770, and is configured to calculate the second current compensation value Iref_b for compensating for a following delay of the actual turning angle θt_act with respect to the turning angle target value θt_ref caused by friction in the turning mechanism based on the turning angle target value θt_ref, whereby the friction compensation control can be effectively and appropriately performed regardless of the steering wheel operation speed of the driver.

Furthermore, as described above, by setting the second current compensation value Iref_b to have a characteristic of increasing or decreasing depending on the second turning motor current command value It_ref, friction compensation control according to frictional force caused by the gear torque can be realized.

In the present disclosure, the road surface reaction force adaptive torque compensation value generation unit 220 calculates the road surface reaction force torque estimation value Tsat_est according to the first turning motor current command value Iref_a before adding the second current compensation value Iref_b output from the friction compensation unit 770, thereby obtaining the road surface reaction force torque estimation value Tsat_est according to the behavior of the actual road surface reaction force torque Tsat_act during actual traveling of the vehicle, and applying the steering reaction force according to the road surface reaction force torque estimation value Tsat_est.

Further, in the present disclosure, an increase or decrease of the first gain Ga and the second gain Gb in the section from the first vehicle speed Vs_A to the second vehicle speed Vs_B may be linearly changed with respect to the vehicle speed as illustrated in FIGS. 19A-19C and the like, or a part of the section may be changed non-linearly.

It is noted that the drawings used in the above-described embodiments are conceptual diagrams for describing the present disclosure in a qualitative manner, and are not limited thereto. In addition, the above-described embodiments are preferred embodiments of the present disclosure, but are not limited thereto, and various modifications can be made without departing from the gist of the present disclosure.

REFERENCE SIGNS LIST

1 STEERING WHEEL
2 COLUMN SHAFT
3a, 3b TIE ROD
5L, 5R TURNING WHEEL
6a, 6b ARM
10 VEHICLE SPEED SENSOR
11 IGNITION KEY
12 BATTERY
30 REACTION FORCE DEVICE
31 REACTION FORCE MOTOR
32 DECELERATION MECHANISM
33 STEERING ANGLE SENSOR
34 TORQUE SENSOR
35 STOPPER (ROTATION RESTRICTING MECHANISM)
40 TURNING DEVICE
41 TURNING MOTOR
42 DECELERATION MECHANISM
43 ANGLE SENSOR
44 PINION RACK MECHANISM
50 CONTROL DEVICE
60 REACTION FORCE CONTROL SYSTEM
70 TURNING CONTROL SYSTEM
200, 200a, 200b, 200c, 200d STEERING TORQUE TARGET VALUE GENERATION UNIT
210 STEERING REACTION FORCE TORQUE VALUE GENERATION UNIT
211 STEERING REACTION FORCE TORQUE MAP UNIT

220 ROAD SURFACE REACTION FORCE ADAPTIVE CURRENT COMPENSATION VALUE GENERATION UNIT
221 ROAD SURFACE REACTION FORCE TORQUE ESTIMATION UNIT
222 ROAD SURFACE REACTION FORCE ADAPTIVE CURRENT MAP UNIT
230, 230a, 230b. 230c, 230d, 230e GAIN RATIO GENERATION UNIT (FIRST GAIN RATIO GENERATION UNIT, SECOND GAIN RATIO GENERATION UNIT)
231 GAIN RATIO CALCULATION UNIT
240 DAMPING TORQUE VALUE GENERATION UNIT
241 DAMPING GAIN MAP UNIT
250 HYSTERESIS COMPENSATION UNIT
251 HYSTERESIS COMPENSATION VALUE CALCULATION UNIT
400 STEERING TORQUE CONTROL UNIT
500 CURRENT CONTROL UNIT
600 TURNING ANGLE TARGET VALUE GENERATION UNIT
700 TURNING ANGLE CONTROL UNIT
710 FEEDFORWARD COMPENSATION UNIT
720 ADDITION UNIT
730 PID CONTROL UNIT
740 STABILIZATION COMPENSATION UNIT
750 ADDITION UNIT
760 OUTPUT LIMITATION UNIT
770, 770a FRICTION COMPENSATION UNIT
771, 771a CURRENT COMPENSATION VALUE CALCULATION UNIT
772 DIFFERENTIATION UNIT
773 CURRENT-SENSITIVE GAIN GENERATION UNIT
774 PREVIOUS VALUE HOLDING UNIT
775 ABSOLUTE VALUE CALCULATION UNIT
776 MULTIPLICATION UNIT
800 CURRENT CONTROL UNIT

The invention claimed is:

1. A control device of a vehicle steering system including a reaction force device and a turning device, the reaction force device driving a reaction force motor that applies steering reaction force to a steering wheel according to a steering angle of the steering wheel, the turning device driving a turning motor that turns a turning wheel according to the steering angle of the steering wheel, the control device comprising:

a steering torque target value generation unit configured to generate a steering torque target value serving as a target value of steering torque for acquisition of the steering reaction force;

a steering torque control unit configured to generate, based on the steering torque target value, a first reaction force motor current command value serving as a target value of current to be supplied to the reaction force motor;

a turning angle target value generation unit configured to generate, based on the steering angle, a turning angle target value serving as a target value of a turning angle of the turning wheel;

a turning angle control unit configured to generate, based on the turning angle target value, a first turning motor current command value serving as a target value of current to be supplied to the turning motor;

a current compensation value generation unit configured to generate a reaction force motor current compensation value increasing or decreasing depending on a road surface reaction force torque estimation value estimated based on at least the first turning motor current command value; and a gain ratio generation unit configured to generate a first gain and a second gain, the first gain increasing or decreasing depending on at least one of a vehicle speed of a vehicle and the steering angle thereof, the second gain having a sum of the first gain and the second gain of 1, wherein the steering torque target value generation unit is configured to generate the steering torque target value by multiplying a torque value increasing or decreasing depending on at least the steering angle by the first gain, and the steering torque control unit is configured to add, to the first reaction force motor current command value, a value obtained by multiplying the reaction force motor current compensation value by the second gain, and to generate a second reaction force motor current command value for driving of the reaction force motor.

2. The control device according to claim 1, wherein the steering torque control unit is configured to increase the reaction force motor current compensation value as the vehicle speed increases.

3. The control device according to claim 1, wherein the gain ratio generation unit is configured to reduce the first gain as the vehicle speed increases.

4. The control device according to claim 3, wherein the gain ratio generation unit is configured to reduce the first gain within a range from a first vehicle speed or higher to a second vehicle speed or lower.

5. The control device according to claim 4, wherein the first gain in a range of the first vehicle speed or lower is larger than the second gain in a range of the second vehicle speed or higher.

6. The control device according to claim 4, wherein the first gain in a range of the first vehicle speed or lower is equal to the second gain in a range of the second vehicle speed or higher.

7. The control device according to claim 4, wherein the first gain in a range of the first vehicle speed or lower is smaller than the second gain in a range of the second vehicle speed or higher.

8. The control device according to claim 1, wherein the gain ratio generation unit is configured to reduce the first gain with an increase in an actual steering angle serving as the actual steering angle of the steering wheel.

9. The control device according to claim 8, wherein the gain ratio generation unit is configured to reduce the first gain within a range from a first steering angle or more to a second steering angle or less.

10. The control device according to claim 9, wherein the first gain in a range of the first steering angle or less is larger than the second gain in a range of the second steering angle or more.

11. The control device according to claim 9, wherein the first gain in a range of the first steering angle or less is equal to the second gain in a range of the second steering angle or more.

12. The control device according to claim 9, wherein the first gain in a range of the first steering angle or less is smaller than the second gain in a range of the second steering angle or more.

13. The control device according to claim 1, wherein the gain ratio generation unit is configured to reduce the first gain with an increase in an actual turning angle serving as the actual turning angle of the turning wheel.

14. The control device according to claim 13, wherein the gain ratio generation unit is configured to reduce the first gain within a range from a first turning angle or more to a second turning angle or less.

15. The control device according to claim 14, wherein the first gain in a range of the first turning angle or less is larger than the second gain in a range of the second turning angle or more.

16. The control device according to claim 14, wherein the first gain in a range of the first turning angle or less is equal to the second gain in a range of the second turning angle or more.

17. The control device according to claim 14, wherein the first gain in a range of the first turning angle or less is smaller than the second gain in a range of the second turning angle or more.

18. The control device according to claim 1, wherein the turning angle control unit is configured to include a friction compensation unit configured to calculate, based on the turning angle target value, a turning motor current compensation value different between when the turning wheel is turned rightwards and when the turning wheel is turned leftwards, and the steering angle control unit is configured to generate, based on the first turning motor current command value and the turning motor current compensation value, a second turning motor current command value used to drive the turning motor.

19. The control device according to claim 18, wherein the turning motor current compensation value has a hysteresis characteristic depending on a change in the turning angle target value.

20. The control device according to claim 18, wherein the turning motor current compensation value monotonously increases in a region from a first turning angle target value when steering is started to a second turning angle target value or less, the second turning angle target value being obtained by adding a predetermined turning angle change amount threshold value to the first turning angle target value, and becomes a constant value in a region from the first turning angle target value when steering is started to the second turning angle target value or more.

21. The control device according to claim 18, wherein the friction compensation unit is configured to increase or reduce, depending on the second turning motor current command value, the turning motor current compensation value.

22. The control device according to claim 21, wherein the turning motor current compensation value monotonously increases with an increase in the second turning motor current command value.

23. The control device according to claim 22, further comprising:

a current compensation value calculation unit configured to calculate a first current compensation value; and a current-sensitive gain generation unit configured to generate a gain monotonically increasing with the increase in the second turning motor current command value, wherein the friction compensation unit is configured to calculate a second current compensation value by multiplying the first current compensation value by the gain.

24. The control device according to claim 22, wherein the friction compensation unit is configured to store data obtained by associating the second turning motor current command value with a gain monotonically increasing with an increase in the second turning motor current command value, and to calculate, based on the data, the turning motor current compensation value.

\* \* \* \* \*